US008452804B2

(12) United States Patent
Bakalash et al.

(10) Patent No.: US 8,452,804 B2
(45) Date of Patent: *May 28, 2013

(54) DATABASE MANAGEMENT SYSTEM (DBMS) EMPLOYING A RELATIONAL DATASTORE AND A MULTI-DIMENSIONAL DATABASE (MDDB) FOR SERVICING QUERY STATEMENTS IN A MANNER TRANSPARENT TO CLIENT MACHINE

(75) Inventors: Reuven Bakalash, Beer Sheva (IL); Guy Shaked, Shdema (IL); Joseph Caspi, Herzlyia (IL)

(73) Assignee: Yanicklo Technology Limited Liability Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/590,504

(22) Filed: Nov. 9, 2009

(65) Prior Publication Data
US 2010/0063958 A1 Mar. 11, 2010

Related U.S. Application Data

(63) Continuation of application No. 11/888,904, filed on Aug. 2, 2007, now abandoned, which is a continuation of application No. 10/839,782, filed on May 5, 2004, now abandoned, which is a continuation of application No. 10/314,884, filed on Dec. 9, 2002, now Pat. No. 7,315,849, which is a continuation of application No. 09/796,098, filed on Feb. 28, 2001, now abandoned, which is a continuation-in-part of application No. 09/514,611, filed on Feb. 28, 2000, now Pat. No. 6,434,544, and a continuation-in-part of application No. 09/634,748, filed on Aug. 9, 2000, now Pat. No. 6,385,604.

(51) Int. Cl.
*G06F 7/00* (2006.01)
*G06F 17/30* (2006.01)

(52) U.S. Cl.
USPC .................... 707/769; 707/770; 707/771

(58) Field of Classification Search
USPC .................................................. 707/769, 770
See application file for complete search history.

(56) References Cited

U.S. PATENT DOCUMENTS

| 4,590,465 A | 5/1986 | Fuchs |
| 4,598,400 A | 7/1986 | Hillis |

(Continued)

FOREIGN PATENT DOCUMENTS

| EP | 0 314 279 | 5/1989 |
| EP | 0 657 052 | 6/1995 |

(Continued)

OTHER PUBLICATIONS

Scheuermann, P., J. Shim and R. Vingralek "Watchman: A Data Warehouse Intelligent Cache Manager", Proceedings of the 22nd International Conference on Very Large Databases (VLDB), 1996, pp. 51-62.*

(Continued)

*Primary Examiner* — Mariela Reyes
(74) *Attorney, Agent, or Firm* — Knobbe, Martens, Olson & Bear LLP

(57) ABSTRACT

A database management system (DBMS) for servicing query statements through one or more client machines. The DBMS comprises a query interface adapted to receive query statements from the client machines. The query handling mechanism (i) receives each request from the query interface, (ii) extracts a set of dimensions associated with the request, (iii) uses the dimensions to retrieve aggregated fact data from a multi-dimensional database (MDDB), and (iv) forwards retrieved aggregated fact data to the query processing mechanism for subsequent processing. When the query processing mechanism determines that servicing of one or more query requests require data stored in the relational tables, then the query processing mechanism automatically routes the requests to the relational data tables, so that data can be accessed from the relational tables and forwarded to the query processing mechanism for use in servicing the requests, in a manner transparent to the client machine.

16 Claims, 50 Drawing Sheets

U.S. PATENT DOCUMENTS

| | | | |
|---|---|---|---|
| 4,641,351 A | 2/1987 | Preston, Jr. | |
| 4,685,144 A | 8/1987 | McCubbrey et al. | |
| 4,814,980 A | 3/1989 | Peterson et al. | |
| 4,868,733 A | 9/1989 | Fujisawa et al. | |
| 4,985,834 A | 1/1991 | Cline et al. | |
| 4,985,856 A | 1/1991 | Kaufman et al. | |
| 4,987,554 A | 1/1991 | Kaufmann | |
| 4,989,141 A | 1/1991 | Lyons et al. | |
| 5,095,427 A | 3/1992 | Tanaka et al. | |
| 5,101,475 A | 3/1992 | Kaufman et al. | |
| 5,189,608 A | 2/1993 | Lyons et al. | |
| 5,197,005 A * | 3/1993 | Shwartz et al. | 707/999.002 |
| 5,202,985 A | 4/1993 | Goyal | |
| 5,222,216 A | 6/1993 | Parish et al. | |
| 5,222,237 A | 6/1993 | Hillis | |
| 5,257,365 A | 10/1993 | Powers et al. | |
| 5,278,966 A | 1/1994 | Parks et al. | |
| 5,280,474 A | 1/1994 | Nickolls et al. | |
| 5,293,615 A | 3/1994 | Amada | |
| 5,297,265 A | 3/1994 | Frank et al. | |
| 5,297,280 A | 3/1994 | Potts, Sr. et al. | |
| 5,299,321 A | 3/1994 | Iizuka | |
| 5,307,484 A | 4/1994 | Baker et al. | |
| 5,359,724 A | 10/1994 | Earle | |
| 5,361,385 A | 11/1994 | Bakalash | |
| 5,379,419 A | 1/1995 | Heffernan et al. | |
| 5,381,518 A | 1/1995 | Drebin et al. | |
| 5,386,556 A * | 1/1995 | Hedin et al. | 707/999.004 |
| 5,404,506 A | 4/1995 | Fujisawa et al. | |
| 5,410,693 A | 4/1995 | Yu et al. | |
| 5,519,859 A | 5/1996 | Grace | |
| 5,553,226 A | 9/1996 | Kiuchi et al. | |
| 5,555,408 A | 9/1996 | Fujisawa et al. | |
| 5,696,916 A | 12/1997 | Yamazaki et al. | |
| 5,706,495 A | 1/1998 | Chadha et al. | |
| 5,706,503 A | 1/1998 | Poppen et al. | |
| 5,721,910 A | 2/1998 | Unger et al. | |
| 5,742,806 A | 4/1998 | Reiner et al. | |
| 5,745,764 A * | 4/1998 | Leach et al. | 719/316 |
| 5,751,928 A | 5/1998 | Bakalash | |
| 5,761,652 A | 6/1998 | Wu et al. | |
| 5,765,028 A | 6/1998 | Gladden | |
| 5,767,854 A | 6/1998 | Anwar | |
| 5,781,896 A * | 7/1998 | Dalal | 707/999.002 |
| 5,794,228 A | 8/1998 | French et al. | |
| 5,794,229 A | 8/1998 | French et al. | |
| 5,794,246 A | 8/1998 | Sankaran et al. | |
| 5,799,300 A | 8/1998 | Agrawal et al. | |
| 5,805,885 A * | 9/1998 | Leach et al. | 719/316 |
| 5,822,751 A * | 10/1998 | Gray et al. | 707/999.003 |
| 5,832,475 A | 11/1998 | Agrawal et al. | |
| 5,848,424 A * | 12/1998 | Scheinkman et al. | 715/210 |
| 5,850,547 A | 12/1998 | Waddington et al. | |
| 5,852,819 A | 12/1998 | Beller | |
| 5,852,821 A | 12/1998 | Chen et al. | |
| 5,857,184 A * | 1/1999 | Lynch | 707/999.004 |
| 5,864,857 A | 1/1999 | Ohata et al. | |
| 5,867,501 A | 2/1999 | Horst et al. | |
| 5,884,299 A | 3/1999 | Ramesh et al. | |
| 5,890,151 A | 3/1999 | Agrawal et al. | |
| 5,890,154 A | 3/1999 | Hsiao et al. | |
| 5,901,287 A | 5/1999 | Bull et al. | |
| 5,905,985 A | 5/1999 | Malloy et al. | |
| 5,915,257 A | 6/1999 | Gartung et al. | |
| 5,918,225 A | 6/1999 | White et al. | |
| 5,918,232 A | 6/1999 | Pouschine et al. | |
| 5,926,818 A | 7/1999 | Malloy | |
| 5,926,820 A | 7/1999 | Agrawal et al. | |
| 5,937,410 A | 8/1999 | Shen | |
| 5,940,818 A | 8/1999 | Malloy et al. | |
| 5,940,822 A | 8/1999 | Haderie et al. | |
| 5,943,668 A | 8/1999 | Malloy et al. | |
| 5,943,677 A | 8/1999 | Hicks | |
| 5,946,692 A | 8/1999 | Faloutsos et al. | |
| 5,946,711 A | 8/1999 | Donnelly | |
| 5,963,212 A | 10/1999 | Bakalash | |
| 5,963,936 A | 10/1999 | Cochrane et al. | |
| 5,974,416 A | 10/1999 | Anand et al. | |
| 5,978,788 A | 11/1999 | Castelli et al. | |
| 5,978,796 A | 11/1999 | Malloy et al. | |
| 5,987,467 A | 11/1999 | Ross et al. | |
| 5,990,892 A | 11/1999 | Urbain | |
| 5,991,754 A | 11/1999 | Raitto et al. | |
| 5,999,192 A | 12/1999 | Selfridge et al. | |
| 6,003,024 A | 12/1999 | Bair et al. | |
| 6,003,029 A | 12/1999 | Agrawal et al. | |
| 6,003,036 A | 12/1999 | Martin | |
| 6,006,216 A | 12/1999 | Griffin et al. | |
| 6,009,432 A | 12/1999 | Tarin | |
| 6,014,670 A | 1/2000 | Zamanian et al. | |
| 6,023,695 A | 2/2000 | Osborn et al. | |
| 6,034,697 A | 3/2000 | Becker | |
| 6,041,103 A | 3/2000 | LePorta et al. | |
| 6,047,323 A * | 4/2000 | Krause | 709/227 |
| 6,064,999 A | 5/2000 | Dalal | |
| 6,073,140 A | 6/2000 | Morgan et al. | |
| 6,078,918 A | 6/2000 | Allen et al. | |
| 6,078,924 A | 6/2000 | Ainsbury et al. | |
| 6,078,994 A | 6/2000 | Carey | |
| 6,094,651 A | 7/2000 | Agrawal et al. | |
| 6,108,647 A | 8/2000 | Poosala et al. | |
| 6,115,705 A | 9/2000 | Larson | |
| 6,115,714 A | 9/2000 | Gallagher et al. | |
| 6,122,628 A | 9/2000 | Castelli et al. | |
| 6,122,636 A | 9/2000 | Malloy et al. | |
| 6,125,624 A | 10/2000 | Prociw | |
| 6,134,541 A | 10/2000 | Castelli et al. | |
| 6,141,655 A | 10/2000 | Johnson et al. | |
| 6,151,584 A | 11/2000 | Papierniak et al. | |
| 6,151,601 A | 11/2000 | Papierniak et al. | |
| 6,154,766 A | 11/2000 | Yost et al. | |
| 6,161,103 A | 12/2000 | Rauer et al. | |
| 6,163,774 A | 12/2000 | Lore et al. | |
| 6,167,396 A | 12/2000 | Lokken | |
| 6,173,310 B1 | 1/2001 | Yost et al. | |
| 6,182,060 B1 | 1/2001 | Hedgcock et al. | |
| 6,182,061 B1 | 1/2001 | Matsuzawa et al. | |
| 6,182,062 B1 | 1/2001 | Fujisawa et al. | |
| 6,189,004 B1 | 2/2001 | Rasen et al. | |
| 6,199,063 B1 | 3/2001 | Colby et al. | |
| 6,205,447 B1 | 3/2001 | Malloy | |
| 6,208,975 B1 | 3/2001 | Bull et al. | |
| 6,209,036 B1 | 3/2001 | Aldred et al. | |
| 6,212,515 B1 | 4/2001 | Rogers | |
| 6,212,524 B1 | 4/2001 | Weissman et al. | |
| 6,212,617 B1 | 4/2001 | Hardwick | |
| 6,219,654 B1 | 4/2001 | Ruffin | |
| 6,223,573 B1 | 5/2001 | Grewal et al. | |
| 6,226,647 B1 | 5/2001 | Venkatasu-bramanian et al. | |
| 6,249,791 B1 | 6/2001 | Osborn et al. | |
| 6,256,676 B1 | 7/2001 | Taylor et al. | |
| 6,260,050 B1 | 7/2001 | Yost et al. | |
| 6,269,393 B1 | 7/2001 | Yost et al. | |
| 6,275,818 B1 | 8/2001 | Subramanian et al. | |
| 6,282,544 B1 | 8/2001 | Tse et al. | |
| 6,282,546 B1 | 8/2001 | Gleichauf et al. | |
| 6,285,994 B1 | 9/2001 | Bui et al. | |
| 6,289,334 B1 | 9/2001 | Reiner et al. | |
| 6,289,352 B1 | 9/2001 | Proctor | |
| 6,301,579 B1 | 10/2001 | Becker | |
| 6,317,750 B1 | 11/2001 | Tortolani et al. | |
| 6,321,206 B1 | 11/2001 | Honarvar | |
| 6,321,241 B1 | 11/2001 | Gartung et al. | |
| 6,324,533 B1 | 11/2001 | Agrawal et al. | |
| 6,324,623 B1 | 11/2001 | Carey | |
| 6,330,564 B1 | 12/2001 | Hellerstein et al. | |
| 6,332,130 B1 | 12/2001 | Notani et al. | |
| 6,339,775 B1 | 1/2002 | Zamanian et al. | |
| 6,356,900 B1 | 3/2002 | Egilsson et al. | |
| 6,363,353 B1 | 3/2002 | Chen | |
| 6,363,393 B1 | 3/2002 | Ribitzky | |
| 6,366,905 B1 | 4/2002 | Netz | |
| 6,366,922 B1 | 4/2002 | Althoff | |
| 6,374,234 B1 | 4/2002 | Netz | |
| 6,374,263 B1 | 4/2002 | Bunger et al. | |
| 6,377,934 B1 | 4/2002 | Chen et al. | |
| 6,381,605 B1 | 4/2002 | Kothuri et al. | |

| Patent | Kind | Date | Name | Ref |
|---|---|---|---|---|
| 6,385,301 | B1 | 5/2002 | Nolting et al. | |
| 6,385,604 | B1 * | 5/2002 | Bakalash et al. | 707/999.003 |
| 6,397,195 | B1 | 5/2002 | Pinard et al. | |
| 6,401,117 | B1 | 6/2002 | Narad et al. | |
| 6,405,173 | B1 | 6/2002 | Honarvar et al. | |
| 6,405,207 | B1 | 6/2002 | Petculescu et al. | |
| 6,405,208 | B1 | 6/2002 | Raghavan et al. | |
| 6,408,292 | B1 * | 6/2002 | Bakalash et al. | 707/999.002 |
| 6,411,313 | B1 | 6/2002 | Conlon et al. | |
| 6,411,681 | B1 | 6/2002 | Nolting et al. | |
| 6,411,961 | B1 | 6/2002 | Chen et al. | |
| 6,418,427 | B1 | 7/2002 | Egilsson et al. | |
| 6,418,450 | B2 | 7/2002 | Daudenarde | |
| 6,421,730 | B1 | 7/2002 | Narad et al. | |
| 6,424,972 | B1 | 7/2002 | Berger et al. | |
| 6,424,979 | B1 | 7/2002 | Livingston et al. | |
| 6,430,545 | B1 | 8/2002 | Honarvar et al. | |
| 6,430,547 | B1 | 8/2002 | Busche et al. | |
| 6,434,544 | B1 * | 8/2002 | Bakalash et al. | 707/999.002 |
| 6,434,557 | B1 | 8/2002 | Egilsson et al. | |
| 6,438,537 | B1 | 8/2002 | Netz et al. | |
| 6,441,834 | B1 * | 8/2002 | Agassi et al. | 715/764 |
| 6,442,269 | B1 | 8/2002 | Ehrlich et al. | |
| 6,442,560 | B1 | 8/2002 | Berger et al. | |
| 6,446,059 | B1 | 9/2002 | Berger et al. | |
| 6,446,061 | B1 | 9/2002 | Doerre et al. | |
| 6,453,322 | B1 | 9/2002 | DeKimpe et al. | |
| 6,456,999 | B1 | 9/2002 | Netz | |
| 6,460,026 | B1 | 10/2002 | Pasumansky | |
| 6,460,031 | B1 | 10/2002 | Wilson et al. | |
| 6,470,344 | B1 | 10/2002 | Kothuri et al. | |
| 6,473,750 | B1 | 10/2002 | Petculescu et al. | |
| 6,473,764 | B1 | 10/2002 | Petculescu et al. | |
| 6,477,536 | B1 | 11/2002 | Pasumansky et al. | |
| 6,480,842 | B1 * | 11/2002 | Agassi et al. | 707/999.004 |
| 6,480,848 | B1 | 11/2002 | DeKimpe et al. | |
| 6,480,850 | B1 | 11/2002 | Veldhuisen | |
| 6,484,179 | B1 * | 11/2002 | Roccaforte | 707/737 |
| 6,487,547 | B1 | 11/2002 | Ellison et al. | |
| 6,493,718 | B1 | 12/2002 | Petculescu et al. | |
| 6,493,723 | B1 | 12/2002 | Busche | |
| 6,493,728 | B1 | 12/2002 | Berger | |
| 6,510,457 | B1 | 1/2003 | Ayukawa et al. | |
| 6,513,019 | B2 | 1/2003 | Lewis | |
| 6,532,458 | B1 | 3/2003 | Chaudhuri et al. | |
| 6,532,459 | B1 | 3/2003 | Berson | |
| 6,535,866 | B1 | 3/2003 | Iwadate | |
| 6,535,868 | B1 | 3/2003 | Galeazzi et al. | |
| 6,535,872 | B1 | 3/2003 | Castelli et al. | |
| 6,542,886 | B1 | 4/2003 | Chaudhuri et al. | |
| 6,542,895 | B1 | 4/2003 | DeKimpe et al. | |
| 6,545,589 | B1 | 4/2003 | Fuller et al. | |
| 6,546,395 | B1 | 4/2003 | DeKimpe et al. | |
| 6,546,545 | B1 | 4/2003 | Honarvar et al. | |
| 6,549,907 | B1 | 4/2003 | Fayyad et al. | |
| 6,557,008 | B1 | 4/2003 | Temple et al. | |
| 6,560,594 | B2 | 5/2003 | Cochrane et al. | |
| 6,567,796 | B1 | 5/2003 | Yost et al. | |
| 6,567,814 | B1 | 5/2003 | Bankier et al. | |
| 6,581,054 | B1 | 6/2003 | Bogrett | |
| 6,581,068 | B1 | 6/2003 | Bensoussan et al. | |
| 6,587,547 | B1 | 7/2003 | Zirngibl et al. | |
| 6,587,857 | B1 | 7/2003 | Carothers et al. | |
| 6,594,672 | B1 | 7/2003 | Lampson et al. | |
| 6,601,034 | B1 | 7/2003 | Honarvar et al. | |
| 6,601,062 | B1 | 7/2003 | Deshpande | |
| 6,604,135 | B1 | 8/2003 | Rogers et al. | |
| 6,606,638 | B1 | 8/2003 | Tarin | |
| 6,609,120 | B1 | 8/2003 | Honarvar et al. | |
| 6,615,096 | B1 | 9/2003 | Durrant et al. | |
| 6,628,312 | B1 | 9/2003 | Rao et al. | |
| 6,629,094 | B1 | 9/2003 | Colby | |
| 6,633,875 | B2 | 10/2003 | Brady | |
| 6,636,870 | B2 * | 10/2003 | Roccaforte | 707/999.104 |
| 6,643,608 | B1 | 11/2003 | Hershey et al. | |
| 6,643,661 | B2 | 11/2003 | Polizzi et al. | |
| 6,662,174 | B2 | 12/2003 | Shah et al. | |
| 6,665,682 | B1 | 12/2003 | DeKimpe et al. | |
| 6,671,715 | B1 | 12/2003 | Langseth et al. | |
| 6,677,963 | B1 | 1/2004 | Mani et al. | |
| 6,678,674 | B1 | 1/2004 | Saeki | |
| 6,691,118 | B1 | 2/2004 | Gongwer et al. | |
| 6,691,140 | B1 | 2/2004 | Bogrett | |
| 6,694,316 | B1 | 2/2004 | Langseth et al. | |
| 6,707,454 | B1 | 3/2004 | Barg et al. | |
| 6,708,155 | B1 | 3/2004 | Honarvar et al. | |
| 6,732,115 | B2 | 5/2004 | Shah et al. | |
| 6,738,975 | B1 | 5/2004 | Yee et al. | |
| 6,748,394 | B2 | 6/2004 | Shah et al. | |
| 6,763,357 | B1 | 7/2004 | Deshpande et al. | |
| 6,766,325 | B1 | 7/2004 | Pasumansky et al. | |
| 6,775,674 | B1 * | 8/2004 | Agassi et al. | 707/999.1 |
| 6,778,996 | B2 * | 8/2004 | Roccaforte | 707/600 |
| 6,801,908 | B1 | 10/2004 | Fuloria et al. | |
| 6,816,854 | B2 | 11/2004 | Reiner et al. | |
| 6,826,593 | B1 | 11/2004 | Acharya et al. | |
| 6,832,263 | B2 | 12/2004 | Polizzi et al. | |
| 6,836,894 | B1 | 12/2004 | Hellerstein et al. | |
| 6,842,758 | B1 | 1/2005 | Bogrett | |
| 6,867,788 | B1 | 3/2005 | Takeda | |
| 6,898,603 | B1 | 5/2005 | Petculescu et al. | |
| 6,934,687 | B1 | 8/2005 | Papierniak et al. | |
| 6,947,934 | B1 | 9/2005 | Chen et al. | |
| 7,096,219 | B1 * | 8/2006 | Karch | 707/999.003 |
| 7,315,849 | B2 * | 1/2008 | Bakalash et al. | 707/999.002 |
| 7,333,982 | B2 * | 2/2008 | Bakalash et al. | 707/600 |
| 7,392,248 | B2 * | 6/2008 | Bakalash et al. | 707/999.005 |
| 7,529,730 | B2 | 5/2009 | Potter et al. | |
| 7,778,899 | B2 | 8/2010 | Scumniotales et al. | |
| 7,853,508 | B2 | 12/2010 | Scumniotales et al. | |
| 8,041,670 | B2 | 10/2011 | Bakalash et al. | |
| 8,170,984 | B2 | 5/2012 | Bakalash et al. | |
| 8,195,602 | B2 | 6/2012 | Bakalash et al. | |
| 2001/0013030 | A1 * | 8/2001 | Colby et al. | 707/1 |
| 2001/0018684 | A1 * | 8/2001 | Mild et al. | 707/1 |
| 2001/0047355 | A1 | 11/2001 | Anwar | |
| 2002/0016924 | A1 | 2/2002 | Shah et al. | |
| 2002/0023122 | A1 | 2/2002 | Polizzi et al. | |
| 2002/0029207 | A1 * | 3/2002 | Bakalash et al. | 707/1 |
| 2002/0038229 | A1 | 3/2002 | Shah et al. | |
| 2002/0038297 | A1 | 3/2002 | Shah et al. | |
| 2002/0077997 | A1 * | 6/2002 | Colby et al. | 707/1 |
| 2002/0091707 | A1 * | 7/2002 | Keller | 707/104.1 |
| 2002/0099692 | A1 | 7/2002 | Shah et al. | |
| 2002/0129003 | A1 * | 9/2002 | Bakalash et al. | 707/1 |
| 2002/0129032 | A1 * | 9/2002 | Bakalash et al. | 707/101 |
| 2002/0143783 | A1 * | 10/2002 | Bakalash et al. | 707/100 |
| 2002/0184187 | A1 * | 12/2002 | Bakalash et al. | 707/1 |
| 2002/0194167 | A1 * | 12/2002 | Bakalash et al. | 707/3 |
| 2003/0018642 | A1 * | 1/2003 | Bakalash et al. | 707/10 |
| 2003/0055832 | A1 * | 3/2003 | Roccaforte | 707/100 |
| 2003/0105658 | A1 | 6/2003 | Chen et al. | |
| 2003/0200221 | A1 * | 10/2003 | Bakalash et al. | 707/100 |
| 2003/0208503 | A1 * | 11/2003 | Roccaforte | 707/101 |
| 2003/0217079 | A1 * | 11/2003 | Bakalash et al. | 707/200 |
| 2003/0225736 | A1 * | 12/2003 | Bakalash et al. | 707/1 |
| 2003/0225752 | A1 * | 12/2003 | Bakalash et al. | 707/3 |
| 2003/0229652 | A1 * | 12/2003 | Bakalash et al. | 707/200 |
| 2004/0073566 | A1 | 4/2004 | Trivedi | |
| 2004/0236655 | A1 | 11/2004 | Scumniotales et al. | |
| 2004/0243607 | A1 * | 12/2004 | Tummalapalli | 707/100 |
| 2004/0247105 | A1 | 12/2004 | Mullis et al. | |
| 2005/0038799 | A1 | 2/2005 | Jordan et al. | |
| 2005/0055329 | A1 * | 3/2005 | Bakalash et al. | 707/1 |
| 2005/0060325 | A1 * | 3/2005 | Bakalash et al. | 707/100 |
| 2005/0060326 | A1 * | 3/2005 | Bakalash et al. | 707/100 |
| 2005/0065940 | A1 * | 3/2005 | Bakalash et al. | 707/100 |
| 2005/0076067 | A1 * | 4/2005 | Bakalash et al. | 707/200 |
| 2005/0091237 | A1 * | 4/2005 | Bakalash et al. | 707/100 |
| 2005/0114243 | A1 | 5/2005 | Scumniotales et al. | |
| 2005/0149491 | A1 * | 7/2005 | Bakalash et al. | 707/2 |
| 2007/0192295 | A1 * | 8/2007 | Bakalash et al. | 707/3 |
| 2007/0233644 | A1 * | 10/2007 | Bakalash et al. | 707/2 |
| 2008/0016043 | A1 * | 1/2008 | Bakalash et al. | 707/3 |
| 2008/0016057 | A1 * | 1/2008 | Bakalash et al. | 707/5 |
| 2008/0021864 | A1 * | 1/2008 | Bakalash et al. | 707/1 |
| 2008/0021893 | A1 * | 1/2008 | Bakalash et al. | 707/4 |
| 2008/0021915 | A1 * | 1/2008 | Bakalash et al. | 707/101 |

| | | | |
|---|---|---|---|
| 2008/0059415 A1* | 3/2008 | Bakalash et al. | 707/2 |
| 2008/0211817 A1* | 9/2008 | Bakalash et al. | 345/505 |
| 2009/0076983 A1 | 3/2009 | Scumniotales et al. | |
| 2009/0077107 A1 | 3/2009 | Scumniotales et al. | |
| 2009/0271379 A1 | 10/2009 | Bakalash et al. | |
| 2009/0271384 A1 | 10/2009 | Bakalash et al. | |
| 2009/0276410 A1 | 11/2009 | Bakalash et al. | |
| 2010/0042645 A1 | 2/2010 | Bakalash et al. | |
| 2010/0063958 A1 | 3/2010 | Bakalash et al. | |
| 2010/0100558 A1 | 4/2010 | Bakalash et al. | |
| 2010/0185581 A1 | 7/2010 | Bakalash et al. | |
| 2012/0089563 A1 | 4/2012 | Bakalash et al. | |
| 2012/0089564 A1 | 4/2012 | Bakalash et al. | |

FOREIGN PATENT DOCUMENTS

| | | |
|---|---|---|
| EP | 0 743 609 | 11/1996 |
| EP | 0336 584 | 2/1997 |
| EP | 0 869 444 | 10/1998 |
| EP | 1 266 308 | 12/2002 |
| JP | 9-265479 | 10/1997 |
| JP | 2001-565050 | 2/2001 |
| WO | WO 91/19269 | 12/1991 |
| WO | WO 94/04991 | 3/1994 |
| WO | WO 95/08794 | 3/1995 |
| WO | WO 98/22908 | 5/1998 |
| WO | WO 9822908 A1 * | 5/1998 |
| WO | WO 98/40829 | 9/1998 |
| WO | WO 98/49636 | 11/1998 |
| WO | WO 99/09492 | 2/1999 |
| WO | WO 01/11497 | 2/2001 |
| WO | WO 01/67303 | 9/2001 |

OTHER PUBLICATIONS

Mumick, I.S., D. Quass and B.S. Mumick "Maintenance of Data Cubes and Summary Tables ina Data Warehouse", ACM SIGMOD Record, vol. 26, No. 2, Jun. 1997, pp. 100-111.*
Kotidis, Y. and N. Roussopoulos "DynaMat: A Dynamic View Management System for Data Warehouses", Proceedings of ACM SIGMOD International Conference on Management of Data, Jun. 1-3, 1999.*
comp.databases' website re Access DBMS? Not RDBMS? Jun. 1994.
Rana, et al., A Distributed Framework for Parallel Data Mining Using HP Java, BT technol J vol. 17 No. 3 Jul. 1999.
Rana, et al., A Distributed Framework for Parallel Data Mining Using HP Java, BT technol J vol. 17 No. 3 Jul. 1999. pp. 146-154.
Schumacher, Robin. BrioOuery Enterprise 4.0; Brio Technology's desktop OLAP tool, lexis.com; DBMS Magazine, vol. 9, No. 10, Sep. 1996.
Michael, J., et al. DM Review's website re Charles Schwab Plans for Continued Prosperity with Seagate Holos Oct. 1998.
Craig, Robert. Checking out OLAP Architectures; Technology Information.lexis, vol. 2, No. 12, Aug. 20, 1997.
Craig, Robert: "Checking Out OLAP Architectures: Technology Information", a Boucher Communications, Inc. publication, Section No. 12, nol. 2; 1997; p. 40, ISSN: 1085-2395.
Spitzer, Tom. Component architectures; component-based software development; technology information, Lexis, DBMS Magazine, vol. 10, No. 10, Sep. 1997.
Winter, R., Intelligent Enterprise's website re Databases: Back in the OLAP Game, vol. 1, No. 4, Dec. 15, 1998.
Kurz, Andreas, A Min Tjoa, Data Warehousing within Intranet: Prototype of a Web•based Executive Information System, Abstract, 1997.
Kurz, Andreas, A Min Tjoa, Data Warehousing within Intranet: Prototype of a Web•based Executive Information System, Abstract, 1997. pp. 627-632.
Elkins, S.B.. Islands of OLAP, DBMS Magazine, Apr. 1998.
Mckie, S., dbmsmag's website re What's New in 4.0, DBMS Magazine, Jul. 1996.
Bontempo et al., The IBM Data Warehouse Architecture, Communications of the ACM (vol. 41 No. 9), Sep. 1998.
Bontempo et al., The IBM Data Warehouse Architecture, Communications of the ACM (vol. 41 No. 9), Sep. 1998. pp. 38-48.
Davis, Judith. IBM's DB2 Spatial Extender: Managing Geo-Spatial Information Within the DBMS, IBM corporation, May 1998.
Information Builders Intros "Fusion" MODS Warehouse, Post•Newsweek Business Information Inc. Lexis, May 16, 1996.
Chen et al., OLAP-Based Scalable Profiling of Customer Behavior, Abstract, 1999.
Chen et al., OLAP-Based Scalable Profiling of Customer Behavior, Abstract, DaWak '99 LNCS 1676 pp. 55-64 1999.
Pendse, N., The OLAP Report's website OLAP Architectures, 2005.
Pendse, N., The OLAP Report's website OLAP Architectures, Feb. 11, 2005.
Greenberg, Ilan. OLAP or ROLAP, InfoWorld, Jun. 10, 1996.
Pendse, N. The OLAP Report's website re Database Explosion, 1998.
Pendse, N. The OLAP Report's website re Database Explosion, Oct. 18, 1998.
Comp.databases' website re OLAP Storage Algorithms, 1997.
Comp.databases' website re OLAP Storage Algorithms, Comp. databases.olap newsgroup thread Apr. 1, 1997.
Biggs, Maggie. Pilot lands Impressive OLAP Suite, Product Reviews, Infoworld, vol. 20, No. 36, Sep. 7, 1998.
Codd et al., Providing OLAP to User-Analysts: An IT Mandate. Hyperion Solutions Corporation 1993.
Harrington, et al.: "Relational Database Design Clearly Explained", 1998, p. v-xiii, 1-62, Morgan Kaufman.
blgate.c1's website re Seagate Holos Roadmap 1997.
Yoshizawa et al., Sal Based Association Rule Mining Using Commercial RDBMS (IBM DB2 UDB EEE) Abstract, 2000.
Yoshizawa et al., SQL Based Association Rule Mining Using Commericial RDBMS (IBM DB2 UDB EEE) Da Wak 2000 LNCS 1874 pp. 301-306 2000.
Spinner, Karen. Unlocking the Data Warehouse with OLAP, Wall Street & Technology, vol. 15, No. 1, Jan. 1, 1997, p. PD18.
Taylor, The Warehouse Meets the Web, The Data Administration Newsletter (Mar. 21, 2005).
Nadeau et al., Achieving Scalability in OLAP Materialized View Selection (Extended Version), (2002).
Nadeau et al., Achieving Scalaboloty in OLAP Materialized View Selection (Extended Version, (2002) Proceedings of DOLAP '02 Nov. 8, 2002.
Whitney, R. Windows IT Pro Webs ite Page re: SOL Server Analysis Services 8.0, May 2000.
Radsen, Boost Warehouse Performance Technology Tutorial Part II (2002).
Rowe et al., Data Abstration, Views and Updates in Rigel (1979).
Rowe, et al., "Data Abstraction, Views and Updates in Rigel", Proceedings of the 1979 ACM SIGMOD International Conference on Management of Data, pp. 71-81, 1979.
Graefe, DataCube: An Integrated Data and Compute Server Based on a Hypercube-Connected Dataflow Database Machine, Oregon Graduate Center (Jul. 1988).
Berson and Smith, Data Warehousing, Data Mining, and OLAP, McGraw-Hill Companies, 1997, pp. 104-107.
Berson and Smith, Data Warehousing, Data Mining, and OLAP, McGraw-Hill Companies, 1997, pp. 98-100.
Watterson, K. Windows IT Pro Website Page re: DB2 OLAP Server 1.0, Sep. 1998.
Kalman, D. et al., DBMS Online's website re Sybase Inco's Dennis McEvoy—System 11 Strategy, Oct. 1995.
Mohan, DWMS: Data Warehousing Management System, Software AG of Far East, Inc., Proceedings of the 22nd VLDB Conference, 1996, pp. 588-.
sbt's website re Data Management—A Bedtime Story for Database Managers 1990.
Data Sheet—Designed and Optimized for Business-Critical Data Warehousing, Informix Red Brick Warehouse 1999.
Website re Introduction to OLE DB for OLAP, 2005.
Microsoft website re Introduction to OLE DB for OLAP 2005.
Lau., Microsoft SQL Server 7.0 Performance Tuning Guide, SQL7 performance tuning.doc, Oct. 1998.
Lyco's website re prices on Microsoft SQL Server 7.0 for PC Sep. 11, 2005.

Gimarc and Spellman., Modeling Microsoft SQL Server 7.0, Abstract—SES Proceedings of CMG '98, Dec. 6-11, 1998.

Andrews, D. byte's website re Jeff Stamen, senior vice president of Oracle's OLAP division, discusses the convergence of multidimensional and relational OLAP databases, Aug. 1996.

Margaritis et al. Netcube: A Scalable Tool for Fast Data Mining and Compression Abstract—Carnegie Mellon University Proceedings of the 27th VLDB Conference 2001.

Pfeiff, B., Windowsitpro's website re OLAP: Resistance is Futile!, Apr. 1999.

Database olap's website re OLAP with Regression Analysis, Built for Analysts? Jun. 1990.

Brain, J. comp.databases.olap's newsgroup thread databases.olapss website re OLAP with Regression Analysis, Built for Analysts? Jun. 17, 1996.

Elkins., Open OLAP, DBMS, Apr. 1998.

Elkins., Open OALP, DBMS, Apr. 1998, http://www.dbmsmag.com/9804d14.html, pp. 1-7.

Endress., Oracle 9i OLAP Release 2: A Relational-Multidimensional Database for Business Intelligence, Oracle Apr. 2001.

Oracle Express Relational Access Manager, A Source-Transparent Decision Support Solution 1998.

Oracle Express Server, Enhanced Corporate Performance 1998.

White Paper—Delivering OLAP to the Enterprise. Oracle Jan. 1997.

databases.olap's website re Oracle for reporting?, Nov. 2002.

comp.databases.olap newsgroup thread databases.olap's website re Oracle for reporting? Nov. 7, 2002.

PartitionAggregationss7.txt May 11, 2005.

Lexis—Red Brick, Accrue to embed Red Brick Warehouse RDBMS in online user response analysis system, M2 Presswire Dec. 11, 1996.

Colby, et al.: "Red Brick Vista™: Aggregate Computation and Management", Data Engineering, 1998. Proceedings, 14th International Conference on Orlando, FL, USA Feb. 23-27, 1998, Los Alamitos, CA USA, IEEE Comput. Soc, US, Feb. 23, 1998, pp. 174-177.

DBMS online's website re Red Brick Warehouse 5.1, Relational data warehousing and data mining are reaching new heights, Jun. 1998.

Rennhackkamp, J, DBMS online's website re Red Brick Warehouse 5.1, Relational data warehousing and data mining are reaching new heights Jun. 1998.

White Paper—Extending the Scale, Reach, and Range of Your Data Warehouse, Next-Generation Data Warehousing, Sybase Interactive Warehouse 1997.

DBMSmag's website re A Black Eye Heals as Sybase System 11 Recovers from Performance and Quality Problems in System 10, Nov. 1996.

DBMSmag's website re A Black Eye Heals as Sybase System 11 Recovers from Performance and Quality Problems in System 10, DMBS Magazine Nov. 1996.

Rennhackkamp, M. DBMSmag's website re A Black Eye Heals as Sybase 11Recovers from Performance and Quality Problems in System Nov. 10, 1996.

DBMS online's website re An Interactive Warehousing Architecture Can Extend the Scale of Your Information, Aug. 1997.

DBMS online's website re An Interactive Warehousing Architecture Can Extend the Scale of Your Information, DMBS Magazine, Aug. 1997.

Rennhackkamp, M. DBMS online's website re An Interactive Warehousing Architecture Can Extend the Scale of Your Information Aug. 1997.

Lexis—The Informix Enterprise Strategy, Information Access Company, DBMS Magazine, vol. 9, No. 7, p. 42, Jun. 1996.

McKie, S.—The Informix Enterprise Strategy, Information Access Company, DBMS Magazine vol. 9 No. 7 p. 42 Jun. 1996.

McKie, S.—The Informix Enterprise Strategy, Information Access Company, A Thomson Corporation, DBMS Magazine vol. 9 No. 7 p. 42 Jun. 1996.

Campbell, The New locking, logging, and Recover Architecture of Microsoft SQL Server 7.0, Microsoft Corporation, Proceeding of the 25th VLDB Conference, 1999.

Campbell, The New locking, Logging, and Recover Architecture of Microsoft SQL Server 7.0, Microsoft Corporation, Proceeding of the 25th VLDB Conference, 1999 p. 249.

Rigney, T., DBMS online's website re The Sybase Enterprise, May 1996.

Raden, Worlds in Collision, Merging Business and IT Architecture Perspectives to Evaluate Query and Analysis Tools Successfully, DBMS Magazine, Aug. 1997.

Nadeau & Teorey, Achieving Scalability in OLAP Materialized View Selection, DOLAP 02.

Nadeau & Teorey, Achieving Scalability in OLAP Materialized View Selection, DOLAP 02 Nov. 8, 2002.

Buzydlowski et al., A Framework for Object-Oriented On-Line Analytic Processing, Abstract—DOLAP Proceedings of DOLAP '98, 1998.

Buzydlowski et al., A Framework for Object-Oriented On-Line Analytic Processing, Abstract—DOLAP Proceedings of DOLAP '98, Nov. 7, 1998, pp. 10-15.

Buzydlowski et al., A Framework for Object-Oriented On-Line Analytic Processing, Abstract—DOLAP, 1998.

Liu and Ursu, A Framework for Global Optimization of Aggregate Queries, Abstract—CIKM Proceedings of CIKM '97, 1997.

Liu and Ursu, A Framework for Global Optimization of Aggregate Queries, Abstract—CIKM Proceedings of CIKM '97, pp. 262-269.

Mangisengi., A Multidimensional Modeling Approach for OLAP within the Framework of the Relational Model Based on Quotient Relations, Abstract—DOLAP, 1998.

Mangisengi., A Multidimensional Modeling Approach for OLAP within the Framework of the Relational Model Based on Quotient Relations, Abstract—DOLAP Proceedings of DOLAP '98, 1998.

Mangisengi., A Multidimensional Modeling Approach for OLAP within the Framework of the Relational Model Based on Quotient Relations, Abstract—DOLAP Proceedings of DOLAP '98, pp. 40-46.

Trujillo et al., An Object Oriented Approach to Multidimensional Database Conceptual Modeling (OOMD), Abstract—DOLAP, 1999.

Trujillo et al, An Object Oriented Approach to Multidimensional Database Conceptual Modeling (OOMD), Abstract—DOLAP Proceedings of DOLAP '98 1999.

Trujillo et al, An Object Oriented Approach to Multidimensional Database Conceptual Modeling (OOMD), Abstract—DOLAP Proceedings of DOLAP '98, pp. 16-21.

Bose and Sugumaran., Application of Intelligent Agent Technology for Managerial Data Analysis and Mining, Abstract• Data Base, The Data Base for Advances in Information Systems, vol. 30, No. 1, Winter 1999.

Bose and Sugumaran., Application of Intelligent Agent Technology for Managerial Data Analysis and Mining, Abstract• Data Base, The Data Base for Advances in Information Systems, vol. 30, No. 1, Winter 1999 pp. 77-94.

Damiani and Bottarelli, A Terminological Approach to Business Domain Modeling, Abstract—EEC Proceedings of the International Conference on Database and Expert Systems 1990.

Damiani and Bottarelli, A Terminological Approach to Business Domain Modeling, Abstract—EEC Proceedings of the International Conference on Database and Expert Systems 1990 pp. 340-345.

DeWitt et al., Client-Server Paradise, Abstract, Proceedings of the 20th VLDB Conference 1994.

DeWitt et al., Client-Server Paradise, Abstract, Proceedings of the 20th VLDB Conference 1994 pp. 558-569.

McFadden., Data Warehouse for EIS: Some Issues and Impacts, Abstract—IEEE 1996 pp. 120-129.

McFadden., Data Warehouse for EIS: Some Issues and Impacts, Abstract—IEEE 1996 Proceedings of the 29th Hawaii Conference on Systems Sciences.

Cheung et al., DROLAP—A Dense-Region Based Approach to On-Line Analytical Processing, Abstract•DEXA '99.

Cheung et al., DROLAP—A Dense-Region Based Approach to On-Line Analytical Processing, Abstract•DEXA '99, LNCS 1677 pp. 761-770 1999.

Kotidis, Y. and N. Roussopoulos "DynaMat: A Dynamic View of Management System for Data Warehouses", Proceedings of ACM SIGMOD International Conference on Management of Data, Jun. 1-3, 1999.

Sun and Grosky., Dynamic Maintenance of Multidimensional Range Data Partitioning for Parallel Data Processing, Abstract—DOLAP '98.
Sun and Grosky., Dynamic Maintenance of Multidimensional Range Data Partitioning for Parallel Data Processing, Abstract—DOLAP '98 pp. 72-79.
Peneva and Angelova., End-User Interface to Improve Microcomputer DBMS Efficiency, Abstract Proceedings of the International Conference on Database and Expert System Applications 1991.
Rundensteiner and Sic., Evaluating Aggregates in Possibilistic Relational Databases, Abstract, Jan. 1991.
Hsiao et al., The Federated Databases and System: A New Generation of Advanced Database System, Abstract Proceeding of DEXA '90.
Hsiao et al., The Federated Databases and System: A New Generation of Advanced Database System, Abstract Proceeding of DEXA '90 1990 pp. 186-190.
Eder., General Transitive Closures and Aggregate Functions, Abstract, 1991.
Eder., General Transitive Closures and Aggregate Functions, Abstract Proceedings of DEXA '91., 1991.
Eder., General Transitive Closures and Aggregate Functions, Abstract Proceedings of DEXA '91., 1991 pp. 54-59.
Goil and Choudhary, High Performance Data Mining Using Data Cubes on Parallel Computers, Abstract—IEEE 1998.
Goil and Choudhary, High Performance Data Mining Using Data Cubes on Parallel Computers, Abstract—IEEE 1998 pp. 548-555.
Goil and Choudhary, High Performance Multidimensional Analysis of Large Datasets, Abstract—DOLAP '98 1998.
Goil and Choudhary, High Performance Multidimensional Analysis of Large Datasets, Abstract—DOLAP '98 1998 pp. 34-39.
Muto and Kitsuregawa, Improving Main Utilization for Array-Based Datacube Computation, Abstract—DOLAP '98.
Muto and Kitsuregawa, Improving Main Utilization for Array-Based Datacube Computation, Abstract—DOLAP '98 1998 pp. 28-33.
Nestorov and Tsur, Integrating Data Mining with Relational DBMS: A Tightly-Coupled Approach, Abstract—NGITS, 1999.
Nestorov and Tsur, Integrating Data Mining with Relational DBMS: A Tightly-Coupled Approach, Abstract—NGITS 99, L.Nes 1649 pp. 295-311 1999.
Fernandez-Baizan et al., Integrating KDD Algorithms and RDBMS Code, Abstract Proceedings of RSCTC '98.
Fernandez-Baizan et al., Integrating KDD Algorithms and RDBMS Code, Abstract Proceedings of RSCTC '98 pp. 210-213 1998.
Andlinger et al., Making C++ Object Persistent by Using a Standard Relational Database System Proceedings of DEXA '91.
Andlinger et al., Making C++ Object Persistent by Using a Standard Relational Database System Proceedings of DEXa '91. 1991 pp. 374-379.
Rafanelli and Ricci, Mefisto: a Functional Model for Statistical Entities, IEEE, 1993.
Rafanelli and Ricci, Mefisto: A Functional Model for Statistical Entities, IEEE Jul. 16, 1992 pp. 670-681.
Gunzel et al., Modeling of Census Data in a Multidimensional Environment, Springer, Sep. 1998.
Gunzel et al., Modeling of Census Data in a Multidimensional Environmental. Sorinzer Procccdinus of ADBIS '98 Sep. 7-10, 1998.
Gunzel et al., Modeling of Census Data in a Multidimensional Environmental. Sorinzer Procccdinus of ADBIS '98 Sep. 7-10, 1998 pp. 363-368.
SAP Multi-Dimensional Modeling with BW, ASAP for BW Accelerator—A background to the techniques used to create SAP BW InfoCubes Document Version 2.0 2000.
Gingras and Lakshmanan, nD-SQL: A Multi-Dimensional language for Interoperability and OLAP, Abstract, 1998.
Gingras and Lakshmanan, nD-SQL: A Multi-Dimensional Language for Interoperability and OLAP, Abstract Proceedings of the 24th VLDB Conference 1998.
Shatdal, Order Based Analysis Functions in NCR Teradata Parallel RDBMS, Abstract Proceeding of EDBT 2000.
Shatdal, Order Based Analysis Functions in NCR Teradata Parallel RDBMS, Abstract Proceeding of EDBT 2000 pp. 219-223.
Albrecht et al., An Architecture for Distributed OLAP, Abstract, 1998.
Albrecht et al., An Architecture for Distributed OLAP, Abstract Proceedings of PDPTA '98.
Albrecht et al., An Architecture for Distributed OLAP, Abstract Proceedings of PDPTA '98 Jul. 13-16, pp. 1482-1488.
Charczuk, Physical Structure Design for Relational Databases, Abstract Proceedings of ADBIS '98.
Charczuk, Physical Structure Design for Relational Databases, Abstract Proceedings of ADBIS '98 1998 pp. 357-362.
Charczuk, Physical Structure Design for Relational Databases, Abstract, 1998.
Lenz and Shoshani, Summarizability in OLAP and Statistical Data Bases, Abstract—IEEE 1997 pp. 22-27.
Lenz and Shoshani, "Summarizability in OLAP and Statistical Data Bases", Procddings of the 9th International Conference on Scientifice and Statistical Database Management, Aug. 11-13, 1997, pp. 132-143.
Lehner, et al. "Normal Forms for Miltidimensional Databases", Proceedings of the 10th International Conference on Scientific and Statistical Database Management, Jul. 1-3, 1998, pp. 63-72.
Hwang, Summary Data Representations in Application Developments, Abstract, Sep. 1993.
Hwang, Summary Data Representations in Application Developments, Abstract DEXA 93 pp. 643-654.
Hwang, Summary Data Representations in Application Developments, Abstract Proceedings of DEXA '93 Sep. 1993.
Dinter et al., The OLAP Market: State of the Art and Research Issues, Abstract—DOLAP '98.
Dinter et al., The OLAP Market: State of the Art and Research Issues, Abstract—DOLAP '98 pp. 22-27.
Wieczerzycki, Transaction Management in Databases Supporting Collaborative Applications, Abstract Proceedings of ADBIS '98 1998.
Wieczerzycki, Transaction Management in Databases Supporting Collaborative Applications, Abstract Proceedings of ADBIS '98 pp. 107-118.
Bellahsene, View Adaption in Data Warehousing Systems, Abstract, 1998.
Bellahsene, View Adaption in Data Warehousing Systems, Abstract Proceedings of DEXA '98 Aug. 1998.
Bellahsene, View Adaption in Data Warehousing Systems, Abstract Proceedings of DEXA '98 pp. 300-309.
Batini et ai, A Comparative Analysis of Methodologies for Database Schema Integration,ACM Computing Surveys, vol. 18, No. 2, Dec. 1996.
Batini et al, A Comparative Analysis of Methodologies for Data Schema Integration,ACM Computing Surveys, vol. 18, No. 2 Dec. 1986.
Batini et al, A Comparative Analysis of Methodologies for Data Schema Integration,ACM Computing Surveys, vol. 18, No. 2 1987 pp. 323-364.
Gyssens and Lakshmanan., A Foundation for Multi-Dimensional Databases, 1997.
Gyssens and Lakshmanan., A Foundation for Multi-Dimensional Databases Proceedings of the 23'd VLDB Conference 1997.
Gyssens and Lakshmanan., A Foundation for Multi-Dimensional Databases Proceedings of the 23'd VLDB Conference 1997 pp. 106-115.
Gupta et al., Aggregate-Query Processing in Data Warehousing Environments, 1995.
Gupta et al., Aggregate-Query Processing in Data Warehousing Environments Proceedings of the 21 st VLDB Conference 1995.
Devlin and Murphy., An Architecture for a Business and Information System, IBM Systems Journal, vol. 27, No. I 1998.
Devlin and Murphy., An Architecture for a Business and Information System, IBM Systems Journal, vol. 27, No. 1 1988 pp. 60-80.
Codd., A Relational Model of Data for Large Shared Data Banks,Communications of the ACM, vol. 13, No. 6, Jun. 1970.
Codd., A Relational Model of Data for Large Shared Data Banks,Communications of the ACM, vol. 13, No. 6, Jun. 1990 pp. 377-387.
Vassiliadis and Sellis., A Survey of Logical Models for OLAP Database, SIGMOD Record, vol. 28, No. 4, Dec. 1999.

Vassiliadis and Sellis., A Survey of Logical Models for OLAP Database, SIGMOD Record, vol. 28, No. 4, Dec. 1999 pp. 64-69.
Attunity's website page re Home page with Headlines 2005.
Chaudhuri and Narasayya., AutoAdmin "What-if" Index Analysis Utility, '98.
Chaudhuri and Narasayya. AutoAdmin What-if Index Analysis Utility Proceedings of SIGMOD '98.
Chaudhuri and Narasayya. AutoAdmin What-if Index Analysis Utility Proceedings of SIGMOD '98 pp. 367-378.
Lu and Tan., Buffer and Load Balancing in Locally Distributed Database Systems, 1990.
Lu and Tan., Buffer and Load Balancing in Locally Distributed Database Systems, 1990 pp. 545-552.
Shanmugasundararn., Compressed Data Cubes for OLAP Aggregate Query Approximation on Continuous Dimensions Proceedings ofthe KDD '99 Conference.
Shanmugasundararn., Compressed Data Cubes for OLAP Aggregate Query Approximation on Continuous Dimensions KDD 99 1999 pp. 223-232.
Barghoorn., N-dimensional Data Analysis with Sparse Cubes, Crosstab, OLAP, and APL APL98 Jul. 1998 pp. 110-113.
Barghoorn., N-dimensional Data Analysis with Sparse Cubes, Crosstab, OLAP, and APL Proceedings of the APL '98 Conference.
Gray et aL, Data Cube: A Relational Aggregation Operator Generalizing Group-By, Cross-Tab, and Sub-Totals, 1996.
Gray et aL, Data Cube: A Relational Aggregation Operator Generalizing Group-By, Cross-Tab, and Sub-Totals, 1996 pp. 152-159.
Chaudhuri and Dayal., Data Warehousing and OLAP for Decision Support Proceedings of SIGMOD '97.
Chaudhuri and Dayal., Data Warehousing and OLAP for Decision Support Proceedings of SIGMOD '97 1997 pp. 507-508.
Trujillo et al., Detecting Patters and OLAP Operations in the GOLD Model, DOLAP, '99.
Trujillo et al., Detecting Patters and OLAP Operations in the GOLD Model, DOLAP, '99 1999.
Yan & Larson., Eager Aggregation and lazy Aggregation, Proceedings of the 21st VLDB Conference Zurich, Swizerland, 1995.
Johnson and Chatziantoniou., Extending Complex Ad-Hoc OLAP, 1999.
Johnson and Chatziantoniou., Extending Complex Ad-Hoc OLAP Proceedings ofCIKM '99.
Johnson and Chatziantoniou., Extending Complex Ad-Hoc OLAP pp. 170-179 CIKM 99 Nov. 1999.
Pedersen et al., Extending OLAP Querying to Object Databases, VLDB 2000 Submission.
Pedersen et al., Extending Practical Pre-Aggregation in On-Line Analytical Processing, 1999.
Pedersen et al., Extending Practical Pre-Aggregation in On-Line Analytical Processing Proceedings of the 25th VLDB Conference 1999.
Codd, Extending the Database Relational Model to Capture More Meaning, ACM Transactions on Database Systems, vol. 4, No. 4, 1979.
Codd, Extending the Database Relational Model to Capture More Meaning, ACM Transactions on Database Systems, vol. 4, No. 4, 1979 pp. 397-434.
Sheth and Larson, Federated Database Systems for Managing Distributed, Heterogeneous, and Autonomous Databases, ACM Computing Surveys, vol. 22, No. 3, Sep. 1990.
Sheth and Larson, Federated Database Systems for Managing Distributed, Heterogeneous, and Autonomous Databases, ACM Computing Surveys, vol. 22, No. 3. pp. 183-236 Sep. 1990.
Szykier, Fractal Compression of Data Structures, Electro International 1994 Hynes Convention Center, pp. 609-616.
Szykier, Fractal Compression of Data Structures, Electro International 1994 Hynes Convention Center, May 1994.
Graefe et al., Hash joins and hash teams in Microsoft SQL Server, 1998, pp. 86-97.
Graefe et al., Hash joins and hash teams in Microsoft SQL Server Proceedings of the 24th VLDB Conference 1998, pp. 86-97.
Chandra and Harel, Horn Clauses and the Fixpoint Query Hierarchy 1982.

A White Paper by Speedware Corporation, Hybrid OLAP—The Best of Both Worlds 1997.
Markl et al., Improving OLAP Performance by Multidimensional Hierarchical Clustering, 1999.
Mark! et al., Improving OLAP Performance by Multidimensional Hierarchical Clustering Proceedings of Ideas '99 1999.
Chaudhuri and Shim, Including Group-By in Query Optimization, 1994.
Chaudhuri and Shim, Including Group-By in Query Optimization Proceedings of the 20th VLDB Conference, 1994.
Mumick et al., Maintenance of Data Cubes and Summary Tables in a Warehouse, 1997.
Mumick, I. S., D. Quass and B. S. Mumick "Maintenance of Data Cubes and Summary Tables in a Warehouse", ACM SIGMOD Record, vol. 26, No. 2, Jun. 1997, pp. 100-111.
Murnick et al., Maintenance of Data Cubes and Summary Tables in a Warehouse Proceedings of SIGMOD '97 1997.
Vigeant, J. DM Review's website page re Media / MR Ensures Consistency for IBM Consultancy Jan. 1998.
McCarthy, Metadata Management for large Statistical Databases, 1982, pp. 234-243.
McCarthy, Metadata Management for Large Statistical Databases Proceedings of the 8th VLDB Conference 1982. pp. 234~243.
Ferguson, Microeconomic Algorithms for Load Balancing in Distributed Computer Systems, 1988.
Ferguson, Microeconomic Algorithms for Load Balancing in Distributed Computer Systems, 1988 pp. 491-499.
Chen and McNamee, On the Data Model and Access Method of Summary Data Management, IEEE Transactions on Knowledge and Data Engineering, vol. 1, No. 4, 1989.
Sellis and Ghosh, Concise Papers on the Multiple-Query Optimization Problem, IEEE Transactions on Knowledge and Data Engineering, vol. 2, No. 2 1990.
DBMS's website page re Oracle 7 Release 7.3 by Martin Rennhackkamp Nov. 1996 pp. 262-266.
DeWitt and Gray, Parallel Database Systems: The Future of High Performance Database Systems, Communications of the ACM, vol. 35, No. 6, Jun. 1992.
DeWitt and Gray, Parallel Database Systems: The Future of High Performance Database Systems, Communications of the ACM, vol. 35, No. 6, Jun. 1992 pp. 85-98.
Ho et al., Partial-Sum Queries in OLAP Data Cubes Using Covering Codes, 1997.
Ho et al., Partial-Sum Queries in OLAP Data Cubes Using Covering Codes Proceedings of PODS '97 1997.
Ho et al., Partial-Sum Queries in OLAP Data Cubes Using Covering Codes Proceedings of PODS '97 1997 pp. 228-237.
Pourabbas and Rafanelli, PGL: An Extended Pictorial Query Language for querying Geographical Databases using Positional and OLAP Operators, Nov. 1999.
Pourabbas and Rafanelli, PQL: An Extended Pictorial Query Language for querying Geographical Databases using Positional and OLAP Operators Proceedings of ACM GIS '99 Nov. 1999.
Pourabbas and Rafanelli, PQL: An Extended Pictorial Query Language for querying Geographical Databases using Positional and OLAP Operators Proceedings of ACM GIS '99 Nov. 1999 pp. 165-166.
Markl et al., Processing Operations with Restrictions in RDBMS without External Sorting: The Tetris Algorithm, 1999.
Markl et al., Processing Operations with Restrictions in RDBMS without External Sorting: The Tetris Algorithm Proceedings of ICDE '99 1999.
Bansal, Real World Requirements for Decision Support—Implications for RDBMS, 1995.
Bansal, Real World Requirements for Decision Support—Implications for RDBMS Proceedings of SIGMOD '95 1995 p. 448.
Tabor Communications' website page re SAP Customers Eastman Kodak and Halliburton Among 750 Customers Worldwide to Implement the SAP Business Information Warehouse Solution, 1999.
Graefe et al., Sort vs. Hash Revisited, IEEE Transactions on Knowledge and Data Engineering, vol. 6, No. 6., Dec. 1994.
Graefe et al., Sort vs. Hash Revisited, IEEE Transactions on Knowledge and Data Engineering, vol. 6, No. 6., Dec. 1994 pp. 934-944.

Red Brick Systems, Inc. Star Schema Processing for Complex Queries, 1997.
Shoshani and Wong., Statistical and Scientific Database Issues, IEEE Transactions on Software Engineering, vol. SE-11, No. 10., Oct. 1985.
Shoshani and Wong., Statistical and Scientific Database Issues, IEEE Transactions on Software Engineering, vol. SE-11, No. 10., Oct. 1985 pp. 1040-1047.
Ghosh, Statistical Relational Databases: Normal Forms, IEEE Transactions on Knowledge and Data Engineering, vol. 3, No. 1., 1991.
Ghosh, Statistical Relational Databases: Normal Forms, IEEE Transactions on Knowledge and Data Engineering, vol. 3, No. 1., 1991 pp. 55-64.
Stamen, Structuring Database for Analysis, IEEE Spectrum Oct. 1993 pp. 55-58.
The OLAP Report website page re Summary Review: Media (Speedware) Mar. 29, 1999.
Sybase Inc.'s website page re Certification Report No. 136 of Sybase Adaptive Server IQ Version 12.02 with Seagate Software Crystal Reports and Crystal Info Version 7.0v Jun. 1999.
Gyssens et al., Tables as a Paradigm for Querying and Restructuring, 1996.
Gyssens et al., Tables as a Paradigm for Querying and Restructuring Proceedings of PODS 96 1996.
Gyssens et al., Tables as a Paradigm for Querying and Restructuring Proceedings of PODS '96 1996., pp. 93-103.
Srivastava et al., TBSAM: An Access Method for Efficient Processing of Statistical Queries, IEEE Transactions of Knowledge and Data Engineering, vol. 1. No. 4, 1989.
Srivastava et al., TBSAM: An Access Method for Efficient Processing of Statistical Queries, IEEE Transactions of Knowledge and Data Engineering, vol. 1. No. 4 pp. 419-423 Dec. 1989.
LeFevre, J., LookSmart Find Articles' website page re There's a Whole Lot of HOLAP Goin' On-hybrid online analytical processing systems combine relational OLAP and multidimensional OLAP—Technology Information, 1998.
LeFevre, J., LookSmart Find Articles' website page re There's a Whole Lot of HOLAP Goin' On-hybrid online analytical processing systems combine relational OLAP and multidimensional OLAP—Technology Information, Feb. 18, 1998.
LeFevre, J.,There's a Whole Lot of HOLAP Goin' On-hybrid online analytical processing systems combine relational OLAP and multidimensional OLAP—Technology Information Feb. 18, 1998.
Bayer, UB-Trees and UB-Cache a new Processing Paradigm for Database Systems, Mar. 15, 1997.
Hurtado et al., Updating OLAP Dimensions, 1999, pp. 60-66.
Hurtado et al., Updating OLAP Dimensions Proceedings of DOLAP'99, 1999, pp. 60-66.
White Paper Abstract—Connecting Seagate Software products to the SAP Business Information Warehouse (BW), Enterprise Information Management, Feb. 5, 1999.
Healthcare Informatics.Online website page re Data Mining Goes Multidimensional by Mark Hettler, Mar. 1997.
Staudt et al., Incremental Maintenance of Externally Materialized Views, Abstract, 1996.
Staudt et al., Incremental Maintenance of Externally Materialized Views, Abstract Proceedings of the 22nd VLDB Conference 1996 pp. 75-86.
Aberdeen Group "Pilot Internet Publisher: A Foundation for Web-Enabled OLAP" Feb. 1997.
Srivastava et al., Answering Queries with Aggregation Using Views, Abstract, 1996.
Srivastava et al., Answering Queries with Aggregation Using Views, Abstract, Proceedings of the 22nd VLDB Conference 1996.
Srivastava et al., Answering Queries with Aggregation Using Views, Abstract, Proceedings of the 22nd VLDB Conference 1996 pp. 318-329.
Martin, J., DM Review's website re Cybercorp: Trends in Distributed Data Warehousing Jan. 1999.
Theodoratos et al, Data Warehouse Configuration, Abstract, 1997.
Theodoratos et al, Data Warehouse Configuration, Abstract Proceedings of the 23rd VLDB Conference 1997.
Malvestuto, F., The Derivation Problem for Summary Data, Abstract, 1988.
Malvestuto, F., The Derivation Problem for Summary Data, Abstract, Abstract, ACM 1988 pp. 82-89.
Rahm, Erhard. Dynamic Load Balancing in Parallel Database System, Abstract, Aug. 1996.
Rahm, Erhard. Dynamic Load Balancing in Parallel Database System, Abstract Proceedings EURO-PAR 96 Conf. LNCS Aug. 1996.
Hsiao, David. Federated Databases and Systems: Part 1—A Tutorial on Their Data Sharing, Abstract, VLDB Journal, vol. 1, pp. 127-179, 1992.
Hsiao, David. Federated Databases and Systems: Part II—A Tutorial on Their Resource Consolidation, Abstract, VLDB Journal vol. 2, pp. 285-310, 1992.
Crystal Decisions. Holos Version 6. Holos Compound OLAP Architecture, 2002.
Sarawagi, Sunita. Indexing OIAP Data, Abstract, 1997.
Sarawagi, Sunita. Indexing OIAP Data, Abstract, Bulletin of the IEEE Computer Society Technical Committee on Data Engineering 1997.
Sarawagi, Sunita. Indexing OIAP Data, Abstract, Bulletin of the IEEE Computer Society Technical Committee on Data Engineering 1997 pp. 36-43.
Data Sheet—Informix MetaCube 4.2, Delivering the Most Flexible Business-Critical Decision Support Environments Jul. 1999.
Technical White Paper—Inside Alphablox Analytics: An In-Depth Technical View of Alphablox Analytics, 2004.
Ramsak et al., Integrating the UB-Tree into a Database System Kernel, Abstract Proceedings of the 26th VLDB Conference 2000.
Ramsak et al., Integrating the UB-Tree into a Database System Kernel, Abstract Proceedings of the 26th VLDB Conference 2000 pp. 263-272.
Roussopoulos, Nick. Materialized Views and Data Warehouses, Abstract, 1997.
Roussopoulos, Nick. Materialized Views and Data Warehouses, Abstract Proceedings of the 4th KRDB Workshop Aug. 30, 1997.
Bernstein et al., Meta-Data Support for Data Transformations Using Microsoft Repository, Abstract, 1999.
Bernstein et al., Meta-Data Support for Data Transformations Using Microsoft Repository, Abstract Bulletin of the IEEE Computer Society Committee on Date Engineering 1999.
Bernstein et al., Meta-Data Support for Data Transformations Using Microsoft Repository, Abstract Bulletin of the IEEE Computer Society Committee on Date Engineering 1999 pp. 9-14.
Microsoft SQL Server—Microsoft SQL Server 7.0 Decision Support Services: lowering the Cost of Business Intelligence, 1998.
Microsoft SQL Server—Microsoft SQL Server 7.0 Decision Support Services: lowering the Cost of Business Intelligence 098-80705 1998.
Gaede et al., Multidimensional Access Methods, ACM Computing Surveys, vol. 30, No. 2, Jun. 1996.
Gaede et al., Multidimensional Access Methods, ACM Computing Surveys, vol. 30, No. 2, Jun. 1996 pp. 170-231.
O'Neil et al., Multi-Table Joins Through Bitmapped Join Indices, SIGMOD Record, vol. 24, No. 3, Sep. 1995.
O'Neil et al., Multi-Table Joins Through Bitmapped Join Indices, SIGMOD Record, vol. 24, No. 3, Sep. 1995 pp. 8-11.
Pendse, N., OLAP Omnipresent, Byte Magazine, Feb. 1998.
Zhao et al., On the Performance of an Array-Based ADT for OLAP Workloads, Abstract, Aug. 29, 1996.
e-consultancy's website re Oracle Express 6.2 Delivers Unparalleled Integration, Ease of Use and Platform Support, May 1998.
Yan et al., Performing Group-By before Join, Abstract.. Proceedings of the 10th IEEE Conference on Data Engineering 1994 pp. 89-100.
Wu, Ming-Chuan, Ouery Optimization for Selections using Bitmaps, Abstract, 1994, pp. 89-100.
Kamp et al., A Spatial Data Cube Concept to Support Data Analysis in Environmental Epidemiology, Abstract 1997.
Abstract Kamp et al., A Spatial Data Cube Concept to Support Data Analysis in Environmental Epidemiology, Abstract 1997 pp. 100-103.
SQL in Analysis Services, 2004.

Reinwald et al., SQL Open Heterogeneous Data Access, Abstract, 1998, pp. 506-507.
Reinwald et al., SQL Open Heterogeneous Data Access, Abstract Proceedings of SIGMOD 1998 pp. 506-507.
Moran, B., et al., SQL Server Savvy's website re How to Leverage the Capabilities of OLAP Services, Jul. 1999.
Radding, Alan. Support Decision Makers with a Data Warehouse, Datamation, Mar. 15, 1995.
Radding, Alan. Support Decision Makers with a Data Warehouse, Datamation, Mar. 15, 1995 pp. 53-56.
Chapman K. Article from itWorldCanada—BI/SUITE Plays Catch up to Competitors Feb. 26, 1999.
MacMillan, M. Article from itWorldCanada—Business Objects 5.0 Dresses Itself up with a Cleaner User Interface Sep. 10, 1999.
Plos Kine, B. Article—Hummingbird Dives Into Business Intelligence (Hummingbird BI Suite) (Product Announcement) Aug. 12, 1998.
Printout from Sybase Website Sybase Adaptive Server Iq 12.0.3 with Actuate Reporting System Version 3.2.1, Certification Date: Jul. 1999, Report.
Printout from Sybase Website Sybase Adaptive Server IQ 12.0.3 with Actuate Reporting System Version 3.2.1, Certification Date: Jul. 1999, Report 150.
Printout from Sybase Website "Sybase Adaptive Server IQ 12.03.1 with BusinessObjects Version 5.0, Certification Date: Jul. 1999, Report 148".
Printout from Sybase Website "Sybase Adaptive Server IQ Version 12.0, Sybase DirectConnect for MVS/DB2 11.7 and Sybase Adaptive Server Enterprise 11.9.1 with InfoMaker 7.0, Certification Date: Mar. 1999, Report 137".
Printout from Sybase Website "Sybase Adaptive Server IQ Version 12.0.2 with Hummingbird BI Suite Version 5.0, Certification Date: Mar. 1999, Report 133".
Printout from Sybase Website "Sybase Adaptive Server IQ Version 12.0.2 with Seagate Software Crystal Report and Crystal Info Version 7.0, Certification Date: Mar. 1999, Report 136".
Printout from Sybase Website "Sybase Adaptive Server IQ Version 12.4 with Microsoft Access 2000 Version 9.0, Certification Date: Oct. 1999, Report 155".
Kimball, R., et al., "Why Decision Support Fails and How to Fix it," Datamation, Jun. 1, 1994.
Kimball, R., et al., "Why Decision Support Fails and How to Fix it," Datamation, Jun. 1, 1994 pp. 40-43.
Article—"Why Decision Support Fails and How to Fix it," Datamation, Jun. 1, 1994.
"The Multimodel, Multilingual Approach to Interoperability of Multidatabase Systems," David K. Hsiao and Magdi N. Kamel, Departments of Computer and Administrative Sciences, Naval Postgraduate School 1991.
"The Multimodel, Multilingual Approach to Interoperability of Multidatabase Systems," David K. Hsiao and Magdi N. Kamel, Departments of Computer and Administrative Sciences, Naval Postgraduate School 1991 pp. 208-211.
"MDD Database Reaches the Next Dimension" Richard Finkelstein, Database Programming and Design, Apr. 1995, vol. 8.
"Materialized View and Index Selection Tool for Microsoft SOL Server 2000" Sanjay Agrawal, Surajit Chaudhuri and Vivek Narasayya Proceedings of SIGMOD 2001 May 21-24, 2001 p. 608.
"Managing Multidimensional Data: Harnessing the Power" Jay-Louise Weldon, Database Programming & Design, Aug. 1995, vol. 8.
"M(DM): An Open Framework for Interoperation of Multimodel Multidatabase Systems" Thierry Barsalou and Dipayan Gangopadhyay 1992.
"Help for Hierarchies" Ralph Kimball, Data Warehouse Architect, Sep. 1998.
"Beyond Decision Support" Edgar Codd, Sharon Codd and Clynch T. Salley, Computerworld, Jul. 26, 1993, p. 87.
"A Physical Storage model for Efficient Statistical Query Processing" Wee K. Ng and Chinya V. Ravishankar, Dept. of Electrical Engineering and Comptuer Science, University of Michigan IEEE 1994 pp. 97-106.
"A Physical Storage model for Efficient Statistical Query Processing" Wee K. Ng and Chinya V. Ravishankar, Dept. of Electrical Engineering and Comptuer Science, University of Michigan IEEE 1994.
"SQL Is Our Language, Fix It Now" Datamation, Jun. 1, 1994.
"SQL Is Our Language, Fix It Now" Datamation, Jun. 1, 1994 pp. 43-45.
Kimball, R. "SQL Is Our Language, Fix It Now" Datamation, Jun. 1, 1994.
NetCube "Discussion of NetCube in the Context of IBM's DB2 OLAP Server" Jun. 7, 1997.
NetCube Health Care Client—Actual NetCube Model Design; Telecommunications—Business Model Design; Direct Marketing Client—Business Model Design Nov. 1, 2005.
Erik Thomsen, Dimensional Systems, Remarks from NetCube Product Review on Jan. 14, 1997.
Albrecht, J. et al.: "Aggregate-based Query Processing in a Parallel Data Warehouse Server", Proceedings of the Tenth International Workshop on Database and Expert Systems Applications, Sep. 1-3, 1999, pp. 40-44.
Albrecht, et al.: "Management of Multidimensional Aggregates for Efficient Online Analytical Processing", Database Engineering and Applications, 1999, Ideas '99. International Symposium Proceedings Montreal, Que., Canada Aug. 2-4, 1999, Los Alamitos, CA, USA, IEEE Comput. Soc, US, Aug. 2, 1999, pp. 156-164.
Albrecht, et al.: "Management of Multidimensional Aggregates for Efficient Online Analytical Processing", Database Engineering and Applications, 1999, Ideas '99. International Symposium Proceedings Montreal, Que., Canada.
Agarwal, S. et al.: "On the Computation of Multidimensional Aggregates", Proceedings of the 22nd VLDB Conference, Sep. 30, 1996, pp. 506-521.
Agarwal, S. et al.: "On the Computation of Multidimensional Aggregates", 22nd Intl Cof. on Very Large Databases, 1996, pp. 1-16.
Agrawal et al.: "Modeling Multidimensional Databases", IBM Almaden Research Center, 1995, Presented at the 13th International Conference on Data Engineering, Apr. 1997, pp. 1-23.
Agrawal et al.: "Modeling Multidimensional Databases", IBM Almaden Research Center, 1995, Presented at the 13th International Conference on Data Engineering, pp. 1-23, available as Research Report 1995.
Anonymous: "Introduction to MDDBs", SAS Institute Inc., SAS/MDDB Server Administrators Guide Version 8, 1999, pp. 3-10.
The Art of Indexing by not indicated, Dynamic Information Systems Corporation, 1999, p. 3-30.
The Art of Indexing,: A White Paper by DISC, Oct. 1999, pp. 3-30, Dynamic Information Systems Corporation.
Carickhoff, Rich: "Internet Systems' website re A New Face for OLAP", Jan. 1997.
Carickhoff, Rich: "Internet Systems' website re A New Face for OLAP", Jan. 1997. DBMS Magazine.
Chaudhuri, et al.: "An Overview of Data Warehousing and OLAP Technology", Sigmod Record, Sigmod, New York, NY, US, vol. 26, No. 1, Mar. 1997, pp. 65-74.
Chaudhuri, S. et al., "An Overview of Data Warehousing and OLAP Technology", SIGMOD Record, New York, NY Mar. 1997, vol. 26, No. 1.
Cheung, et al.: "Towards the Building of a Dense-Region-Based OLAP System", Data and Knowledge Engineering, vol. 36, No. 1, 2001, http://www.elsevier.nl/gej-ng/10/16/74/62/24/24/abstract.html, pp. 1-27.
Colliat, George: "OLAP: Relational, and Multidimensional Database Systems", SIGMOD Record, vol. 25, No. 3, Sep. 1996, pp. 64-69.
Date, C. J., et al.: An Introduction to Database Systems, No. 7th, 2000, pp. 250, 266, 289-326.
Date, C. J., et al.: An Introduction to Database Systems, No. 7th, 2000, pp. 250, 266, 289-326. Addison-Wesley, Seventh Edition.
Date, et al., "An Introduction to Database Systems, vol. II", Reading: Addison-Wesley, pp. 62-64, 1983. QA76.9.D3D367. ISBN 0-201-14474-3.
Date, et al., "An Introduction to Database Systems, vol. II", Reading: Addison-Wesley, pp. 62-64, 1983.

Date, C.J., "An Introduction to Database Systems," 2000, pp. 250, 266, 289-326, Addison-Wesley, Wesley, Seventh Edition.

Duhl, et al., "A Performance of Object and Relational Databases Using the Sun Benchmark", Proceedings of the OOPSLA Conference, pp. 153-163, Sep. 25-30, 1988.

Duhl, et al., "A Performance Comparison of Object and Relational Databases Using the Sun Benchmark", Proceedings of the Conference on Object Oriented Programming Systems Languages and Applications,Sep. 25-30, 1988, pp. 153-163.

Elkins, S. B.: "Open OLAP", DBMS Apr. 1998, http://www.dbmsmag.com/9804d14.html, pp. 1-7.

Foley, J. TechWeb's website page re Microsoft Servers Up New SQL Server Beta Jan. 12, 1998.

Gupta, H.V., et al., "Index Selection for OLAP", Proceedings of the 13th Int'l Conference on Data Engineering, Apr. 7-11, 1997, pp. 208-219.

Harinarayan et al.: "Implementing Data Cubes Efficiently", Proceedings of the 1996 ACM SIGMOD International Conference on Mangement of Data, Jun. 4-6, pp. 205-216.

Harinarayan et al.: "Implementing Data Cubes Efficiently", Proceedings of the 1996 SIGMOD 1996, p. 1-25.

Hellerstein et al.: Online Aggregation, Presented at the ACM SIGMOD International Conference on Management of Data, May 11-15, 1997, http://www.acm.org/pubs/citations/proceedings/mod/253260/p171-hellerstein/, pp. 1-12.

Hellerstein, J.M., "Optimization Techniques for Queries with Expensive Methods", ACM Transactions on Database Systems (TODS), vol. 23, No. 2, pp. 113-157, 1998.

Ho, C.-T. et al.: Range Queries in OLAP Data Cubes, Presented at the ACM SIGMOD International Conference on Management of Data, May 11-15, 1997, http://www.acm.org/pubs/citations/proceedings/mod/253260/p73-ho/, pp. 1-16.

Introduction to Structured Query Language, http:/w3one.net/~jhoffmann/sqltut.htm, 2000, p. 1-33.

Introduction to Structured Query Language, http:/w3one.net/~jhoffmann/sqltut.htm, 2000, p. 1-33. http:/w3.one.net/~about.jhoffman/sqltut.htm.

Kimball, R., "Aggregate Navigation With (Almost) No MetaData", http://www.dbmsmag.com/9608d54.html, 1996, p. 1-8.

Kimball, R.: "The Aggregate Navigator; How to Optimize Your Data Warehouse Using Aggregates Without Driving Your End Users Crazy", DBMS (www.dbmsmag.com)—Nov. 1995.

Korn, F. et al.: "Efficiently Supporting Ad Hoc Queries in Large Datasets of Time Sequences", Presented at ACM SIGMOD International Conference on Management of Data, May 11-15, 1997, http://www.acm.org/pubs/citations/proceedings/mod/253260.p289-korn/, pp. 1-22.

Li, et al.: A Data Model for Supporting On-Line Analytical Processing, Presented at the International Conference on Information and Knowledge Management, 1996, pp. 81-88.

Li, C., et al.: "Optimizing Statistical Queries by Exploiting Orthogonality and Interval Properties of Grouping Relations", Presented at the 8th International Conference on Scientific & Statistical Database Management, Jun. 1996, pp. 1-10.

McKie, S.: "Essbase 4.0", DBMS, Jul. 1996, Web-based Product Review for Arbor Software Corporation, http://www.dbmsmag.com/9607d13.html, pp. 1-4.

Pedersen, T. B., "Aspects of Data Modeling and Query Processing for Complex Multidimensional Data", Chapter 4, entitled Extending Practical Pre-Aggregation in On-Line Analytical Processing, of the Ph.D. Disseration, Danish Academy of Technical Sciences 2000, pp. 1-103.

Pedersen, T.B., Aspects of Data Modeling and Query Processing for Complex Multidimensional Data, 2000, pp. 1-180, Danish Academy of Technical Sciences.

Pedersen, T. B., Aspects of Data Modeling and Query Processing for Com., Dept. Computer Sci., Aalborg Univ., Denmark, 2000, p. 1, 77-103.

Pedersen, et al., Extending OLAP Querying to Object Databases, VLDB 2000 Submission.

Petersen, T. B., et al.: "Multidimensional Database Technology", IEEE, vol. 34, No. 12, Dec. 2001, pp. 40-46.

Pendse, Nigel: "The Origins of Today's OLAP Products", htt;://www.olapreport.com/origins.htm., Feb. 6, 2003, pp. 1-7.

"Performance Management—Product Information," ENT, Jul. 17, 1999, 2 pages.

Pourabbas, et al.: "Characterization of Hierarchies and Some Operators in OLAP Environment", Presented at the ACM 2nd International Workshop on Data Warehousing and OLAP, Nov. 2-6, 1999, pp. 1-17.

Pourabbas, et al.: "Characterization of Hierarchies and Some Operators in OLAP Environment", Presented at the ACM 2nd International Workshop on Data Warehousing and OLAP, 1999, p. 54-49.

Pourabbas et al.: "Hierarchies and Relative Operators in the OLAP Environment", SIGMOD Record, vol. 29, No. 1, Mar. 2000, http://dblp.unitrier.de/db/journals/sigmod/sigmod29.html, pp. 1-8.

Roche, T.: "Intermediate Client-server techniques", 1999.

Salem et al.: "How to Roll a Join: Asynchronous Incremental View Maintenance", Presented by ACM SIGMOD on Management of Data and Symposium on Principles of Database Systems, May 15-18, 2000, http://www.acm.org/pubs/citations/proceedings/mod/342009/p129-salem/#abstract, pp. 1-13.

SAS/MCCB®: Web-based product brochure entitled "See Data from All Angles with Multidimensional Database Software" by SAS/MCCB® Server, www.sas.com/products/mddb/index.html, 2001, 1 page.

Schumacher, Robin: Attunity Connect SQL—PowerPoint presentation undated 38 pages. BrioQuery Enterprise 4.0; Brio Technologys desktop OLAP tool, Lexis.com DBMX Magazine vol. 9 No. 10 Sep. 1996.

Shoshani, OLAP and Statistical Databases: Similarities and Differences, Abstract—PODS Proceedings of PODS '97 1997.

Shoshani, OLAP and Statistical Databases: Similarities and Differences, Abstract—PODS 97 pp. 185-196.

Vassiliadis, P.: "A Survey of Logical Models for OLAP Databases", Sigmod Record, vol. 28, No. 4, Dec. 1999.

Widman et al.: Efficient Execution of Operations in a DBMS for Multidimensional Arrays, presented at the ACM SIGMOD 1998, http://dblp.unitrier.de/db/conf/ssdbm/WidmannB98.html, pp. 1-11.

Zhao, Y et al. "Array-Based Evaluation of Multi-Dimensional Queries in Object-Relational Database Systems," Data Engineering, 1998 Proceedings, 14th International Conference in Orlando, Fl, Feb. 23-27, 1998.

U. S. District Court Order, for the Northern District of California in the matter of *Hyperion Solutions Corp.* vs. *HyperRoll, Inc., et al*. (Case No. CV 05-05054-VRW), 35 pages, dated Aug. 28, 2006.

U.S. Office Action re U.S. Appl. No. 10/153,164 dated Nov. 25, 2003.
U.S. Office Action re U.S. Appl. No. 10/854,034 dated Nov. 6, 2006.
U.S. Office Action re U.S. Appl. No. 09/796,098 dated Oct. 24, 2003.
U. S. Office Action re U.S. Appl. No. 12/657,143 dated Sep. 15, 2010.
U. S. Office Action re U.S. Appl. No. 12/455,665 dated Jul. 30, 2010.
U. S. Office Action re U.S. Appl. No. 12/653,373 dated Aug. 30, 2010.
U. S. Office Action re U.S. Appl. No. 12/590,504 dated Aug. 30, 2010.
U. S. Office Action re U.S. Appl. No. 12/589,383 dated Oct. 26, 2010.
CA Office Action dated Jan. 24, 2011.

Stonebraker, M., et al.: "The Postgres Next-Generation Database Management System", Communications of the ACM, Oct. 1991, vol. 34, No. 10, pp. 78-72. Exhibit A5 to Appeal Brief.

Rafanelli, M.: "Multidimensional Databases: Problems and Solutions", Idea Group Inc., 2003 3 pgs. (cover, forward). Exhibit A4 to Appeal Brief.

Thomsen, E.: "OLAP Solutions—Building Multidimensional Information Systems", 1997 in 5 pages. Exhibit A3 to Appeal Brief.

Colliat, G.: OLAP, Relational, and Multidimensional Database Systems, SIGMOD Record, vol. 25, No. 3, Sep. 1996. Exhibit A2 to Appeal Brief.

Vassiliadis, P.: Modeling Multidimensional Databases, Cubes and Cube Operations, National Technical University of Athens. Exhibit A1 to Appeal Brief.

U.S. Final Office Action re U.S. Appl. No. 12/657,143 dated Feb. 22, 2011.
U.S. Office Action re U.S. Appl. No. 12/455,664 dated Mar. 15, 2011.
U.S. Final Office Action re U.S. Appl. No. 12/653,373 dated Feb. 22, 2011.

Arbor Essbase 5: Fundamentals, Arbor Software—Driving Business Performance. See e.g., p. 1-1-4-14, 6-1-9-23, 12-1-13-22, 19-1-33-16.

Hyperion Essbase OLAP Server Fundamentals (Training Manual). IBM DB2 OLAP Server and Starter Kit—OLAP Setup and User's Guide Version 7. See e.g., p. 73-146.

Graefe, Query Evaluation Techniques for Large Databases, ACM Computing Surveys, vol. 25, No. 2.

Zaharioudakis et al., Answering Complex SQL Queries Using Automatic Summary Tables, Abstract.

Bonnet et al., My Mother Thinks I'm a DBA! Cross-Platform, Multi-Vendor, Distributed Relational Data Replication with IBM DB2 Data Propagator and IBM DataJoiner Made Easy!, IBM. See e.g., p. 1-138.

Oracle. Oracle Express Server Database Administration Guide. Release 6.0. See e.g., p. 1-102, 123-2242.

Oracle. Oracle Express Analyzer. Release 2.1 Getting Started. See e.g., p. 19-50.

Oracle Express Release 6.2, Express Language Programming Guide. See e.g., p. 19-186, 345-482.

TPC Benchmark D (Decision Support) Standard Specification, Revision 2.1. See e.g., p. 9-114, 146-151.

Client/Server Computing With Sybase SQI Server, Joe Salemi, Zift-Davis Press, 1994. . See e.g., p. 1-90, 143-190.

Developing Client/Server Systems Using Sybase SQL Server System 11, Sanjiv Purba, John Wiley & Sons, 1996. . See e.g., p. 1-81, 297-378, 417-508.

Proceedings of the International Conference on Parallel and Distributed Processing Techniques and Applications, vol. III, H.R. See e.g., p. 415-468, 1127-1190.

The Computer Glossary, The Complete Illustrated Dictionary, Eighth Edition, Alan Freedman, The Computer Language Company, Inc., 1998.

The Essbase Ready Tools Guide, Arbor Software. See e.g., p. 1-572.

Understanding Database Management Systems, Second Edition, Rob Mattison, McGraw-Hill, 1998. See e.g., p. 1-90, 119-336, 397-524, 539-644.

Hyperion's Spider-Man Web Application—Administrator, Hyperion Sofware Operations, Inc., 1998. See e.g., p. 1-390.

Temporal Databases, Theory, Design and Implementation, Tansel et al., Benjamin Cummings Publishing, 1993. See e.g., p. 1-270, 294-593.

Arbor Essbase Start Here, Version 1.0.1, IBM. See e.g., p. 1-43.

Seagate Info, Report Design Guide, Version 7, Seagate Software. See e.g., p. 1-79, 158-197, 462-595.

Brioquery 5.0 Handbook, for Microsoft Windows, Apple McIntosh and Motif Systems, Brio Technology, 1997. See e.g., p. 1-2-9-11.

Essbase Technical Reference 4.0, Arbor Software. See e.g., p. 1-362.

Fullwrite Professional Learning Guide, Ashton Tate. See e.g., p. 1-299.

ORACLE8 &UNIX Performance Tuning, Ahmed Alomari, Prentice Hall, 1999. See e.g., p. 1-345.

Official Sybase Data Warehousing on the Internet: Accessing the Corporate Knowledge Base, Tom Hammergren, International Thomson. See e.g., p. 1-208, 363-592.

SQL Server 7 Data Warehousing, Michael Corey, Michael Abbey, Ian Abramson, Larry Barnes, Benajmin Taub and Rajan Venkitachalam. See e.g., p. 1-32, 77-448.

CA Office Action dated Jan. 13, 2010.

EPO Decision to Refuse a European Patent re EP 1 266 308 dated Feb. 10, 2010.

U. S. Final Office Action re U.S. Appl. No. 12/653,373 dated Feb. 22, 2011.

U. S. Advisory Action re U.S. Appl. No. 12/653,373 dated May 2, 2011.

U. S. Office Action re U.S. Appl. No. 12/653,373 dated Mar. 5, 2012.

U. S. Notice of Allowance re U.S. Appl. No. 12/653,373 dated Jul. 3, 2012.

U. S. Office Action re U.S. Appl. No. 12/455,665 dated Dec. 30, 2010.

U. S. Office Action re U.S. Appl. No. 12/455,665 dated Jun. 2, 2011.

U. S. Final Office Action re U.S. Appl. No. 12/455,665 dated Nov. 16, 2011.

U.S. Office Action re U.S. Appl. No. 12/384,093 dated Nov. 19, 2010.

U.S. Office Action re U.S. Appl. No. 12/384,093 dated May 5, 2011.

U.S. Advisory Action re U.S. Appl. No. 12/384,093 dated Jul. 12, 2011.

U.S. Office Action re U.S. Appl. No. 12/384,093 dated Nov. 1, 2011.

U.S. Final Office Action re U.S. Appl. No. 12/384,093 dated Jun. 1, 2012.

U.S. Interview Summary re U.S. Appl. No. 12/384,093 dated Sep. 20, 2012.

U.S. Final Office Action re U.S. Appl. No. 12/384,093 dated Aug. 15, 2012.

U.S. Office Action re U.S. Appl. No. 13/275,242 dated Apr. 2, 2012.

U.S. Office Action re U.S. Appl. No. 13/289,954 dated May 25, 2012.

U. S. Notice of Allowance re U.S. Appl. No. 12/657,143 dated May 2, 2011.

U. S. Office Action re U.S. Appl. No. 12/455,664 dated Jun. 21, 2010.

Preliminary Invalidity Contention (PIC) charts for U.S. Pat. Nos. 6,385,604 and 6,434,544 submitted by Hyperion to the district court in Civil Action No. CV 05-05054 VRW, date unknown.

Brady, C. et al.: comp.databases' website re Access DBMS? Not RDBMS? Comp.databases.Ms-access newsgroup thred Jun. 9, 1994.

Rana, et al., A Distributed Framework for Parallel Data Mining Using HP Java, BT technol J vol. 17 No. 3,Jul. 1999. pp. 146-154.

Internet Systems' website re A New Face for OLAP by Rich Carickhotf, Jan. 1997. DBMS Magazine.

Windows IT Pro's website re A New Kid on the OLAP Block by Karen Watterson, May 1, 1998.

Schumacher, Robin. BrioOuery Enterprise 4.0; Brio Technology's desktop OLAP tool, lexis.com. DBMS Magazine, vol. 9, No. 10, Sep. 1996.

NetCube Corporation manual. Number of Installed Sites. Characteristics of Typical System Implementations, date unknown.

Michael, J., et al. DM Review's website re Charles Schwab Plans for Continued Prosperity with Seagate Holos, Oct. 1998.

Craig, Robert. Checking out OLAP Architectures; Technology Information.Lexis, a Boucher Communications, Inc. publication, Section No. 12, vol. 2; 1997; p. 40, ISSN: 1085-2395.

Spitzer, Tom. Component architectures; component-based software development; technology information.Lexis, DBMS Magazine, vol. 10, No. 10, Sep. 1997.

scholar.google website re Data Warehouse for Decision Support Systems, downloaded from http://www.cs.colorado.edu/-getrich/Classes/csci5817rrerm Papers/pong/db.pdf., on Sep. 10, 2005.

Bearson et al., "Data Warehousing, Data Mining, and OLAP.", pp. 104-107. McGraw Hill 1997.

Kurz, Andreas, A Min Tjoa, Data Warehousing within Intranet: Prototype of a Web•based Executive Information System , Abstract, 1997. pp. 627-632.

dbmsmag's website re What's New in 4.0. Mckie, S., dbmsmag's website re What's New in 4.0, DBMS Magazine, Jul. 1996.

Reimers, How to Sort Through the OLAP Maze, Lexis, Software Magazine, vol. 17, No. 5, May 1997.

HyperRoll's website re HyperRoll for Hyperion Essbase, date unknown.

ClearConnect Installation and Reference Guide, Manual. 2 Introducing ClearConnect and DRDA ClearConnect Release 1.3 pp. 2-1 and 2-4. Jul. 31, 1997.

Groh et al., Managing Multidimensional Data marts with Visual Warehouse and DB2 OLAP Server, IBM Dec. 1998. See e.g., p. 19-193, 313-.336.

Mattison, R.: A White Paper—Maximizing Database Performance with the OMNIDEX Query Accelerator 1998.

Maierhofer, Enrich. Present Limitations of Web-Enabled HOLAP: Empirical Experiments with Employment and Unemployment Statistics, Abstract pp. 883-887., date unknown.

Codd et al., Providing OLAP to User-Analysts: An IT Mandate. Hyperion Solutions Corporation, 1993.

Windows IT Pro Website Page re: SQL Server Analysis Services 8.0, May 2000.

Fernandez, Red Brick Warehouse: A Read-Mostly RDBMS for Open SMP Platforms . SIGMOD Conference 1994: 492.

Shahzad, Data Warehousing with Oracle, Oracular, Inc. 2011.

aaaprod's website re Hybrid Database single slide of slide presentation, downloaded from http://aaaprod.gsfc.nasa.gov/teaslWaltM/DWTEA/tsld048.htm, on Sep. 11, 2005.

iwaysoftware's website re Accelerating Red Brick Integration, © iWay Software, 1996-2011.

Microsoft SQL Server 7.0—SQL Server Design Goals, Nov. 18, 2002.

Introducing Pilot Designer, Pilot Software, Inc. 1996. See e.g., p. 81-134.

Moorman., The Art of Designing HOlAP Database, SAS Institute Inc. [Paper 139], Proceedings of the Twenty-Fourth Annual SAS Users Group International Conference, Apr. 11-14, 1999.

Weinberger and Ender., The Power of Hybrid OLAP in a Multidimensional World, SAS Institute Inc. [Paper 133-25], Proceedings of the Twenty-Fifth Annual SAS Users Group International Conference, Apr. 9-12, 2000.

Shoshani and Rafanelli., A Model for Representing Statistical Objects, Abstract—lawrence Berkeley Lab, 3rd Int. Conf. on Information Systems and Management of Data (COMD). McGraw Hill, 1991.

Lehner, Modeling large Scale OLAP Scenarios, Advances in Database Technology—EDBT'98—Lecture Notes in Computer Science, 1998, vol. 1377/1998, 151-167, DOI: 10.1007/BFb0100983.

PartitionAggregationss7.txt, May 11, 2005.

Chaudhuri et al., Scalable Classification over SQL Databases, Abstract, ICDE Conference Proceedings, 1999.

Zhao et al., Simultaneous Optimization and Evaluation of Multiple Dimensional Queries, Abstract, SIGMOD '98 Seattle, WA, 1998 ACM.

Han, Towards On-Line Analytical Mining in Large Databases, Abstract, date unknown.

Arbor Essbase 5: Fundamentals,Arbor Software—Driving Business Performance. See e.g., p. 1-1-4-14, 6-1-9-23, 12-1-13-22, 19-1-33-16. Arbor Software Corporation copyright 1996, 1997, 1998.

Hyperion Essbase OLP Server Fundamentals (Training Manual)) © 1991-1999 Hyperion Solutions Corporation. See e.g., p. 1-1-1-9, 3-1-8-23, 13-1-13-45.

Datta et al., A Case for Parallelism in Data Warehousing and OLAP, in the 9th International Workshop on Database and Expert Systems Applications (DEXA98).

Datta and Thomas., A Conceptual Model and Algebra for On-Line Analytical Processing in Data Warehouses Elsevier, Decision Support Systems 27 (1999) 289-301.

Shatdal and Naughton., Adaptive Parallel Aggregation Algorithms, SIGMOD '95, San Jose, CA USA 1995 ACM.

Nadeau and Teorey., A Pareto Model for OLAP View Size Estimation, Information Systems Frontiers 2003—Kluwer Academic Publishers, Manufactured in the Netherlands.

Hired Brains' website page re Article called Data, Data Everywhere written by Neil Raden. Oct. 30, 1995, Information Week.

Agrawal et al., Database Mining: A Performance Perspective, IEEE Transactions on Knowledge and Data Engineering, 1993, vol. 5.

Stanford Technology Group, In. An Informix Company's website page re Designing the Data Warehouse on Relational Databases. Informix. Oct. 30, 1995, Information Week.

Garcia-Molina et al., Invited Talk: Distributed and Parallel Computing Issues in Data Warehousing p. 77. In Symposium on Principles of Distributed Computing 1998.

Hahn et al., Getting Started with DB2 OLAP Server for OS/390, IBM—International Technical Support Organization, Mar. 2000. See e.g., p. 1-18, 53-192.

Johnson and Shasha, Hierarchically Split Cube Forests for Decision Support: description and tuned design. New York University New York, NY © 1996.

Chandra and Harel, Horn Clauses and the Fixpoint Query Hierarchy ACM 1982 pp. 158-163.

Google's website p. re Central Canada DB2 Users Group News Announced: IBM DB2 Universal Database Version 5.2, date unknown.

Salzberg and Reuter, Indexing for Aggregation. High Performance Transaction Systems (HPTS) Workshop 1995.

Media / MR The Hybrid OLAP Technology for the Enterprise, Speedware Corporation, Inc., Nov. 1997.

IBM DB2 OLAP Server and Starter Kit—OLAP Setup and User's Guide Version 7. See e.g., p. 73-146. Copyright International Business Machines Corporation 1998, 2000, First Edition (Jun. 2000).

Albrecht and Lehner, On-Line Analytical Processing in Distributed Data Warehouses. IDEAS proceedings, IEEE Comput. Soc. (1998).

Quass and Widom, On-Line Warehouse View Maintenance for Batch Updates. ACM SIGMOD Conf. 1997.

Sarawagi, Research Report on Computing the Data Cube,IBM Research Division. Research Report 10026, IBM Almaden Research (1996).

Ramsak et al., Physical Data Modeling for Multidimensional Access Methods, 11th GI Workshop on Grundlagen von Datenbanken, Luisenthal. Germany, 1999.

Graefe, Query Evaluation Techniques for Large Databases, ACM Computing Surveys, vol. 25, No. 2, Jun. 1993.

Cabibbo and Torlone, Querying Multidimensional Databases. In Sixth Int. Workshop on Database Programming Languages, 1997.

Gupta, Selection of Views to Materialize in a Data Warehouse. Selection of Views to Materialize in a Data Warehouse, 1997.

Speedware's website page re Media c Features & Benefits, 2005 Activant Solutions Inc.

Bliujute et al., Systematic Change Management in Dimensional Data Warehousing. In Proceeedings of the Third International Baltic Workshop on DB and IS, 1998.

Markl et al., The Transbase Hypercue RDBMS: Multidimensional Indexing of Relational Tables. Proc. of 17th ICDE, Heidelberg, Germany, 2001.

Aho and Ullman, Universality of Data Retrieval Languages pp. 110-120. 1979 ACM.

Advanced Communication Technologies website page re CT's Vision & Strategy, date unknown.

Crystal Reports: A Beginner's Guide. Module 1 Getting Started, Dec. 2001.

Roussoopoulos et al., The Cubetree Storage Organization, Advanced Communication Technology, Inc. Proceedings fo the 24th VLDB Conference New York, USA, 1998.

Organizations Survival website page re New Version of Hyperion Essbase OIAP Server Raises Bar for Deploying Analytic Application Across . . . downloaded from www.organizationalsurvival.com. Sep. 20, 2005.

White Paper—Pilot Analysis Server, Multi-dimensional OLAP Engine Including Hybrid OLAP. 2003 Pilot Software Acquisition Corp.

Seagate Holos 7—Series 1, Supported Platforms, Operating Systems and Databases. 1999 Seagate Software, Inc.

Zaharioudakis et al., Answering Complex SQl Queries Using Automatic Summary Tables, Abstract, MOD 2000 Dallas, TX USA, © ACM 2000.

Zou et al., Back to the Future: Dynamic Hierarchical Clustering, Abstract, 1998 IEEE.

Patel et al., Building a Scalable Geo-Spatial DBMS: Technology, Implementation, and Evaluation, Abstract. SIGMOD '97 AZ, USA, 1997 ACM.

Data Flux Registration's website re Customer Data Integration: Creating One True View of the Customer. 2005 Dataflux Corporation.

Tam, Yin J., Datacube: Its Implementation and Application in OLAP Mining, Thesis. Simon Fraser University Sep. 1998.

Rolleigh et al, Data Integration: The Warehouse Foundation, date unknown.

Chen et al., A Distributed OLAP Infrastructure for E-Commerce, Abstract. (1999).

DSS Lab Comparative Evaluation of Microsoft OLAP Services 7.0 SP1 and Oracle Express 6.3.0, date unknown.

O'Neil et al., Improved Query Performance with Variant Indexes, Abstract. SIGMOD '97 AZ, USA, 1997 ACM.

Stonebraker et al., Mariposa: A Wide-Area Distributed Database System, Abstract. The VLDB Journal (1996) 5: 48-63.

Bonnet et al., My Mother Thinks I'm a DBA! Cross-Platform, Multi-Vendor, Distributed Relational Data Replication with IBM DB2 Data Propagator and IBM DataJoiner Made Easy!, IBM. See e.g., p. 1-138. IBM International Technical Support Organization, Jun. 1999.

Fiser et al., On-Line Analytical Processing on Large Databases Managed by Computational Grids*, Abstract. Proceedings of the $15^{th}$ International Workshop on Database and Expert Systems Applications (DEXA '04).

Oracle. Oracle Express Server Database Administration Guide. Release 6.0. See e.g., p. 1-102, 123-2242, 1996, Oracle Corporation.
Oracle. Oracle Express Analyzer. Release 2.1 Getting Started. See e.g., p. 19-50, 1997 Oracle Corporation.
Cheung et al., Requirement-Based Data Cube Schema Design, Abstract, CIKM '99 Nov. 1999 Kansas City, MO, USA 1999 ACM.
DM Review's website re Analytics Portal: Scalability Stress Test: An Anaylsis of the Scalability of the MicroStrategy and Tandem DSS. 2005 DMReview and SourceMedica, Inc.
Microsoft's website re Microsoft TechNet. SQL Server 7.0 Resource Guide. Printed from Microsoft.com on Sep. 15, 2009.
Article—Hummingbird Acquires Data Transformation Company Leonard's Logic. Printed from taborcommunications.com on Nov. 1, 2005.
Article—Business Objects Delivers Next Version of Comprehensive Business Intelligence Suite. Printed from taborcommunications.com on Nov. 1, 2005.
Oracle Express Release 6.2, Express Language Programming Guide. See e.g., p. 19-186, 345-482. 1998.
Oracle Express Relational Access Manager, User's Guide Release 6.3. See e.g., p. 1-2-3-8, 5-2-B-6.
Printout from Sybase Website "Sybase DirectConnect for Oracle" Printed from Sybase.com on Nov. 1, 2005.
Printout from Sybase Website "Sybase IQ Version 11.0 Product Assessment". Mar. 1996.
Printout from Sybase Website "Understanding Open Server with Customer Success Stories". Copyright 2005, Sybase, Inc.
SQL Server 7.0 Workshop Codename Sphinx, Feb. 25-27, 1998. See e.g., p. 1-116.
TPD (Transaction Processing Performance Council) Interview with Jack Stevens, Francois Raab and Kim Shanley. 2004.
TPC Benchmark D (Decision Support) Standard Specification, Revision 2.1. See e.g., p. 9-114, 146-151. © 1993-1998 Transaction Processing Performance Council (TPC).
IEEE "Bulletin of the Technical Committee on Data Engineering" vol. 20, No. 1 Special Issue on Supporting OLAP Mar. 1997. See e.g., p. 1-48.
Application Programmer's Manual; MetaCube ROLAP Option for Informix Dynamic Server, Version 4.0, Jan. 1998. See e.g., p. 2-1-14-4.
NetCube Product Overview (Just-in-Time, not Just-in-Case Business Intelligence, Unleashing the Knowledge in Your Data) Version 1.7; NetCube, 1997 NetCube Corporation.
NetCube Corporation Milestone and Significant Events, date unknown.
NetCube Performance Overview, copyright 1997 NetCube Corporation.
NetCube ROLAPBuilder and CubeOptimizer Overview, copyright 1997 NetCube Corporation.
SAMS Teach Yourself Microsoft SQL Server 7.0 in 21 Days, Richard Waymire and Rick Sawtell; First Printing Dec. 1998, Sams Publishing, 1999. See e.g., p. 1-742.
Materialized Views Techniques, Implementations, and Applications, Ashish Gupta and Inderpal Singh Mumick, Massachusetts Institute of Technology, 1999. . See e.g., p. 339-420.
The Developer's Handbook to DB2 for Common Servers, Roger E. Sanders, 1997. . See e.g., p. 1-17, 83-158, 561-718.
Professional Data Warehousing With SQL Server 7.0 and OLAP Services, Sakhr Youness; Published by Wrox Press Ltd., 2000. . See e.g., p. 1-131, 327-394, 475-574.
Client/Server Computing With Sybase SQI Server, Joe Salemi, Zift-Davis Press, 1994. See e.g., p. 1-90, 143-190.
Sybase System XI Performance Tuning Strategies, Ronald A. Phillips, Bonnie K. O'Neil, and Marshall Brain, Prentice-Hall, 1996. . See e.g., p. 1-156.
Sybase Replication Server Primer by Charles B. Clifford, McGraW-Hili, 1995. . See e.g., p. 1-172.
Developing Client/Server Systems Using Sybase SQL Server System 11, Sanjiv Purba, John Wiley & Sons, 1996. See e.g., p. 1-81, 297-378, 417-508.
Special Edition Using Sybase System XI, Peter Hazlehurst, Que Corporation, 1996. . See e.g., p. 1-331, 491-704.

Sybase SQL Server on the World Wide Web, Ed Ashley and Beth Epperson, International Thomson Computer Press, 1996. . See e.g., p. 1-21, 235-269.
Data Warehousing With Informix: Best Practices, Angela Sanchez, Informix Press, Prentice Hall, 1998. . See e.g., p. 1-312.11-20.
Informix Guide to Designing Databases and Data Warehouses, Informix Press, Prentice Hall, 2000. See e.g., p. 1-3-.
Proceedings of the International Conference on Parallel and Distributed Processing Techniques and Applications, vol. I, H.R. Arabnia, CSREA Press, 1998. See e.g., p. 415-468, 1127-1190.
Proceedings of the International Conference on Parallel and Distributed Processing Techniques and Applications, vol. II, H.R. Arabnia, CSREA Press, 1998. See e.g., p. 1127-1190.
Proceedings of the International Conference on Parallel and Distributed Processing Techniques and Applications, vol. III H.R. Arabnia, See e.g., p. 415-468, 1127-1190.
Proceedings of the International Conference on Parallel and Distributed Processing Techniques and Applications, vol. IV, H.R. Arabnia, CSREA Press, 1998. See e.g., p. 415-468, 1127-1190.
Upgrading and Migrating to Sybase SQL Server 11, Mitchell Gurspan, International Thomson Computer Press, 1996. . See e.g., p. 189-218, 255-272.
The Computer Glossary, The Complete Illustrated Dictionary, Eighth Edition, Alan Freedman, The Computer Language Company, Inc., © 1998, 1995, 1993, 1991, 1989, 1983, 1981.
Optimizing Informix Applications, Robert D. Schneider, Informix Press, Prentice Hall, 1995. See e.g., p. 13-80.
A Practical Guide to Microsoft OLAP Server, John Shumate, Addison-Wesley, 2000. See e.g., p. 3-84, 125-204, 219-236, 263-282, 309-395.
Using Microsoft SQL Server 7.0, Brad McGehee, Rob Kraft and Matthew Shepker, Oue Corporation, 1999. See e.g., p. 11-66, 507-720.
Running Microsoft Excel, Second Edition, Douglas Cobb, Judy Mynhier, Craig Stinson and Chris Kinata, Microsoft Press, 1991. See e.g., p. 431-445.
Microsoft Windows Software Development Kit, Guide to Programming, Version 3.1, Microsoft Corp, 1992. See e.g., p. 333-366, 511-536.
Essbase Data Server Technical Reference Manual, Version 2.2, Arbor Software, 1992. 1-68, 259-272.
The Informix Handbook, Ron Flannery, Informix Press, Prentice-Hall, 2000. See e.g., p. 1-425, 1101-1340.
Lotusworks Guide, Release 1.1, Spinnnaker Software, 1991. See e.g., p. 3-1-3-44, 7-1-7-52, 16-1-16-42.
Software Engineering With ADA, Grady Booch, Benjamin Cummings Publishing Company, 1983. See e.g., p. 38-45, 119-128.
Software Engineering With ADA, Second Edition, Grady Booch, Benajmin Cummings Publishing Company, 1987. See e.g., p. 142-156.
Sybase Architecture and Administration, John Kirkwood, Ellis Horwood, 1993. See e.g., p. 75-122.
Sybase Performance Tuning, Shaibal Roy and Marc B. Sugiyama, Prentice Hall, 1996. See e.g., p. 49-68, 137-168, 301-366, 441-488, 531-612.
Sybase Database Administrator's Handbook, Brian Hitchcock, Prentice Hall, 1996. See e.g., p. 1-72, 143-510.
Essbase Technical Reference Manual,Version 3.0, Arbor Software, 1994. See e.g., p. 1-62.
Essbase Application Designer Guide, Version 3.0, Arbor Software, 1994. See e.g., p. 1-254, 449-502.
An Introduction to Operating Systems, Harvey M. Deitel, Addison-Wesley, 1984. See e.g., p. 153-246, 321-352.
Microsoft Windows Graphical Environment User's Guide, Version 3.0, Microsoft Corp., 1990. See e.g., p. 433-491.
Running Microsoft Excel, Douglas Cobb and Judy Mynhier, Microsoft Press, 1988. See e.g., p. 431-488.
Advances in Database Technologies, Yahiko Kambayashi, Dik Lun Lee, Ee-Peng Lim, Mukesh Kumar Mohania and Yoshifumi Masunaga, Springer Press, 1998. See e.g., p. 1-180, 382-590.
The Essbase Ready Tools Guide, Arbor Software. See e.g., p. 1-572, © 1996 Arbor Software Corporation.

A Guide to Sybase and SQL Server, D. McGoveran and C.J. Date, Addison-Wesley, 1992. See e.g., p. 3-16, 23-34, 37-49, 55-222, 303-318, 341-432, 473-490.
Data Warehouse From Architecture to Implementation, Barry Devlin, Addison-Wesley, 1997.
Building, Using and Managing the Data Warehouse, Ramon Barquin and Herb Edelstein, Prentice Hall, 1997.
ORACLE8 A Beginner's Guide, Michael Abbey and Micheal J. Corey, Oracle Press, McGraw-Hill, 1997.
ORACLE8 Object-Oriented Design, David Anstey, Coriolis, 1998.
ORACLE8 Tuning, Don Burleson, Coriolis, 1998.
Sybase and Client/Server Computing, Second Edition, Alex Berson and George Anderseon, McGraw-Hill, 1997. See e.g., p. 171-478, 741-842.
ORACLE8 Server Unleashed, Joe Greene, SAMS Publishing, 1998. See e.g., p. 1-72, 169-414, 715-862.
Teach Yourself ORACLE8 in 21 Days, Edward Whalen and Steve Adrien DeLuca, SAMS Publishing, 1998. See e.g., p. 1-530.
ORACLE8 Design Using UML Object Modeling, Dr. Paul Dorsey and Joseph R. Hudicka, Oracle Press, McGraw-Hili, 1999. See e.g., p. 1-472.
ORACLE8 Design Tips, Dave Ensor and Ian Stevenson, O'Reilly & Associates, 1997. See e.g., p. 1-136.
ORACLE8 on Windows NT, Lilian Hobbs, Butterworth-Heinemann, 1998. See e.g., p. 1-168, 251-272.
ORACLE8 Architecture, Steve Bobrowski, Oracle Press, McGraw-Hill 1998. See e.g., p. 1-374.
ORACLE8 DBA Handbook, Kevin Loney, Oracle Press McGraw-Hill, 1998. See e.g., p. 3-474.
Oracle Tuning, Michael J. Corey, Michael Abbey, Daniel J. Dechichio and Ian Abramson, Oracle Press, McGraw-Hill, 1998. See e.g., p. 3-282.
Microsoft Excel User's Guide 2, Microsoft Corp., 1992. See e.g., p. 1-152.
Microsoft Excel Function Reference, Microsoft Corp., 1992. See e.g., p. 1-580.
ORACLE8 How to, Edward Honour, Paul Dalberth, Ari Kaplan and Atul Mehta, Waite Group Press, 1998. See e.g., p. 1-3.
Seagate Crystal Reports 7 for Dummies, Douglas J. Wolf, IDG Books, 1999. See e.g., p. 1-398.
Data Warehousing, Strategies, Technologies and Techniques, Rob Mattison, McGraw Hill,1996. See e.g., p. 1-352, 425-478.
Data Warehousing, Concepts, Technologies Implementations and Management, Harry Singh, Prentice Hall, 1998. See e.g., p. 1-356.
Building a Better Data Warehouse, Don Meyer and Casey Cannon, Prentice Hall, 1998. See e.g., p. 1-239.
Decision Support in the Data Warehouse, Paul Gray and Hugh Watson, Prentice Hall, 1998. See e.g., p. 1-382.
Parallel Systems in the Data Warehouse, Stephen Morse and David Isaac, Prentice Hall, 1998. See e.g., p. 97-384.
Data Warehousing for Dummies, Alan Simon, IDG Books Worldwide, 1997. See e.g., p. 1-362.
Data Warehousing and Data Mining, Implementing Strategic Knowledge Management, Elliot King, PhotoDisc, Inc., 1998. See e.g., p. 1-188.
Managing the Data Warehouse, Practical Techniques for Monitoring Operations, Administering Data and Tools, Managing Change and Growth, W.H. Inmon, J.D. Welch and Katherine Glassey, Wiley Computer Publishing, John Wiley & Sons, 1997. See e.g., p. 1-394.
Planning and Designing the Data Warehouse, Ramon Barquin, Alan Paller, Herb Edelstein, Ellen Levin, Doug Neal, Carol Burleson, David Tabler, Pieter Mimno, Bob Rumsby, Glen Livingston, Neil Raden, Duane Hufford and Mark Poole, Prentice Hall, 1997. See e.g., p. 1-322.
Data Warehouse Practical Advice From the Experts, Joyce Bischoff and Ted Alexander, Prentice Hall, 1997. See e.g., p. 4-119, 174-401.
Data Mining, Data Warehousing & Client/Server Databases, Proceedings of the 8th International Database Workshop, Joseph Fong, Springer, 1997. See e.g., p. 1-348.
Data Warehousing, Data Mining and OLAP, Alex Berson and Stephen Smith, McGraw-Hill, 1997. See e.g., p. 1-46, 67-220, 247-265, 333-440.

On-Line Analytical Processing Systems for Business, Robert Thierauf, Quorum Books, 1997. See e.g., p. 1-342.
Data Warehousing in Action, Sen Kelly, John Wiley & Sons, 1997. See e.g., p. 1-329.
The Essential Guide to Data Warehousing, Lou Agosta, Prentice Hall, 2000. See e.g., p. 1-100, 117-132, 151-238, 313-454.
The Enterprise Data Warehouse, Planning, Building and Implementation, vol. 1, Eric Sperley, Hewlett-Packard, 1999. See e.g., p. 1-349.
Understanding Database Management Systems, Second Edition, Alex Berson, McGraw-Hill, 1998. See e.g., p. 1-90, 119-336, 397-524, 539-644.
The Data Warehouse Challenge, Taming Data Chaos, Michael Brackett, John Wiley & Sons, Inc., 1996. See e.g., p. 1-142, 185-468.
Strategic Data Warehousing Principles Using SAS Software, Peter Welbrock, SAS Institute, 1998. See e.g., p. 1-251.
Building the Operational Data Store, W.H. Inmon, Claudia Imhoff and Greg Battas, John Wiley & Sons, Inc., 1996. See e.g., p. 1-291.
Essbase Web Gateway Workshop, Arbor Software, 1996. See e.g., p. 1-186.
Wired for OLAP Designer & Administrator Version 3.0, Student Guide, Vision Enterprises, 1998. See e.g., p. 1-126.
Crystal Info 6.0 Administrator Workshop, FastPlanet Technologies, 1998. See e.g., p. 1-162.
Essbase Fundamentals, Workbook, Arbor Software, 1997. See e.g., p. 1-180.
Hyperion's Spider-Man Web Application—Administrator, Hyperion Software Operations, Inc., 1998. See e.g., p. 1-390.
Hyperion's Spider-Man Web Application—Technical Training for IS Professionals, Hyperion Software Operations, Inc., 1998. See e.g., p. 1-198.
Arbor Essbase 5, Partitioning Training, Arbor Software, 1997. See e.g., p. 1-225.
Step by Step Microsoft SQL Server 2000 Analysis Services, Reed Jacobsen, Microsoft Press, 2000. See e.g., p. 1-394.
ORACLE8 Data Warehousing, A Practical Guide to Successful Data Warehouse Analysis, Build and Roll Out, Michael Corey, Michael Abbey, Ian Abramson and Ben Taub, Oracle Press, Osborne/McGraw-Hill, 1998. See e.g., p. 1-42, 99-346, 429-664.
Temporal Databases, Theory, Design and Implementation, Tansel Clifford, Gadia Jajodia and Segev Snodgrass, Benjamin Cummings Publishing, 1993. See e.g., p. 1-270, 294-593.
The Data Warehouse Toolkit, Ralph Kimball, John Wiley & Sons, 1996. See e.g., p. 1-106, 143-152, 161-380.
Data Warehousing, Using the Wal-Mart Model, Paul Westerman, Academic Press, 2001. See e.g., p. 1-304.
Using the New DB2 IBM's Object-Relational Database System, Don Chamberlin, Morgan Kaufmann Publishers, 1996. See e.g., p. 1-224, 393-664.
Arbor Essbase Start Here, Version 1.0.1, IBM. See e.g., p. 1-43. © 1991-1998 Arbor Software Corporation.
Arbor Essbase Installation Notes, Version 1.0.1, IBM, Arbor Software, 1998. See e.g., p. 1-318.
Reflex in Business, 17 Practical Examples for Business Analysis Using Relfex, The Analytic Database, Teddi Converse, Wade Ellis, Sr., Wade Ellis, Jr., and Ed Lodi, McGraw- Hill,1985. See e.g., p. 1-270.
Combinatorial Optimization, Algorithms and Complexity, Christos Papadimitriou, and Kenneth Steiglitz, Prentice-Hall, 1982. See e.g., p. 1-25.
ORACLE8i Data Warehousing, Lilian Hobbs and Susan Hillson, Digital Press, 2000. See e.g., p. 1-392.
Using SAP R/3, ASAP World Consultancy, Oue Corporation, 1996. See e.g., p. 1-148, 173-188.
Seagate Info, Report Design Guide, Version 7, Seagate Software, © 1998 Seagate Software Inc. See e.g., p. 1-79, 158-197, 462-595.
Seagate Crystal Reports User's Guide, Version 6.0, Seagate Software, 1997. See e.g., p. 192-215, 472-491, 516-643.
Business Objects User's Guide, Beta 1, Version 5.0 Windows, Business Objects, 1998. See e.g., p. 9-134.
Brioquery 5.0 Handbook, for Microsoft Windows, Apple McIntosh and Motif Systems, Brio Technology, 1997. Brioquery 5.0 Handbook. See e.g., p. 1-2-9-11.

Brioquery Designer and Brioquery Explorer, Version 6.1, Reference Guide, Brio Technology, 2000. See e.g., p. 1-344.
Brio Technology User's Guide, Version 6.0, Brio Technology, 1999. See e.g., p. 1-188.
Crystal Reports 8 for Dummies, Douglas Wolf, IDG Books Worldwide, 2000. See e.g., p. 1-353.
Getting Started With Data Warehouse and Business Intelligence, Maria Sueli Almeida, Missao Ishikawa, Joerg Reinschmidt and Torsten Roeber, IBM 1999. See e.g., p. 1-260.
Using Tivoli Decision Support Guides, Vasfi Gucer, Janet Surasathain, Thomas Gehrke and Frank-Michael Nees, IBM, 1999. See e.g., p. 1-10, 45-132, 371-414.
Data Modeling Techniques for Data Warehousing, Chuck Ballard, Dirk Herreman, Don Schau, Rhonda Bell, Eunsaeng Kim and Ann Valencic, IBM, 1998. See e.g., p. 1-215.
Seagate Crystal Reports 6 Introductory Report Design Training Guide, Seagate Software, 1997. See e.g., p. 1-244.
Essbase API Reference, Arbor Software, 1996. See e.g., p. 1-364.
Essbase Technical Reference 4.0, Arbor Software. See e.g., p. 1-362, © 1991-1994 by Arbor Software Corporation.
The Data Webhouse Toolkit: Building the Web-Enabled Data Warehouse, Ralph Kimball and Richard Merz, Wiley Computer Publishing, John Wiley and Sons, 2000. See e.g., p. 1-40, 129-354.
Oracle 8 Backup & Recovery Handbook: Expert Methods From the Leading Authorities, Rama Velpuri and Anand Adkoli, Oracle Press, Osborne McGraw-Hill, 1998. See e.g., p. 1-226, 371-614.
Informix Dynamic Server With Universal Data Option : Best Practices, Angela Sanchez, Prentice Hall, 1999. See e.g., p. 1-94, 119-388.
Ouattro Pro Version 2.0 User'S Guide, Borland International, Inc., 1987. See e.g., p. 49-80.
Programming Language Concepts, Carlo Ghezzi and Mehdi Jazayeri, John Wiley & Sons, 1982. See e.g., p. 1-341.
Fullwrite Professional Learning Guide, Ashton Tate. See e.g., p. 1-299. Ashton-Tate Corporation 1988.
The Sybase SQL Server Survival Guide, Jim Panttaja, Mary Panttaja and Judy Bowman, Wiley Computer Publishing, John Wiley & Sons, 1996. See e.g., p. 1-374.
Microsoft Data Warehousing: Building Distributed Decision Support Systems, Robert S. Craig, Joseph A. Vivona and David Bercovitch, Wiley Computer Publishing, John Wiley & Sons, 1999. See e.g., p. 1-379.
ORACLE8 Data Warehousing: A Hands-On Guide to Designing, Building, and Managing Oracle Data Warehouses, Gary Dodge and Tim Gorman, Wiley Computer Publishing, John Wiley & Sons, 1998. See e.g., p. 1-638.
Oracle 8 Administration and Management, Michael Ault, Wiley Computer Publishing, John Wiley & Sons, 1998. See e.g., p. 1-110, 135-798.
Building a Data Warehouse for Decision Support, Vidette Poe, Prentice Hall, 1996. See e.g., p. 1-219.
Object-Oriented Data Warehouse Design: Building a Star Schema, William G Giovinazzo, Prentice Hall, 2000. See e.g., p. 1-361.
Informix Universal Data Option, Paul Allen and Joe Bambera, McGraw-Hill, 1999. See e.g., p. 1-230, 313-468, 555-838.
Sybase and Client/Server Computing, Alex Berson and George Anderson, McGraw-Hill, 1995.
Client/Server Database Design With Sybase: A High-Performance and Finetuning Guide, George W. Anderson, McGraw-Hill, 1997. See e.g., p. 1-146, 309-452, 477-570.
Borland Ouattro Pro for Windows, Version 5.0, Borland International, 1993. See e.g., p. 1-10, 353-498.
An Array-Based Algorithm for Simultaneous Multidimensional Aggregates, Yihoug Zhao, Prassad M. Deshpande, Jeffrey F. Naughton, Computer Sciences Department, University of Wisconsin-Madison, SIGMOD '97 AZ, USA, 1997 ACM 0-89791-911.
Microsoft SQL Server 7.0 Databse Implementation Training Kit, Microsoft Press, 1999. See e.g., p. 1-157, 231-328, 381-412.
Microsoft SQL Server 7.0 Data Warehousing Training Kit, Microsoft Press, 2000. See e.g., p. 1-752.
Optimizing SQL Server 7: Planning and Building a High-Performance Database, Second Edition, Robert D. Schneider and Jeffrey R. Garbus, Prentice Hall, 1999. See e.g., p. 1-202, 333-525.
Sybase Developer's Guide, Daniel J. Worden, SAMS Publishing, 1994. See e.g., p. 1-393.
Microsoft SQL Sever OLAP Developer's Guide, William C. Amo, IDG Books Worldwide, 2000. See e.g., p. 1-380.
Data Warehousing, Building the Corporate Knowledgebase, Tom Hammergren, International Thomson Computer Press, 1996. See e.g., p. 1-106, 205-456.
Informix Unleashed, The Comprehensive Solutions Package, John McNally, Glenn Miller, Jim Prajesh and Jose Fortuny, SAMS Publishing, 1997. See e.g., p. 1-718.
Hyperion Essbase 5: Training Fundamentals, Hyperion Solutions Corp. See e.g., p. 1-390.
Hyperion Essbase 5: Training Partitioning, Hyperion Solutions Corp. See e.g., p. 1-292, 441-662.
ORACLE8 Bible, Carol McCullough-Dieter, IDG Books Worldwide, Inc.~ 1998. See e.g., p. 1-292, 441-1090.
Personal Oracle 8: A Voyage Into ORACLE8's Newest Frontier, Richard Fieldhouse, International Thomson Publishing, 1998. See e.g., p. 31-204, 279-342, 401-554.
ORACLE8 Database Administration on Windows NT, Lynnwood Brown, Prentice Hall, 1999. See e.g., p. 1-298.
Sybase Client/Server Explorer, James Bean, Coriolis Group books, 1996. See e.g., p. 67-136, 159-392.
Data Warehouse Management Handbook, Richard Kachur, Prentice Hall, 2000. See e.g., p. 1-346.
ORACLE8 PL/SQL Programming: The Essential Guide for Every Oracle Programmer, Scott Urman, Oracle Press, Osborne McGraw-Hill, 1997. See e.g., p. 1-202, 463-502, 549-960.
ORACLE8 &UNIX Performance Tuning, Ahmed, Prentice Hall, 1999. See e.g., p. 1-345.
ORACLE8 &Windows NT Black Book, Mike Curtis and Jacqueline King, Coriolis Group, 1998. See e.g., p. 1-30, 273-798.
Database Performance Tuning Handbook, Jeff Dunham, McGraw-Hill, 1998. See e.g., p. 137-314, 363-462, 537-558, 585-762.
Datawarehousing: Architecture and Implementation, Mark Humphries, Michael W. Hawkins and Michelle C. Dy, Harris Kern's Enterprise Computing Institute, Prentice Hall, 1999. See e.g., p. 1-372.
Official Sybase Data Warehousing on the Internet: Accessing the Corporate Knowledge Base, Tom Hammergren, International Thomson. See e.g., p. 1-208, 363-592, Copyright 1998 International Thomson Publishing Company.
SQL Server Developer's Guide to OLAP With Analysis Services, Mike Gunderloy and Tim Sneath, Sybex Inc., 2001. See e.g., p. 1-468.
Arbor Essbase 5: Release Training, Arbor Software, 1997. See e.g., p. 1-316.
Hyperion End User Training: Essbase Spreadsheet Ad-In for Excel, Hyperion Solutions, 1998. See e.g., p. 1-278.
Data Mining a Hands-On Approach for Business Professionals, Robert Groth, Prentice Hall, 1998. See e.g., p. 1-295.
Microsoft SQL Server 7 for Dummies, Anthony Mann, Hungry Minds, 1998. See e.g., p. 1-388.
Microsoft OLAP Unleashed, Second Edition, Tim Peterson and Jim Pinkelman, SAMS Publishing, 2000. See e.g., p. 1-890.
Data Warehousing With Microsoft SOL Server 7.0 Technical Reference, Jake Sturm, Microsoft Press, 2000. See e.g., p. 1-240, 264-430.
Official Sybase Internals: Designing and Troubleshooting for High Performance, John Kirkwood, International Thomson Publishing, 1998. See e.g., p. 1-54, 111-186, 329-406.
SQL Server 7 Data Warehousing, Michael Corey, Michael Abbey, Ian Abramson, Larry Barnes, Benajmin Taub and Rajan Venkitachalam. See e.g., p. 1-32, 77-448, Copyright © 1999 by The McGraw-Hill Companies.
Official Sybase SQL Anywhere: A Developer's Guide, Ian Richmond, Steve Clayton and Derek Ball, International Thomson Publishing, 1997. See e.g., p. 1-108, 191-374.
Business Intelligence: The IBM Solution, Datawarehousing and OLAP, Mark Whitehorn and Mary Whitehorn, Springer, 1999. See e.g., p. 1-304.
Sybase SQL Server: Performance and Tuning Guide, Karen Paulsell, Sybase Inc., 1996. See e.g., p. 13-56, 163-334.

Mastering Sybase SQL Server 11, Charles B. Clifford, McGraw-Hill, 1997. See e.g., p. 1-242, 329-532.

ORACLE8 for Dummies, Carol McCullough, IDG Books, 1997. See e.g., p. 1-388.

Sybase SQL Server 11 Unleashed, Ray Rankins, Jeffrey R. Garbus, David Solomon and Bennet W. McEwan, SAMS Publishing, 1996. See e.g., p. 1-226.

ORACLE8 Advanced Tuning & Administration, Eyal Aronoff, Kevin Loney and Noorali Sonawalla, Oracle Press, McGraw-Hill, 1998. See e.g., p. 1-540.

Sybase DBA Companion, Brian Hitchcock, Prentice Hall, 1997. See e.g., p. 1-80, 201-326.

Microsoft OLAP Solutions, Erik Thomsen, George Spofford and Dick Chase, Wiley Computer Publishing, John Wiley & Sons, 1999. See e.g., p. 1-356.

Teach Yourself ORACLE8 Database Development in 21 Days, David Lockman, SAMS Publishing, 1997. See e.g., p. 1-404.

The Data Warehouse Method, Neilson Thomas Debevoise, Prentice Hall, 1999. See e.g., p. 1-208, 261-426.

ORACLE8 Black Book, Michael R. Ault, Coriolis Group Books, 1998. See e.g., p. 1-66, 143-572.

Sybase SQL Server 11 DBA Survival Guide, Second Edition, Jeffrey Garbus, David Solomon, Brian Tretter and Ray Rankins, SAMS Publishing, 1996. See e.g., p. 1-12, 91-362.

Sybase SQL Server 11: An Administrator's Guide, John Kirkwood, International Thomson Computer Press, 1996. See e.g., p. 149-196, 231-540.

Data Warehousing, Sean Kelly, John Wiley & Sons, 1996. See e.g., p. 1-213.

Unlocking OLAP With Microsoft SQL Server and Excel 2000, Wayne S. Freeze, IDG Books, 2000. See e.g., p. 1-462.

Developing Sybase Applications, Daniel J. Worden, Sams Publishing, 1995. See e.g., p. 1-113, 216-440.

Physical Database Design for Sybase SQL Server, Rob Gillette, Dean Muench and Jean Tabaka, Prentice-Hall, 1995. See e.g., p. 1-242.

Discrete Mathematical Structures With Applications to Computer Science, J.P. Tremblay and R. Mahohar, McGraw-Hill, 1975. See e.g., p. 1-103.

Developing Client/Server Systems Using Sybase SQL Server System 10, Sanjiv Purba, John Wiley & Sons, 1994. See e.g., p. 1-399.

Sybase DBA Survival Guide, Jeff Garbus, David Solomon and Brian Tretter, Sams Publishing, 1995. See e.g., p. 1-130, 177-246, 411-490.

ORACLE8 The Complete Reference, George Koch and Kevin Loney, Oracle Press, McGraw-Hill, 1997. See e.g., p. 1-540.

The OLAP Report's website re there is no single, ideal way of storing or processing multidimensional data. 2005.

CA Office Action, re Canadian Application No. CA 2 401 348, dated Jan. 13, 2010.

EPO Examination Report and Notice of Oral Hearing re EP 1 266 308 dated Apr. 23, 2009.

EPO Examination Report re EP 1 266 308 dated Nov. 21, 2006.

EPO Examination Report re EP 1 266 308 dated Oct. 20, 2004.

EPO Supplemental Search Report re EP 1 266 308 dated Jul. 16, 2004.

EPO Decision to Refuse a European Patent re EP 1 266 308 dated Feb. 2, 2010.

PCT International Search Report re PCT/IB2000/01100, dated Jan. 2, 2001.

PCT International Search Report re PCT/US2001/06316 dated May 14, 2001.

PCT International Examination Report re PCT/US2001/06316 dated Dec. 28, 2001.

CA Office Action, re Canadian Application No. CA 2 401 348, dated Jan. 24, 2011.

Thomsen, E.: "OLAP Solutions—Building Multidinemsional Information Systems", 1997 in 5 pages. Exhibit A3 to Appeal Brief.

Colliat, G.: OLAP, Relational, and Multidimensional Database Systems, SIGMOD Record, vol. 25, No. 3, Sep. 1996, pp. 64-69. Exhibit A2 to Appeal Brief.

Japanese Office Action re JP 2001-565050, dated Feb. 15, 2011.

Chaudhuri, et al.: "An Overview of Data Warehousing and OLAP Technology", ACM SIGMOD, vol. 26, Issue 1, Mar. 1997.

Japanese Office Action re JP 2001-565050, dated Jan. 24, 2012.

* cited by examiner

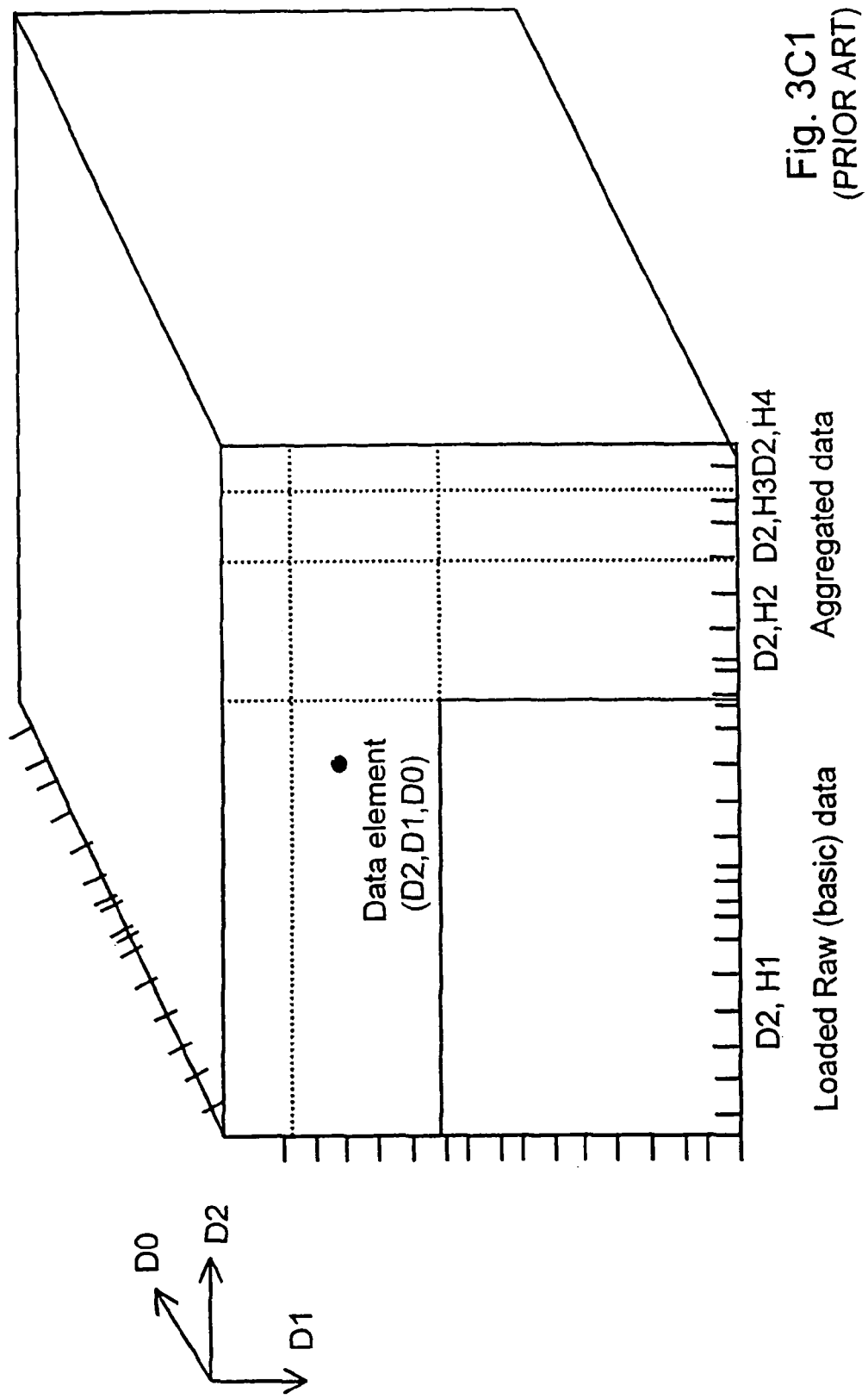

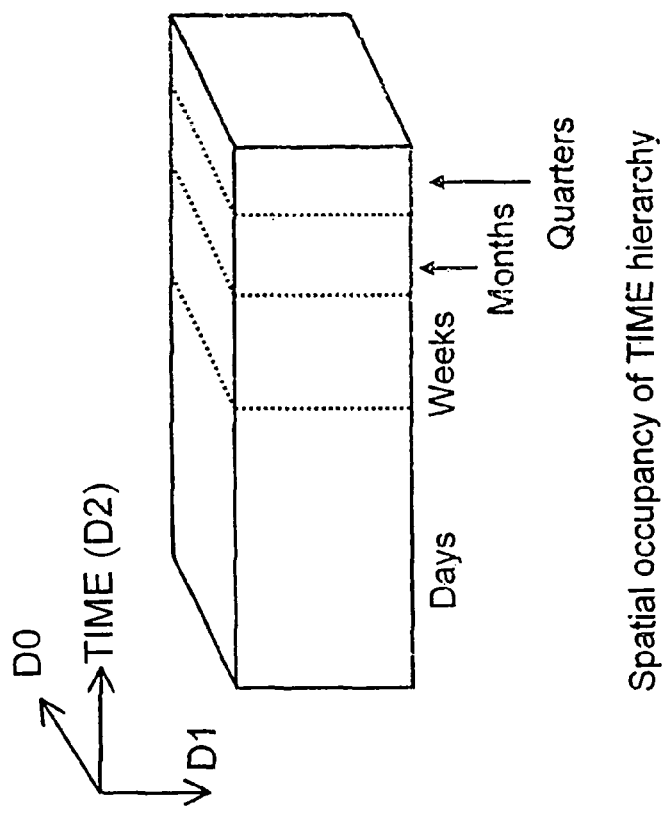
Fig. 3C3
(PRIOR ART)
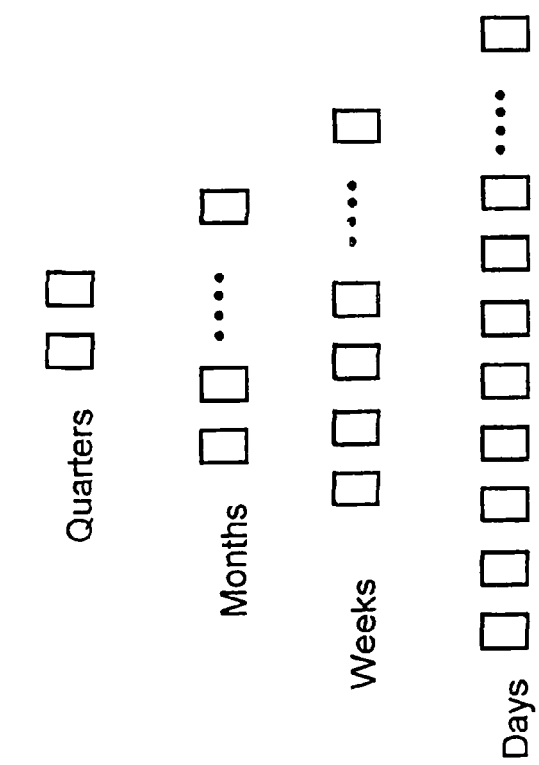
Fig. 3C2
(PRIOR ART)

|    | NBR. OF DIM. | NBR. OF ATOMIC DATA DATA VALUES | LEAF NODE DENSITY % | NUMBER OF VALUES IN CUBE AFTER ROLL-UP | ORACLE EXPRESS V. 6.2 | IMPLEMENTATION OF CURRENT INVENTION |
|----|----|----|----|----|----|----|
| D1 | 6 | 302M | 9 | 427 M | 16 h | 15 m |
| D2 | 4 | 414M | 1.27 | 969 M | 50 m | 5 m |
| D3 | 5 | 14,499M | 0.03 | 63,954 M | 31 h | 1h 23 m |
| D4 | 6 | 623,494M | $8 * 10^{-4}$ | 7,930 G | EXCEEDS 48 h | 2 h 20 m |
| D5 | 6 | 243,000M | $10^{-8}$ | 1,160,000 G | 22 h | 4 m |
| D6 | 4 | 7M | DEFINED AS 100 | 19 M | 15 m | 1 m |

FIG. 8A

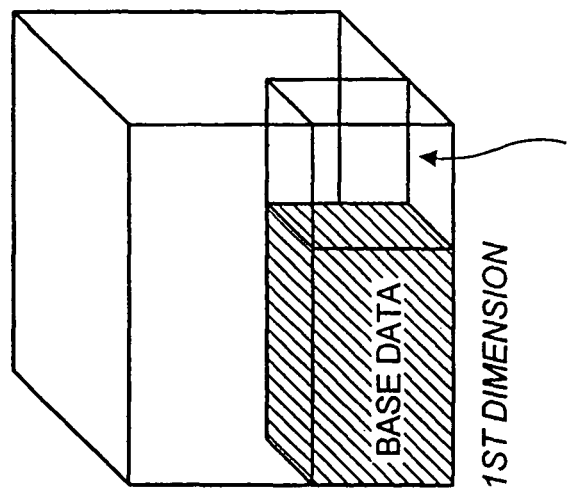

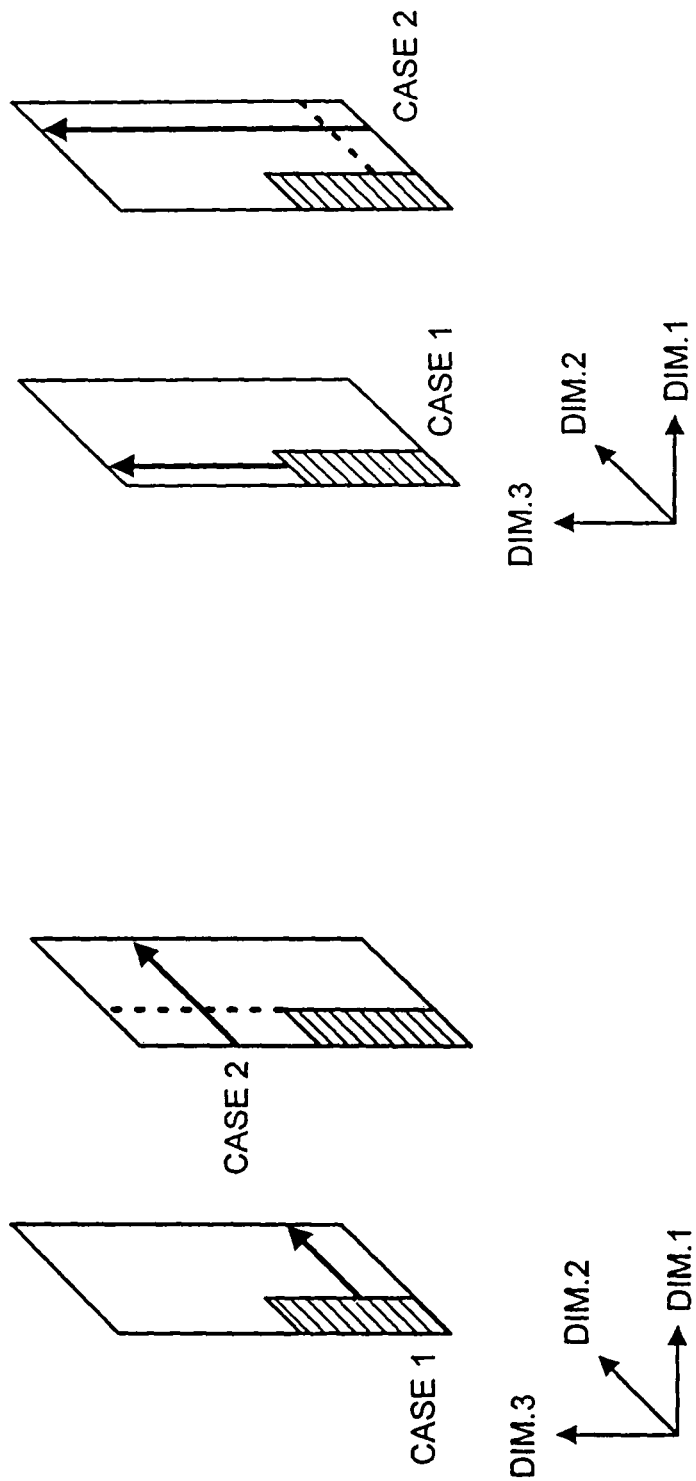

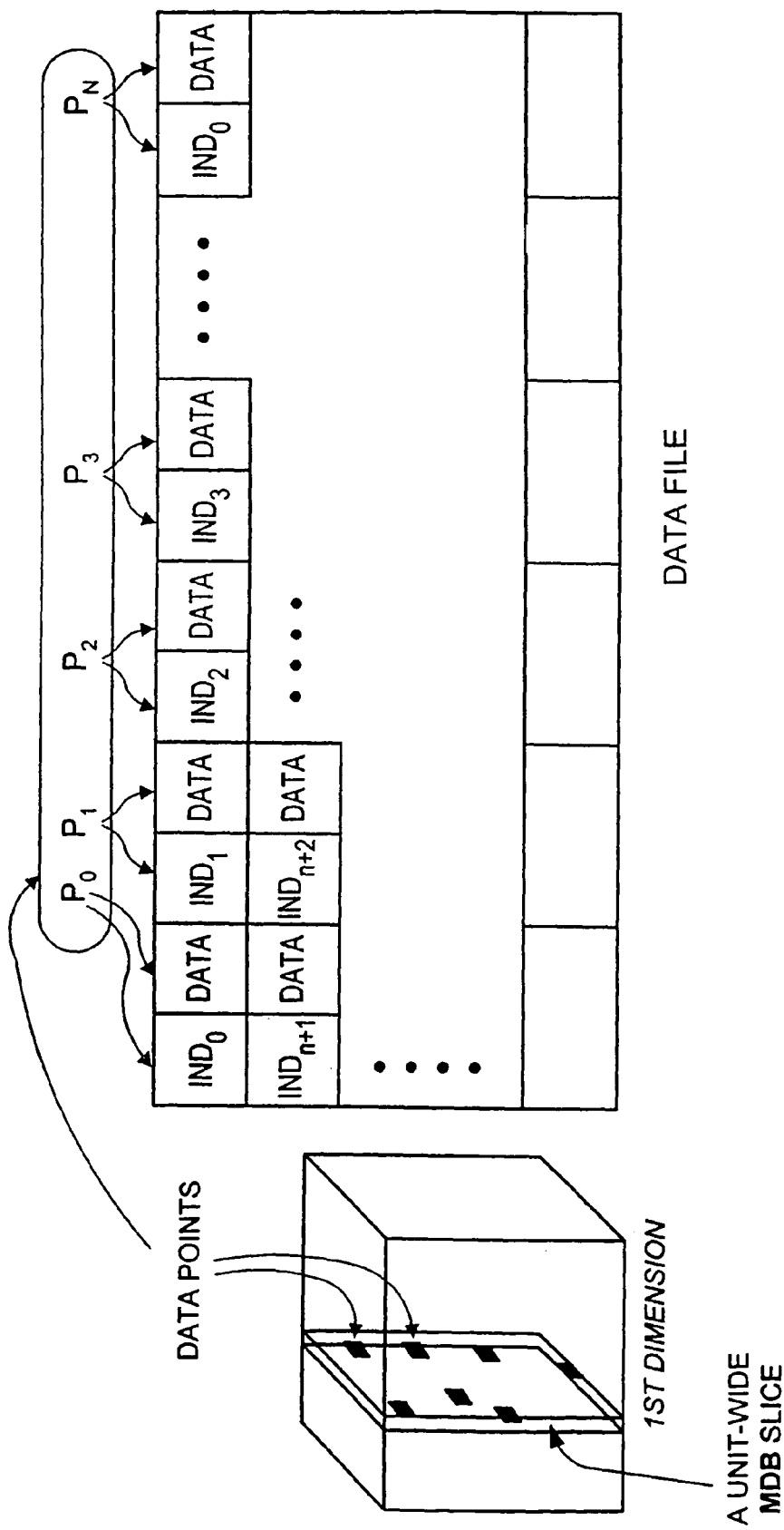
F I G. 10A

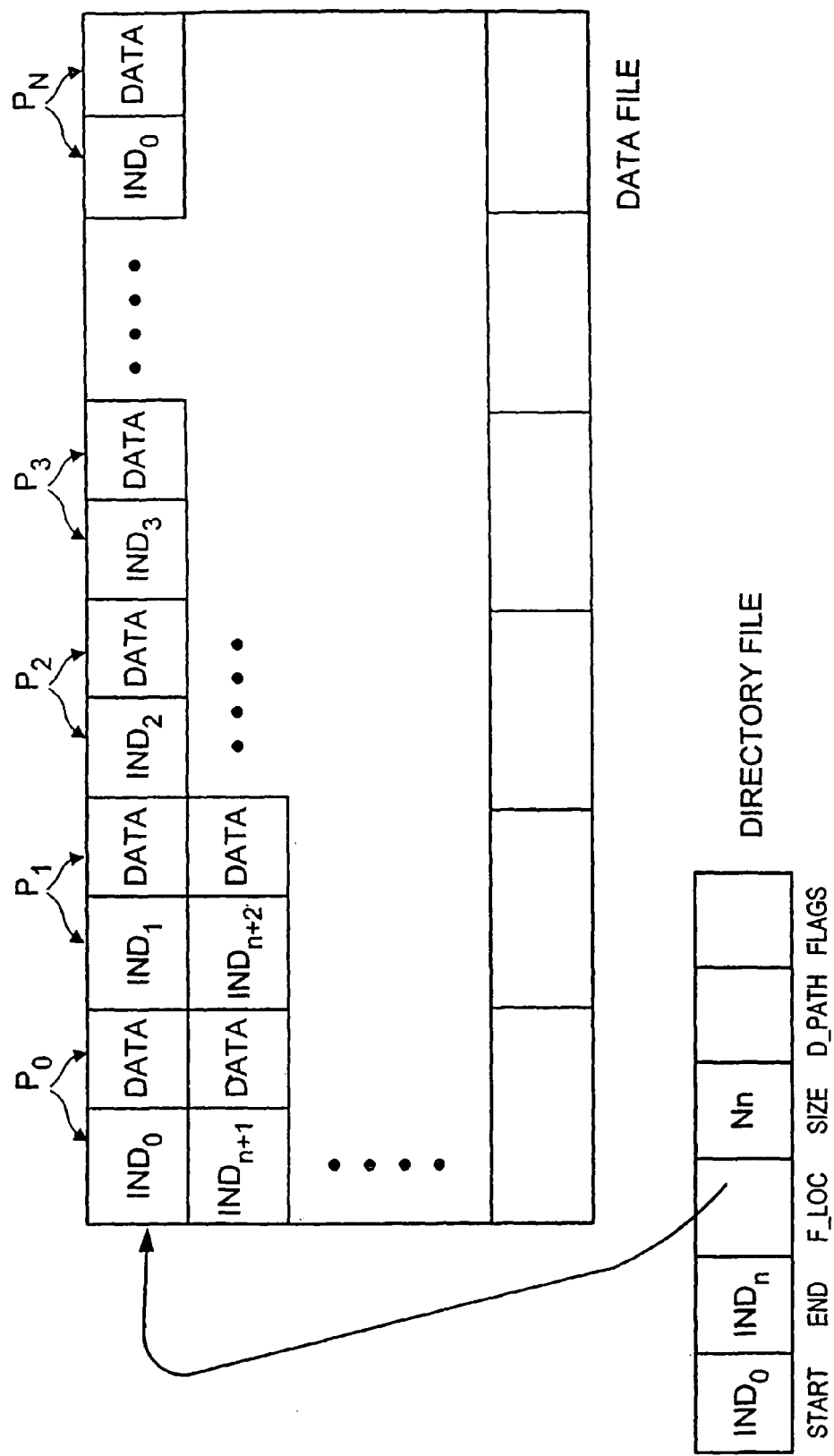
F I G. 10B

STRUCT. 1

STRUCT. 2

STRUCT. 3

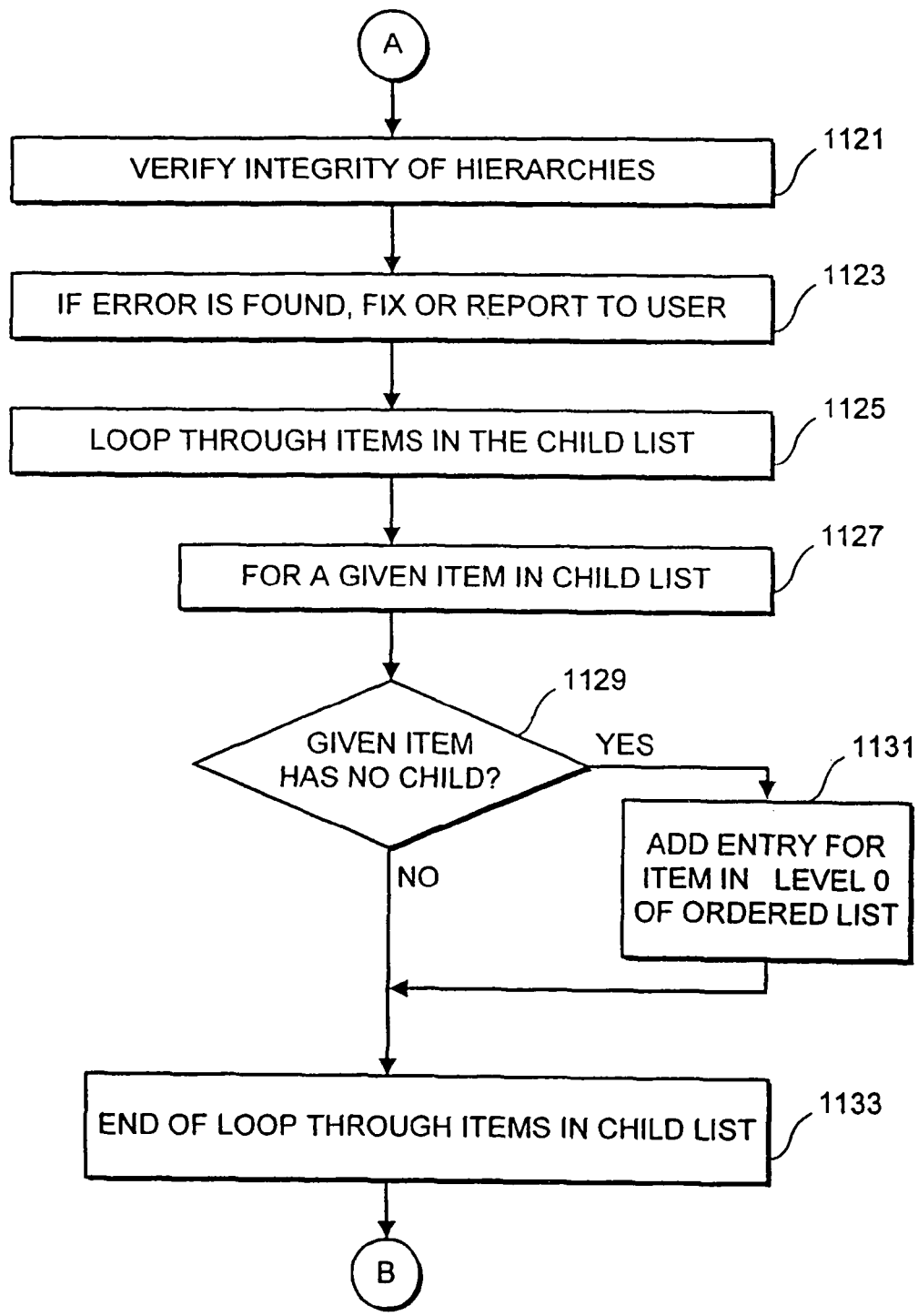
FIG. 11C(ii)

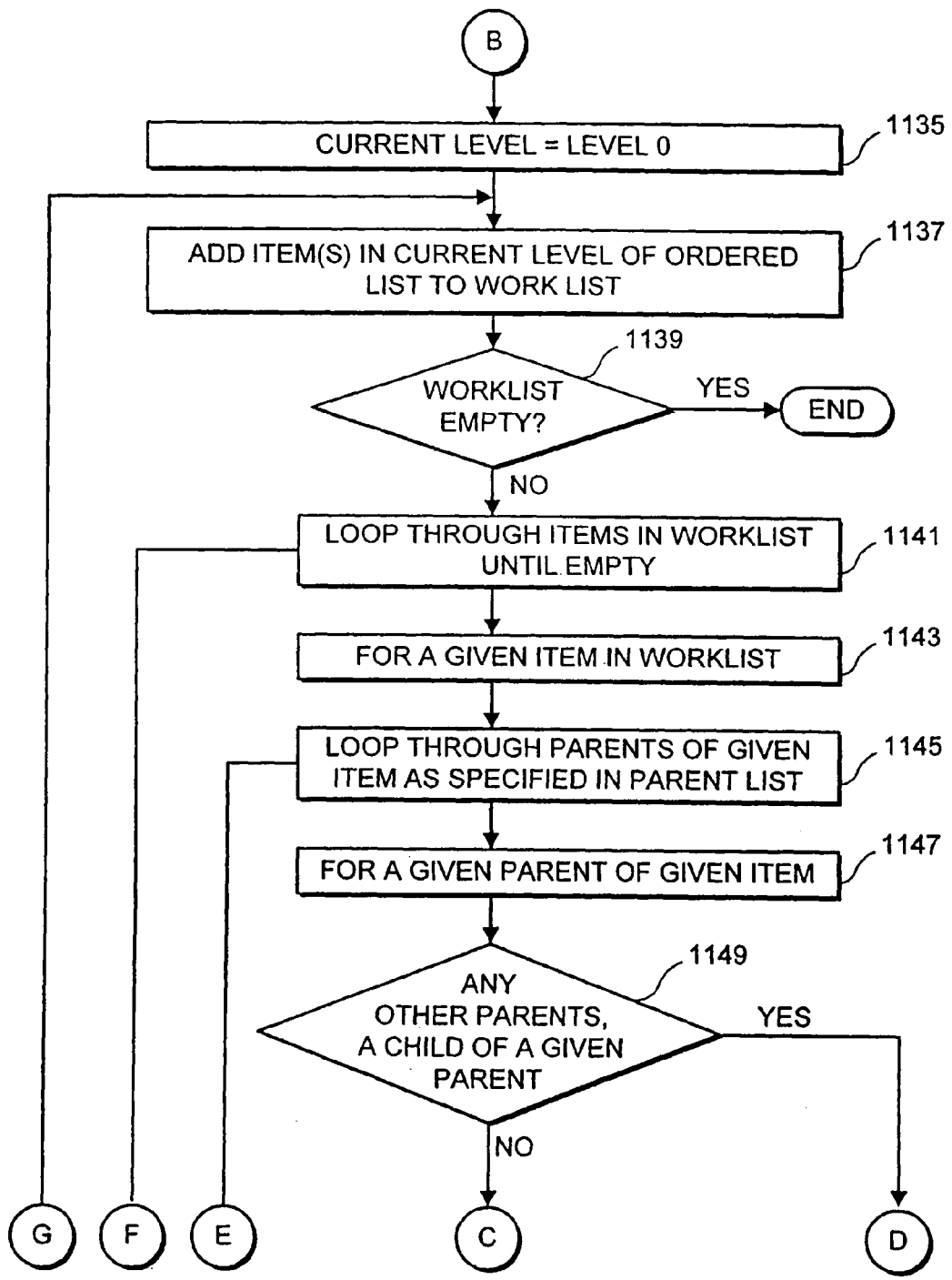
F I G. 11C(iii)

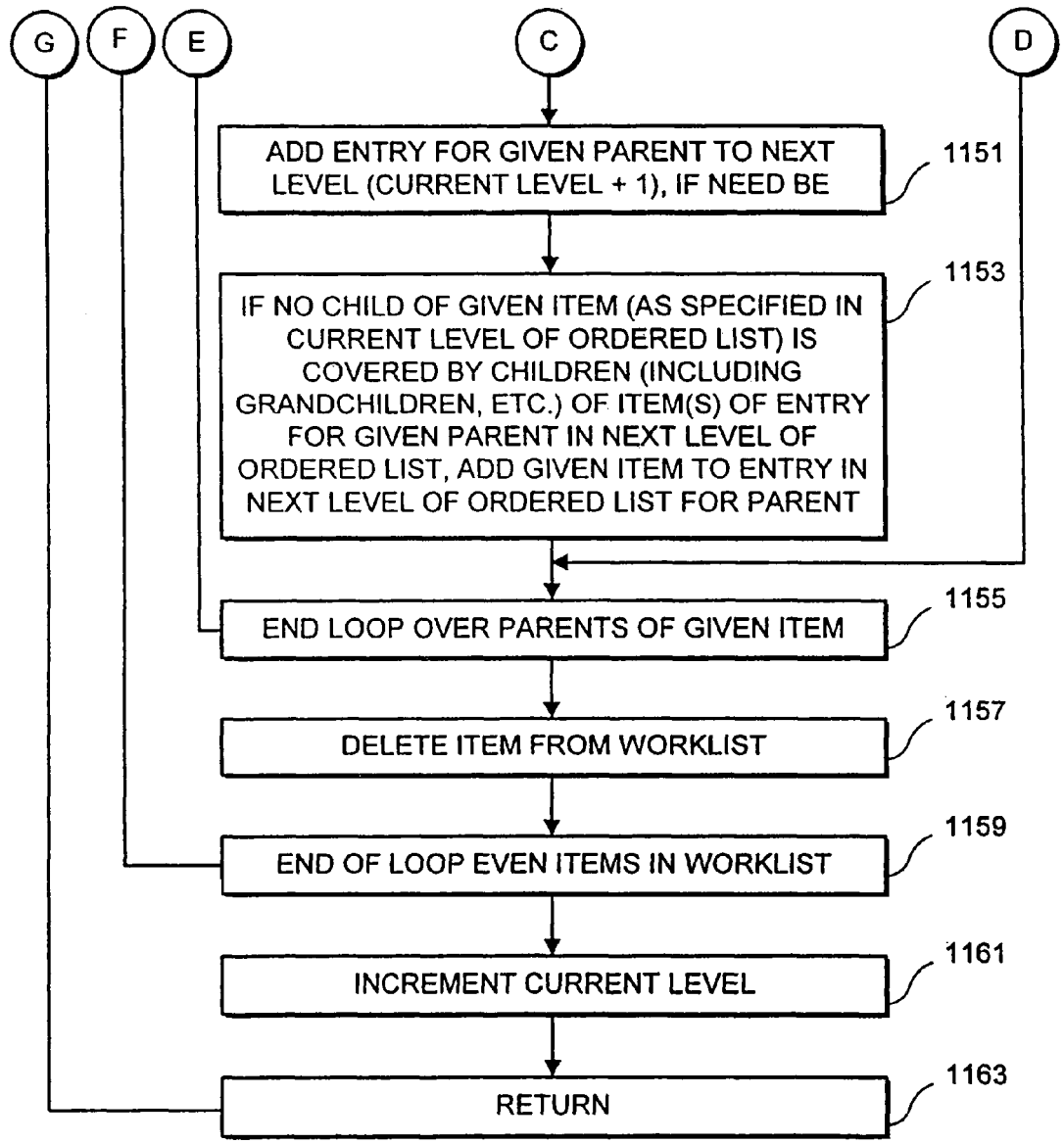
FIG. 11C(iv)

PARENT LIST

| ITEM | PARENT(S) |
|------|-----------|
| A | C, H, D |
| B | C, I, D |
| F | E, H, D |
| G | E, I, D |
| C | D |
| H | D |
| E | D |
| I | D |
| D | — |

FIG. 11C(v)

CHILD LIST

| ITEM | CHILD(REN) |
|------|------------|
| A | — |
| B | — |
| F | — |
| G | — |
| C | <A, B> |
| H | <F, G> |
| E | <A, F> |
| I | <B, G> |
| D | <A, B, F, G>, <H, I>, <C, E> |

FIG. 11C(vi)

ORDERED LIST LEVEL 0

| ITEM | CHILD(REN) |
|------|------------|
| A | — |
| B | — |
| F | — |
| G | — |

FIG. 11C(vii)

ORDERED LIST LEVEL 1

| ITEM | CHILD(REN) |
|------|------------|
| C | A, B |
| H | A, F |
| I | B, G |
| E | F, G |

FIG. 11C(viii)

ORDERED LIST LEVEL 2

| ITEM | CHILD(REN) |
|------|------------|
| D | C, E |

FIG. 11C(ix)

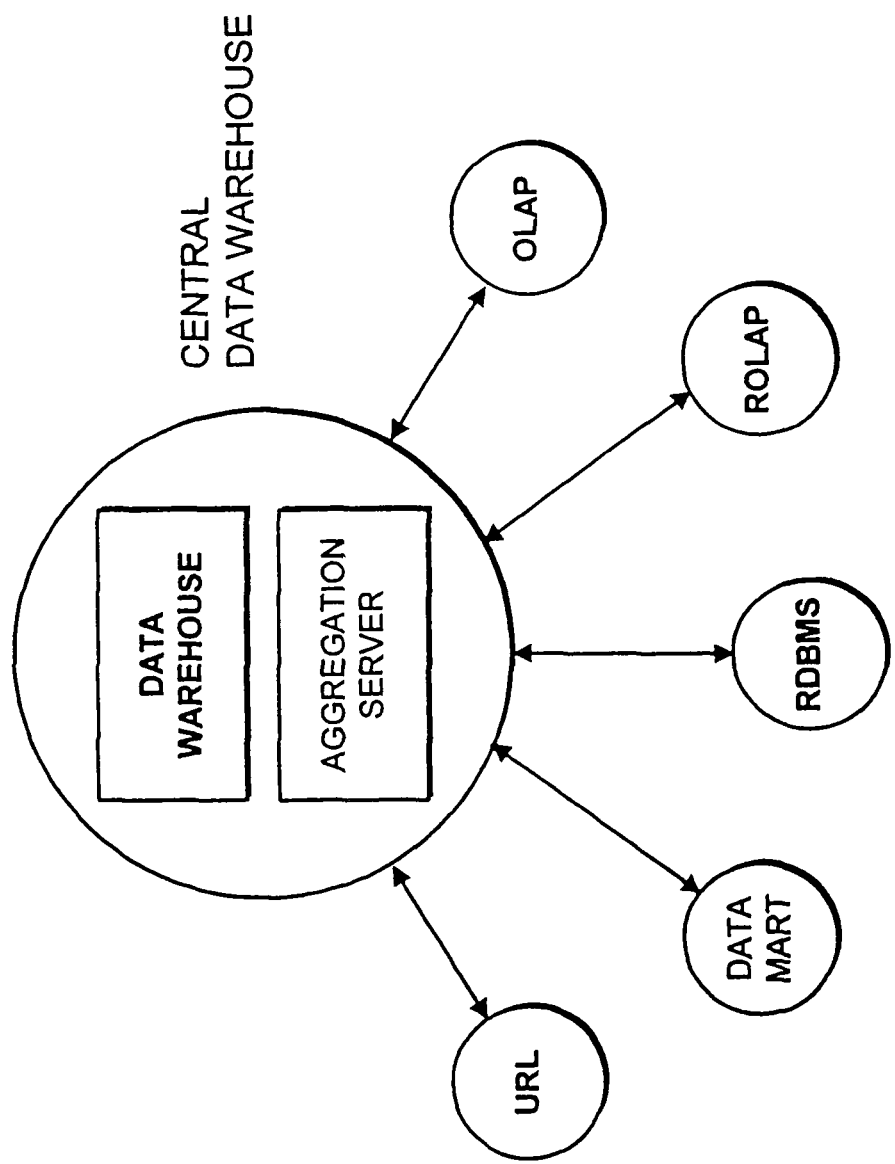
F I G. 13

CELLAR

| WINE | YEAR | BOTTLES |
|---|---|---|
| CHARDONNAY | 1996 | 4 |
| FUME BLANK | 1996 | 2 |
| PINOT NOIR | 1993 | 3 |
| ZINFANDEL | 1994 | 9 |

FIG. 16A

RESTRICT: OPERATOR:

SELECT WINE, YEAR, BOTTLES FROM CELLAR WHERE YEAR IS > 1995;

RESULT

| WINE | YEAR | BOTTLES |
|---|---|---|
| CHARDONNAY | 1996 | 4 |
| FUME BLANK | 1996 | 2 |

FIG. 16B

PROJECT: OPERATOR:

SELECT WINE, BOTTLES FROM CELLAR;

RESULT

| WINE | BOTTLES |
|---|---|
| CHARDONNAY | 4 |
| FUME BLANK | 2 |
| PINOT NOIR | 3 |
| ZINFANDEL | 9 |

FIG. 16C

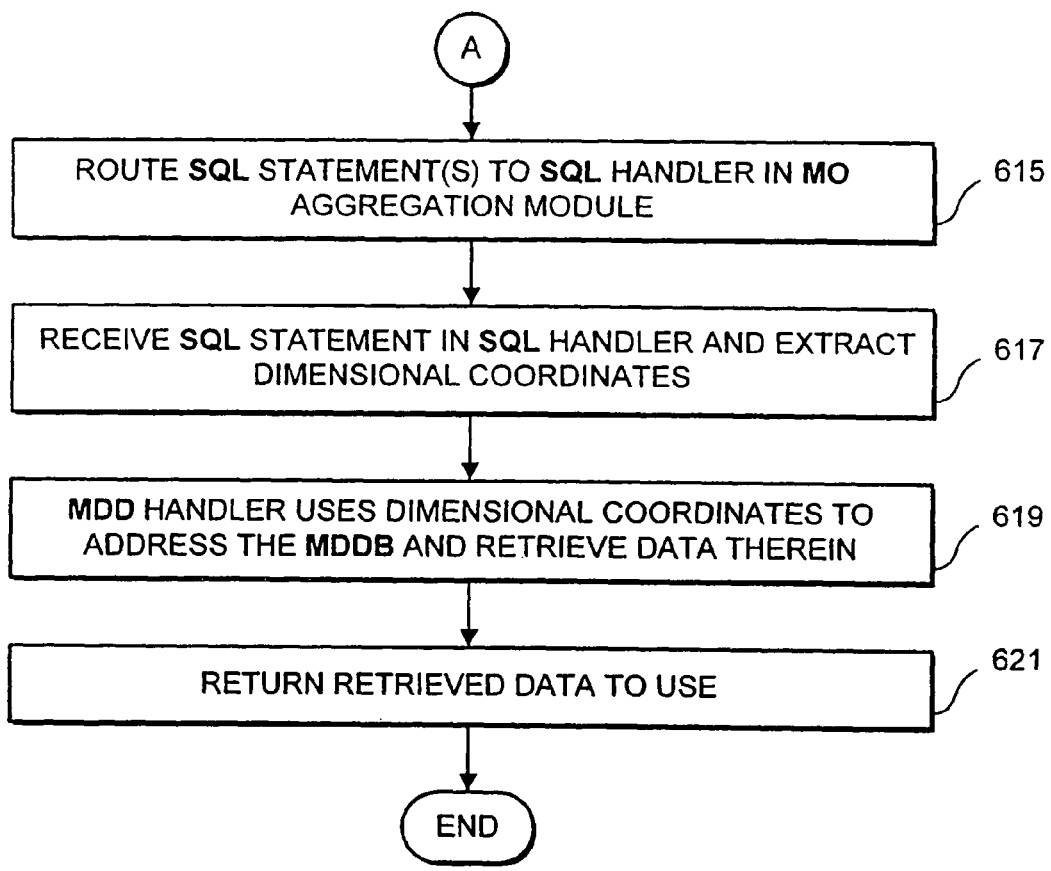
FIG. 19C(ii)

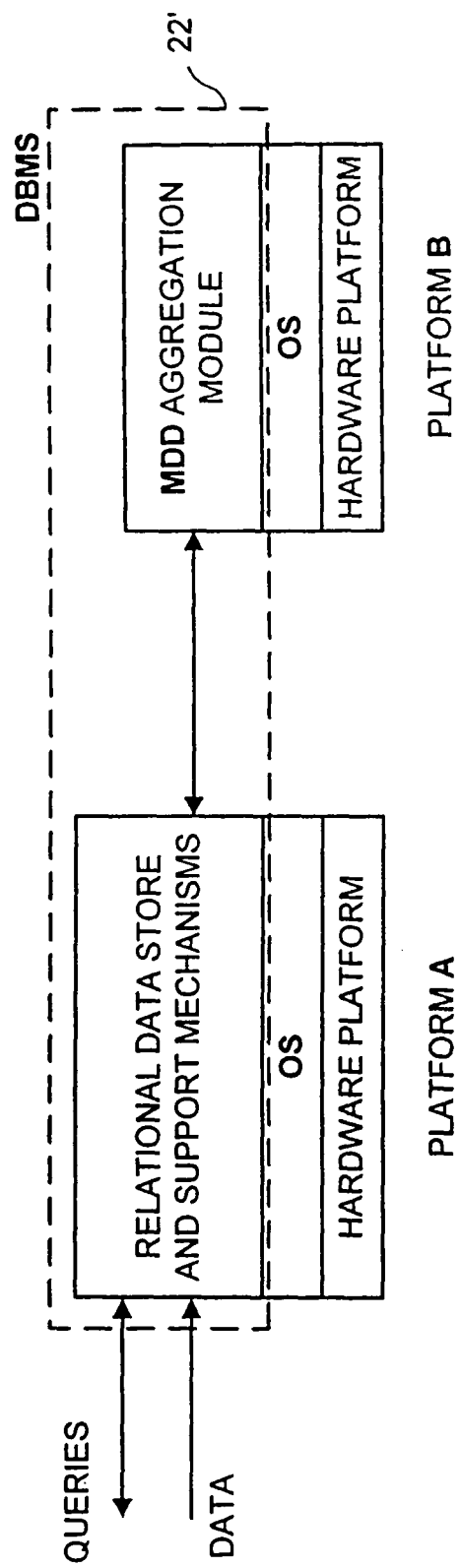
F I G. 20A

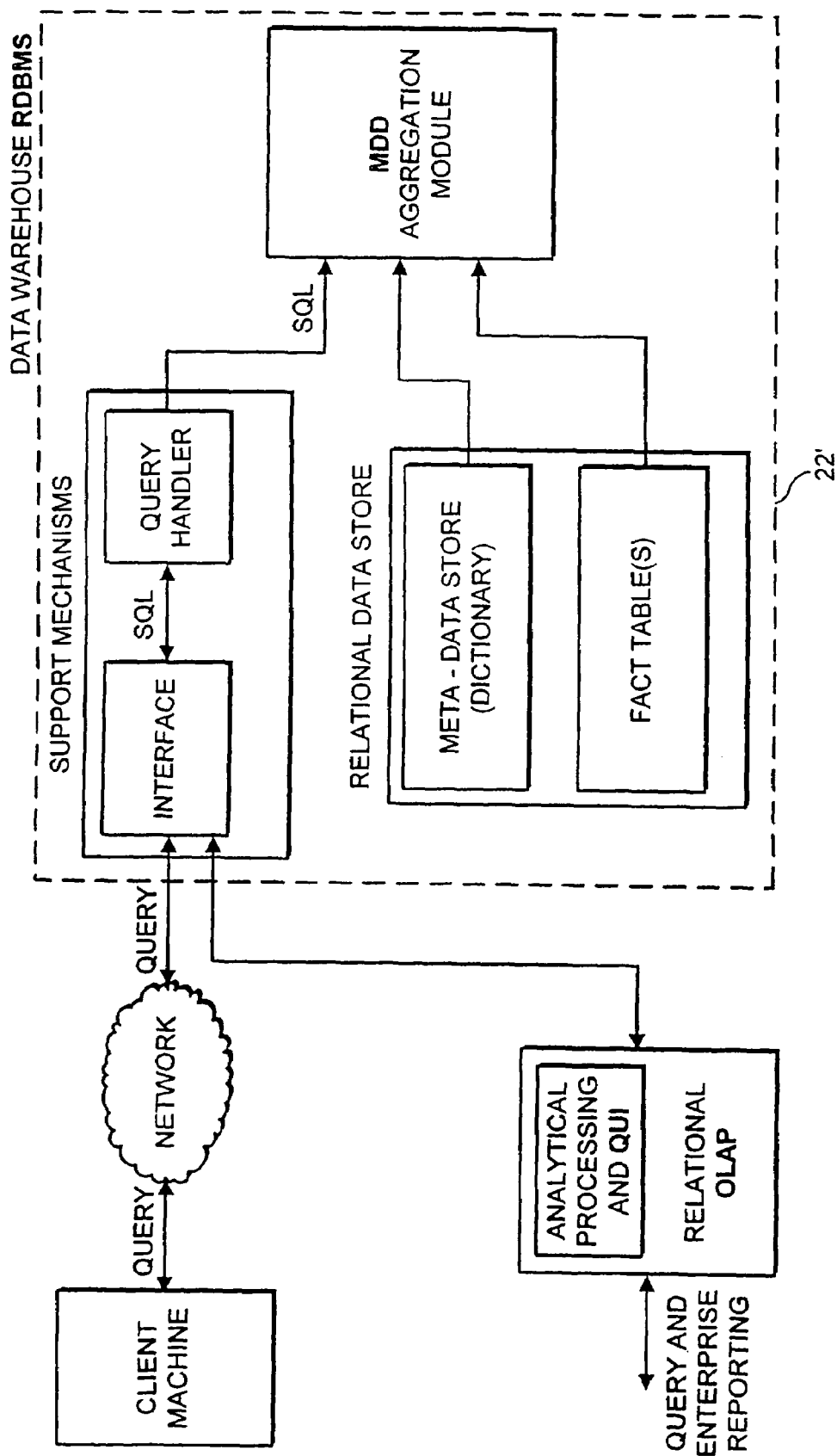
F I G. 21

DATABASE MANAGEMENT SYSTEM (DBMS) EMPLOYING A RELATIONAL DATASTORE AND A MULTI-DIMENSIONAL DATABASE (MDDB) FOR SERVICING QUERY STATEMENTS IN A MANNER TRANSPARENT TO CLIENT MACHINE

RELATED CASES

This is a Continuation of U.S. application Ser. No. 11/888,904 filed Aug. 2, 2007 now abandoned; which is a Continuation of U.S. application Ser. No. 10/839,782 filed May 5, 2004 now abandoned; which is a Continuation of U.S. application Ser. No. 10/314,884 filed Dec. 9, 2002 now U.S. Pat. No. 7,315,849; which is a Continuation of U.S. application Ser. No. 09/796,098 filed Feb. 28, 2001 now abandoned; which is a Continuation-in-part of: U.S. application Ser. No. 09/514,611 filed Feb. 28, 2000, now U.S. Pat. No. 6,434,544, and U.S. application Ser. No. 09/634,748 filed Aug. 9, 2000, now U.S. Pat. No. 6,385,604; each said Application being commonly owned by HyperRoll, Limited, and incorporated herein by reference in its entirety.

BACKGROUND OF THE INVENTION

1. Field of Invention

The present invention relates to a method of and system for aggregating data elements in a multi-dimensional database (MDDB) supported upon a computing platform and also to provide an improved method of and system for managing data elements within a MDDB during on-line analytical processing (OLAP) operations and as an integral part of a database management system.

2. Brief Description of the State of the Art

The ability to act quickly and decisively in today's increasingly competitive marketplace is critical to the success of organizations. The volume of information that is available to corporations is rapidly increasing and frequently overwhelming. Those organizations that will effectively and efficiently manage these tremendous volumes of data, and use the information to make business decisions, will realize a significant competitive advantage in the marketplace.

Data warehousing, the creation of an enterprise-wide data store, is the first step towards managing these volumes of data. The Data Warehouse is becoming an integral part of many information delivery systems because it provides a single, central location where a reconciled version of data extracted from a wide variety of operational systems is stored. Over the last few years, improvements in price, performance, scalability, and robustness of open computing systems have made data warehousing a central component of Information Technology CIT strategies. Details on methods of data integration and constructing data warehouses can be found in the white paper entitled "Data Integration: The Warehouse Foundation" by Louis Rolleigh and Joe Thomas.

Building a Data Warehouse has its own special challenges (e.g. using common data model, common business dictionary, etc.) and is a complex endeavor. However, just having a Data Warehouse does not provide organizations with the often-heralded business benefits of data warehousing. To complete the supply chain from transactional systems to decision maker, organizations need to deliver systems that allow knowledge workers to make strategic and tactical decisions based on the information stored in these warehouses. These decision support systems are referred to as On-Line Analytical Processing (OLAP) systems. OLAP systems allow knowledge workers to intuitively, quickly, and flexibly manipulate operational data using familiar business terms, in order to provide analytical insight into a particular problem or line of inquiry. For example, by using an OLAP system, decision makers can "slice and dice" information along a customer (or business) dimension, and view business metrics by product and through time. Reports can be defined from multiple perspectives that provide a high-level or detailed view of the performance of any aspect of the business. Decision makers can navigate throughout their database by drilling down on a report to view elements at finer levels of detail, or by pivoting to view reports from different perspectives. To enable such full-functioned business analysis, OLAP systems need to (1) support sophisticated analysis, (2) scale to large numbers of dimensions, and (3) support analysis against large atomic data sets. These three key requirements are discussed further below.

Decision makers use key performance metrics to evaluate the operations within their domain, and OLAP systems need to be capable of delivering these metrics in a user-customizable format. These metrics may be obtained from the transactional databases pre-calculated and stored in the database, or generated on demand during the query process. Commonly used metrics include:

(1) Multidimensional Ratios (e.g. Percent to Total)—"Show me the contribution to weekly sales and category profit made by all items sold in the Northwest stores between July 1 and July 14."
(2) Comparisons (e.g. Actual vs. Plan, This Period vs. Last Period)—"Show me the sales to plan percentage variation for this year and compare it to that of the previous year to identify planning discrepancies."
(3) Ranking and Statistical Profiles (e.g. Top N/Bottom N, 70/30, Quartiles)—"Show me sales, profit and average call volume per day for my 20 most profitable salespeople, who are in the top 30% of the worldwide sales."
(4) Custom Consolidations—"Show me an abbreviated income statement by quarter for the last two quarters for my Western Region operations."

Knowledge workers analyze data from a number of different business perspectives or dimensions. As used hereinafter, a dimension is any element or hierarchical combination of elements in a data model that can be displayed orthogonally with respect to other combinations of elements in the data model. For example, if a report lists sales by week, promotion, store, and department, then the report would be a slice of data taken from a four-dimensional data model.

Target marketing and market segmentation applications involve extracting highly qualified result sets from large volumes of data. For example, a direct marketing organization might want to generate a targeted mailing list based on dozens of characteristics, including purchase frequency, size of the last purchase, past buying trends, customer location, age of customer, and gender of customer. These applications rapidly increase the dimensionality requirements for analysis.

The number of dimensions in OLAP systems range from a few orthogonal dimensions to hundreds of orthogonal dimensions. Orthogonal dimensions in an exemplary OLAP application might include Geography, Time, and Products.

Atomic data refers to the lowest level of data granularity required for effective decision making. In the case of a retail merchandising manager, "atomic data" may refer to information by store, by day, and by item. For a banker, atomic data may be information by account, by transaction, and by branch. Most organizations implementing OLAP systems find themselves needing systems that can scale to tens, hundreds, and even thousands of gigabytes of atomic information.

As OLAP systems become more pervasive and are used by the majority of the enterprise, more data over longer time frames will be included in the data store (i.e. data warehouse), and the size of the database will increase by at least an order of magnitude. Thus, OLAP systems need to be able to scale from present to near-future volumes of data.

In general, OLAP systems need to (1) support the complex analysis requirements of decision-makers, (2) analyze the data from a number of different perspectives (i.e. business dimensions), and (3) support complex analyses against large input (atomic-level) data sets from a Data Warehouse maintained by the organization using a relational database management system (RDBMS).

Vendors of OLAP systems classify OLAP Systems as either Relational OLAP (ROLAP) or Multidimensional OLAP (MOLAP) based on the underlying architecture thereof. Thus, there are two basic architectures for On-Line Analytical Processing systems: the ROLAP Architecture, and the MOLAP architecture.

The Relational OLAP (ROLAP) system accesses data stored in a Data Warehouse to provide OLAP analyses. The premise of ROLAP is that OLAP capabilities are best provided directly against the relational database, i.e. the Data Warehouse.

The ROLAP architecture was invented to enable direct access of data from Data Warehouses, and therefore support optimization techniques to meet batch window requirements and provide fast response times. Typically, these optimization techniques include application-level table partitioning, pre-aggregate inferencing, denormalization support, and the joining of multiple fact tables.

A typical prior art ROLAP system has a three-tier or layer client/server architecture. The "database layer" utilizes relational databases for data storage, access, and retrieval processes. The "application logic layer" is the ROLAP engine which executes the multidimensional reports from multiple users. The ROLAP engine integrates with a variety of "presentation layers," through which users perform OLAP analyses.

After the data model for the data warehouse is defined, data from on-line transaction-processing (OLTP) systems is loaded into the relational database management system (RDBMS). If required by the data model, database routines are run to pre-aggregate the data within the RDBMS. Indices are then created to optimize query access times. End users submit multidimensional analyses to the ROLAP engine, which then dynamically transforms the requests into SQL execution plans. The SQL execution plans are submitted to the relational database for processing, the relational query results are cross-tabulated, and a multidimensional result data set is returned to the end user. ROLAP is a fully dynamic architecture capable of utilizing pre-calculated results when they are available, or dynamically generating results from atomic information when necessary.

Multidimensional OLAP (MOLAP) systems utilize a proprietary multidimensional database (MDDB) to provide OLAP analyses. The MDDB is logically organized as a multidimensional array (typically referred to as a multidimensional cube or hypercube or cube) whose rows/columns each represent a different dimension (i.e., relation). A data value is associated with each combination of dimensions (typically referred to as a "coordinate"). The main premise of this architecture is that data must be stored multidimensionally to be accessed and viewed multidimensionally.

As shown in FIG. 1B, prior art MOLAP systems have an Aggregation, Access and Retrieval module which is responsible for all data storage, access, and retrieval processes, including data aggregation (i.e. preaggregation) in the MDDB. As shown in FIG. 1B, the base data loader is fed with base data, in the most detailed level, from the Data Warehouse, into the Multi-Dimensional Data Base (MDDB). On top of the base data, layers of aggregated data are built-up by the Aggregation program, which is part of the Aggregation, Access and Retrieval module. As indicated in this figure, the application logic module is responsible for the execution of all OLAP requests/queries (e.g. ratios, ranks, forecasts, exception scanning, and slicing and dicing) of data within the MDDB. The presentation module integrates with the application logic module and provides an interface, through which the end users view and request OLAP analyses on their client machines which may be web-enabled through the infrastructure of the Internet. The client/server architecture of a MOLAP system allows multiple users to access the same multidimensional database (MDDB).

Information (i.e. basic data) from a variety of operational systems within an enterprise, comprising the Data Warehouse, is loaded into a prior art multidimensional database (MDDB) through a series of batch routines. The Express™ server by the Oracle Corporation is exemplary of a popular server which can be used to carry out the data loading process in prior art MOLAP systems. As shown in FIG. 2B, an exemplary 3-D MDDB is schematically depicted, showing geography, time and products as the "dimensions" of the database. The multidimensional data of the MDDB is logically organized in an array structure, as shown in FIG. 2C. Physically, the Express™ server stores data in pages (or records) of an information file. Pages contain 512, or 2048, or 4096 bytes of data, depending on the platform and release of the Express™ server. In order to look up the physical record address from the database file recorded on a disk or other mass storage device, the Express™ server generates a data structure referred to as a "Page Allocation Table (PAT)". As shown in FIG. 2D, the PAT tells the Express™ server the physical record number that contains the page of data. Typically, the PAT is organized in pages. The simplest way to access a data element in the MDDB is by calculating the "offset" using the additions and multiplications expressed by a simple formula:

$$Offset=Months+Product*(\#\ of\_Months)+City*(\#\ of\_Months*\#\ of\_Products)$$

During an OLAP session, the response time of a multidimensional query on a prior art MDDB depends on how many cells in the MDDB have to be added "on the fly". As the number of dimensions in the MDDB increases linearly, the number of the cells in the MDDB increases exponentially. However, it is known that the majority of multidimensional queries deal with summarized high level data. Thus, as shown in FIGS. 3A and 3B, once the atomic data (i.e. "basic data") has been loaded into the MDDB, the general approach is to perform a series of calculations in batch in order to aggregate (i.e. pre-aggregate) the data elements along the orthogonal dimensions of the MDDB and fill the array structures thereof. For example, revenue figures for all retail stores in a particular state (i.e. New York) would be added together to fill the state level cells in the MDDB. After the array structure in the database has been filled, integer-based indices are created and hashing algorithms are used to improve query access times. Pre-aggregation of dimension D0 is always performed along the cross-section of the MDDB along the D0 dimension.

As shown in FIGS. 3C1 and 3C2, the raw data loaded into the MDDB is primarily organized at its lowest dimensional hierarchy, and the results of the pre-aggregations are stored in the neighboring parts of the MDDB.

As shown in FIG. 3C2, along the TIME dimension, weeks are the aggregation results of days, months are the aggregation results of weeks, and quarters are the aggregation results of months. While not shown in the figures, along the GEOGRAPHY dimension, states are the aggregation results of cities, countries are the aggregation results of states, and continents are the aggregation results of countries. By pre-aggregating (i.e. consolidating or compiling) all logical subtotals and totals along all dimensions of the MDDB, it is possible to carry out real-time MOLAP operations using a multidimensional database (MDDB) containing both basic (i.e. atomic) and pre-aggregated data. Once this compilation process has been completed, the MDDB is ready for use. Users request OLAP reports by submitting queries through the OLAP Application interface (e.g. using web-enabled client machines), and the application logic layer responds to the submitted queries by retrieving the stored data from the MDDB for display on the client machine.

Typically, in MDDB systems, the aggregated data is very sparse, tending to explode as the number of dimension grows and dramatically slowing down the retrieval process (as described in the report entitled "Database Explosion: The OLAP Report", incorporated herein by reference). Quick and on line retrieval of queried data is critical in delivering on-line response for OLAP queries. Therefore, the data structure of the MDDB, and methods of its storing, indexing and handling are dictated mainly by the need of fast retrieval of massive and sparse data.

Different solutions for this problem are disclosed in the following US Patents, each of which is incorporated herein by reference in its entirety:

U.S. Pat. No. 5,822,751 "Efficient Multidimensional Data Aggregation Operator Implementation"

U.S. Pat. No. 5,805,885 "Method And System For Aggregation Objects"

U.S. Pat. No. 5,781,896 "Method And System For Efficiently Performing Database Table Aggregation Using An Aggregation Index"

U.S. Pat. No. 5,745,764 "Method And System For Aggregation Objects"

In all the prior art OLAP servers, the process of storing, indexing and handling MDDB utilize complex data structures to largely improve the retrieval speed, as part of the querying process, at the cost of slowing down the storing and aggregation. The query-bounded structure, that must support fast retrieval of queries in a restricting environment of high sparcity and multi-hierarchies, is not the optimal one for fast aggregation.

In addition to the aggregation process, the Aggregation, Access and Retrieval module is responsible for all data storage, retrieval and access processes. The Logic module is responsible for the execution of OLAP queries. The Presentation module intermediates between the user and the logic module and provides an interface through which the end users view and request OLAP analyses. The client/server architecture allows multiple users to simultaneously access the multidimensional database.

In summary, general system requirements of OLAP systems include: (1) supporting sophisticated analysis, (2) scaling to large number of dimensions, and (3) supporting analysis against large atomic data sets.

MOLAP system architecture is capable of providing analytically sophisticated reports and analysis functionality. However, requirements (2) and (3) fundamentally limit MOLAP's capability, because to be effective and to meet end-user requirements, MOLAP databases need a high degree of aggregation.

By contrast, the ROLAP system architecture allows the construction of systems requiring a low degree of aggregation, but such systems are significantly slower than systems based on MOLAP system architecture principles. The resulting long aggregation times of ROLAP systems impose severe limitations on its volumes and dimensional capabilities.

The graphs plotted in FIG. 5 clearly indicate the computational demands that are created when searching an MDDB during an OLAP session, where answers to queries are presented to the MOLAP system, and answers thereto are solicited often under real-time constraints. However, prior art MOLAP systems have limited capabilities to dynamically create data aggregations or to calculate business metrics that have not been precalculated and stored in the MDDB.

The large volumes of data and the high dimensionality of certain market segmentation applications are orders of magnitude beyond the limits of current multidimensional databases.

ROLAP is capable of higher data volumes. However, the ROLAP architecture, despite its high volume and dimensionality superiority, suffers from several significant drawbacks as compared to MOLAP:

Full aggregation of large data volumes are very time consuming, otherwise, partial aggregation severely degrades the query response.

It has a slower query response

It requires developers and end users to know SQL

SQL is less capable of the sophisticated analytical functionality necessary for OLAP ROLAP provides limited application functionality Thus, improved techniques for data aggregation within MOLAP systems would appear to allow the number of dimensions of and the size of atomic (i.e. basic) data sets in the MDDB to be significantly increased, and thus increase the usage of the MOLAP system architecture.

Also, improved techniques for data aggregation within ROLAP systems would appear to allow for maximized query performance on large data volumes, and reduce the time of partial aggregations that degrades query response, and thus generally benefit ROLAP system architectures.

Thus, there is a great need in the art for an improved way of and means for aggregating data elements within a multi-dimensional database (MDDB), while avoiding the shortcomings and drawbacks of prior art systems and methodologies.

Modern operational and informational database systems, as described above, typically use a database management system (DBMS) (such as an RDBMS system, object database system, or object/relational database system) as a repository for storing data and querying the data. FIG. 14 illustrates a data warehouse-OLAP domain that utilizes the prior art approaches described above. The data warehouse is an enterprise-wide data store. It is becoming an integral part of many information delivery systems because it provides a single, central location wherein a reconciled version of data extracted from a wide variety of operational systems is stored. Details on methods of data integration and constructing data warehouses can be found in the white paper entitled "Data Integration: The Warehouse Foundation" by Louis Rolleigh and Joe Thomas.

Building a Data Warehouse has its own special challenges (e.g. using common data model, common business dictionary, etc.) and is a complex endeavor. However, just having a Data Warehouse does not provide organizations with the often-heralded business benefits of data warehousing. To complete the supply chain from transactional systems to decision maker, organizations need to deliver systems that allow knowledge workers to make strategic and tactical decisions based on the information stored in these warehouses. These decision support systems are referred to as On-Line Analytical Processing (OLAP) systems. Such OLAP systems are commonly classified as Relational OLAP systems or Multi-Dimensional OLAP systems as described above.

The Relational OLAP (ROLAP) system accesses data stored in a relational database (which is part of the Data Warehouse) to provide OLAP analyses. The premise of ROLAP is that OLAP capabilities are best provided directly against the relational database. The ROLAP architecture was invented to enable direct access of data from Data Warehouses, and therefore support optimization techniques to meet batch window requirements and provide fast response times. Typically, these optimization techniques include application-level table partitioning, pre-aggregate inferencing, denormalization support, and the joining of multiple fact tables.

As described above, a typical ROLAP system has a three-tier or layer client/server architecture. The "database layer" utilizes relational databases for data storage, access, and retrieval processes. The "application logic layer" is the ROLAP engine which executes the multidimensional reports from multiple users. The ROLAP engine integrates with a variety of "presentation layers," through which users perform OLAP analyses. After the data model for the data warehouse is defined, data from on-line transaction-processing (OLTP) systems is loaded into the relational database management system (RDBMS). If required by the data model, database routines are run to pre-aggregate the data within the RDBMS. Indices are then created to optimize query access times. End users submit multidimensional analyses to the ROLAP engine, which then dynamically transforms the requests into SQL execution plans. The SQL execution plans are submitted to the relational database for processing, the relational query results are cross-tabulated, and a multidimensional result data set is returned to the end user. ROLAP is a fully dynamic architecture capable of utilizing pre-calculated results when they are available, or dynamically generating results from the raw information when necessary.

The Multidimensional OLAP (MOLAP) systems utilize a proprietary multidimensional database (MDDB) (or "cube") to provide OLAP analyses. The main premise of this architecture is that data must be stored multidimensionally to be accessed and viewed multidimensionally. Such MOLAP systems provide an interface that enables users to query the MDDB data structure such that users can "slice and dice" the aggregated data. As shown in FIG. 15, such MOLAP systems have an aggregation engine which is responsible for all data storage, access, and retrieval processes, including data aggregation (i.e. pre-aggregation) in the MDDB, and an analytical processing and GUI module responsible for interfacing with a user to provide analytical analysis, query input, and reporting of query results to the user. In a relational database, data is stored in tables. In contrast, the MDDB is a non-relational data structure—it uses other data structures, either instead of or in addition to tables—to store data.

There are other application domains where there is a great need for improved methods of and apparatus for carrying out data aggregation operations. For example, modern operational and informational databases represent such domains. As described above, modern operational and informational databases typically utilize a relational database system (RDBMS) as a repository for storing data and querying data. FIG. 16A illustrates an exemplary table in an RDBMS; and FIGS. 16B and 16C illustrate operators (queries) on the table of FIG. 16A, and the result of such queries, respectively. The operators illustrated in FIGS. 16B and 16C are expressed as Structured Query Language (SQL) statements as is conventional in the art.

The choice of using a RDBMS as the data repository in information database systems naturally stems from the realities of SQL standardization, the wealth of RDBMS-related tools, and readily available expertise in RDBMS systems. However, the querying component of RDBMS technology suffers from performance and optimization problems stemming from the very nature of the relational data model. More specifically, during query processing, the relational data model requires a mechanism that locates the raw data elements that match the query. Moreover, to support queries that involve aggregation operations, such aggregation operations must be performed over the raw data elements that match the query. For large multi-dimensional databases, a naive implementation of these operations involves computational intensive table scans that leads to unacceptable query response times.

In order to better understand how the prior art has approached this problem, it will be helpful to briefly describe the relational database model. According to the relational database model, a relational database is represented by a logical schema and tables that implement the schema. The logical schema is represented by a set of templates that define one or more dimensions (entities) and attributes associated with a given dimension. The attributes associated with a given dimension includes one or more attributes that distinguish it from every other dimension in the database (a dimension identifier). Relationships amongst dimensions are formed by joining attributes. The data structure that represents the set of templates and relations of the logical schema is typically referred to as a catalog or dictionary. Note that the logical schema represents the relational organization of the database, but does not hold any fact data per se. This fact data is stored in tables that implement the logical schema.

Star schemas are frequently used to represent the logical structure of a relational database. The basic premise of star schemas is that information can be classified into two groups: facts and dimensions. Facts are the core data elements being analyzed. For example, units of individual item sold are facts, while dimensions are attributes about the facts. For example, dimensions are the product types purchased and the data purchase. Business questions against this schema are asked looking up specific facts (UNITS) through a set of dimensions (MARKETS, PRODUCTS, PERIOD). The central fact table is typically much larger than any of its dimension tables.

An exemplary star schema is illustrated in FIG. 17A for suppliers (the "Supplier" dimension) and parts (the "Parts" dimension) over time periods (the "Time-Period" dimension). It includes a central fact table "Supplied-Parts" that relates to multiple dimensions—the "Supplier", "Parts" and "Time-Period" dimensions. A central fact table and a dimension table for each dimension in the logical schema of FIG. 17A may be used to implement this logical schema. A given dimension table stores rows (instances) of the dimension defined in the logical schema. Each row within the central fact table includes a multi-part key associated with a set of facts (in this example, a number representing a quantity). The multi-part key of a given row (values stored in the S#, P#, TP# fields as shown) points to rows (instances) stored in the dimension tables described above. A more detailed description of star schemas and the tables used to implement star schemas may be found in C. J. Date, "An Introduction to Database Systems," Seventh Edition, Addison-Wesley, 2000, pp. 711-715, herein incorporated by reference in its entirety.

When processing a query, the tables that implement the schema are accessed to retrieve the facts that match the query. For example, in a star schema implementation as described above, the facts are retrieved from the central fact table and/or the dimension tables. Locating the facts that match a given query involves one or more join operations. Moreover, to support queries that involve aggregation operations, such aggregation operations must be performed over the facts that match the query. For large multi-dimensional databases, a naive implementation of these operations involves computational intensive table scans that typically leads to unacceptable query response times. Moreover, since the fact tables are pre-summarized and aggregated along business dimensions, these tables tend to be very large. This point becomes an important consideration of the performance issues associated with star schemas. A more detailed discussion of the performance issues (and proposed approaches that address such issues) related to joining and aggregation of star schema is now set forth.

The first performance issue arises from computationally intensive table scans that are performed by a naive implementation of data joining. Indexing schemes may be used to bypass these scans when performing joining operations. Such schemes include B-tree indexing, inverted list indexing and aggregate indexing. A more detailed description of such indexing schemes can be found in "The Art of Indexing", Dynamic Information Systems Corporation, October 1999. All of these indexing schemes replaces table scan operations (involved in locating the data elements that match a query) with one or more index lookup operation. Inverted list indexing associates an index with a group of data elements, and stores (at a location identified by the index) a group of pointers to the associated data elements. During query processing, in the event that the query matches the index, the pointers stored in the index are used to retrieve the corresponding data elements pointed therefrom. Aggregation indexing integrates an aggregation index with an inverted list index to provide pointers to raw data elements that require aggregation, thereby providing for dynamic summarization of the raw data elements that match the user-submitted query.

These indexing schemes are intended to improve join operations by replacing table scan operations with one or more index lookup operation in order to locate the data elements that match a query. However, these indexing schemes suffer from various performance issues as follows:

Since the tables in the star schema design typically contain the entire hierarchy of attributes (e.g. in a PERIOD dimension, this hierarchy could be day>week>month>quarter>year), a multipart key of day, week, month, quarter, year has to be created; thus, multiple meta-data definitions are required (one of each key component) to define a single relationship; this adds to the design complexity, and sluggishness in performance.

Addition or deletion of levels in the hierarchy will require physical modification of the fact table, which is time consuming process that limits flexibility.

Carrying all the segments of the compound dimensional key in the fact table increases the size of the index, thus impacting both performance and scalability.

Another performance issue arises from dimension tables that contain multiple hierarchies. In such cases, the dimensional table often includes a level of hierarchy indicator for every record. Every retrieval from fact table that stores details and aggregates must use the indicator to obtain the correct result, which impacts performance. The best alternative to using the level indicator is the snowflake schema. In this schema aggregate tables are created separately from the detail tables. In addition to the main fact tables, snowflake schema contains separate fact tables for each level of aggregation. Notably, the snowflake schema is even more complicated than a star schema, and often requires multiple SQL statements to get the results that are required.

Another performance issue arises from the pairwise join problem. Traditional RDBMS engines are not design for the rich set of complex queries that are issued against a star schema. The need to retrieve related information from several tables in a single query—"join processing"—is severely limited. Many RDBMSs can join only two tables at a time. If a complex join involves more than two tables, the RDBMS needs to break the query into a series of pairwise joins. Selecting the order of these joins has a dramatic performance impact. There are optimizers that spend a lot of CPU cycles to find the best order in which to execute those joins. Unfortunately, because the number of combinations to be evaluated grows exponentially with the number of tables being joined, the problem of selecting the best order of pairwise joins rarely can be solved in a reasonable amount of time.

Moreover, because the number of combinations is often too large, optimizers limit the selection on the basis of a criterion of directly related tables. In a star schema, the fact table is the only table directly related to most other tables, meaning that the fact table is a natural candidate for the first pairwise join. Unfortunately, the fact table is the very largest table in the query, so this strategy leads to selecting a pairwise join order that generates a very large intermediate result set, severely affecting query performance.

There is an optimization strategy, typically referred to as Cartesian Joins, that lessens the performance impact of the pairwise join problem by allowing joining of unrelated tables. The join to the fact table, which is the largest one, is deferred until the very end, thus reducing the size of intermediate result sets. In a join of two unrelated tables every combination of the two tables' rows is produced, a Cartesian product. Such a Cartesian product improves query performance. However, this strategy is viable only if the Cartesian product of dimension rows selected is much smaller than the number of rows in the fact table. The multiplicative nature of the Cartesian join makes the optimization helpful only for relatively small databases.

In addition, systems that exploit hardware and software parallelism have been developed that lessens the performance issues set forth above. Parallelism can help reduce the execution time of a single query (speed-up), or handle additional work without degrading execution time (scale-up). For example, Red Brick™ has developed STARjoin™ technology that provides high speed, parallelizable multi-table joins in a single pass, thus allowing more than two tables can be joined in a single operation. The core technology is an innovative approach to indexing that accelerates multiple joins. Unfortunately, parallelism can only reduce, not eliminate, the performance degradation issues related to the star schema.

One of the most fundamental principles of the multidimensional database is the idea of aggregation. The most common aggregation is called a roll-up aggregation. This type is relatively easy to compute: e.g. taking daily sales totals and rolling them up into a monthly sales table. The more difficult are analytical calculations, the aggregation of Boolean and comparative operators. However these are also considered as a subset of aggregation.

In a star schema, the results of aggregation are summary tables. Typically, summary tables are generated by database administrators who attempt to anticipate the data aggregations that the users will request, and then pre-build such tables. In such systems, when processing a user-generated query that involves aggregation operations, the pre-built aggregated data that matches the query is retrieved from the summary tables (if such data exists). FIGS. 18A and 18B illustrate a multi-dimensional relational database using a star schema and summary tables. In this example, the summary tables are generated over the "time" dimension storing aggregated data for "month", "quarter" and "year" time periods as shown in FIG. 18B. Summary tables are in essence additional fact tables, of higher levels. They are attached to the basic fact table creating a snowflake extension of the star schema. There are hierarchies among summary tables because users at different levels of management require different levels of summarization. Choosing the level of aggregation is accomplished via the "drill-down" feature.

Summary tables containing pre-aggregated results typically provide for improved query response time with respect to on-the-fly aggregation. However, summary tables suffer from some disadvantages:

- summary tables require that database administrators anticipate the data aggregation operations that users will require; this is a difficult task in large multi-dimensional databases (for example, in data warehouses and data mining systems), where users always need to query in new ways looking for new information and patterns.
- summary tables do not provide a mechanism that allows efficient drill down to view the raw data that makes up the summary table—typically a table scan of one or more large tables is required.
- querying is delayed until pre-aggregation is completed.
- there is a heavy time overhead because the vast majority of the generated information remains unvisited.
- there is a need to synchronize the summary tables before the use.
- the degree of viable parallelism is limited because the subsequent levels of summary tables must be performed in pipeline, due to their hierarchies.
- for very large databases, this option is not valid because of time and storage space.

Note that it is common to utilize both pre-aggregated results and on-the-fly aggregation in support aggregation. In these system, partial pre-aggregation of the facts results in a small set of summary tables. On-the-fly aggregation is used in the case the required aggregated data does not exist in the summary tables.

Note that in the event that the aggregated data does not exist in the summary tables, table join operations and aggregation operations are performed over the raw facts in order to generate such aggregated data. This is typically referred to as on-the-fly aggregation. In such instances, aggregation indexing is used to mitigate the performance of multiple data joins associated with dynamic aggregation of the raw data. Thus, in large multi-dimensional databases, such dynamic aggregation may lead to unacceptable query response times.

In view of the problems associated with joining and aggregation within RDBMS, prior art ROLAP systems have suffered from essentially the same shortcomings and drawbacks of their underlying RDBMS.

While prior art MOLAP systems provide for improved access time to aggregated data within their underlying MDD structures, and have performance advantages when carrying out joining and aggregations operations, prior art MOLAP architectures have suffered from a number of shortcomings and drawbacks. More specifically, atomic (raw) data is moved, in a single transfer, to the MOLAP system for aggregation, analysis and querying. Importantly, the aggregation results are external to the DBMS. Thus, users of the DBMS cannot directly view these results. Such results are accessible only from the MOLAP system. Because the MDD query processing logic in prior art MOLAP systems is separate from that of the DBMS, users must procure rights to access to the MOLAP system and be instructed (and be careful to conform to such instructions) to access the MDD (or the DBMS) under certain conditions. Such requirements can present security issues, highly undesirable for system administration. Satisfying such requirements is a costly and logistically cumbersome process. As a result, the widespread applicability of MOLAP systems has been limited.

Thus, there is a great need in the art for an improved mechanism for joining and aggregating data elements within a database management system (e.g., RDBMS), and for integrating the improved database management system (e.g., RDBMS) into informational database systems (including the data warehouse and OLAP domains), while avoiding the shortcomings and drawbacks of prior art systems and methodologies.

SUMMARY AND OBJECTS OF PRESENT INVENTION

Accordingly, it is a further object of the present invention to provide an improved method of and system for managing data elements within a multidimensional database (MDDB) using a novel stand-alone (i.e. external) data aggregation server, achieving a significant increase in system performance (e.g. decreased access/search time) using a stand-alone scalable data aggregation server.

Another object of the present invention is to provide such system, wherein the stand-alone aggregation server includes an aggregation engine that is integrated with an MDDB, to provide a cartridge-style plug-in accelerator which can communicate with virtually any conventional OLAP server.

Another object of the present invention is to provide such a stand-alone data aggregation server whose computational tasks are restricted to data aggregation, leaving all other OLAP functions to the MOLAP server and therefore complementing OLAP server's functionality.

Another object of the present invention is to provide such a system, wherein the stand-alone aggregation server carries out an improved method of data aggregation within the MDDB which enables the dimensions of the MDDB to be scaled up to large numbers and large atomic (i.e. base) data sets to be handled within the MDDB.

Another object of the present invention is to provide such a stand-alone aggregration server, wherein the aggregation engine supports high-performance aggregation (i.e. data roll-up) processes to maximize query performance of large data volumes, and to reduce the time of partial aggregations that degrades the query response.

Another object of the present invention is to provide such a stand-alone, external scalable aggregation server, wherein its integrated data aggregation (i.e. roll-up) engine speeds up the aggregation process by orders of magnitude, enabling larger database analysis by lowering the aggregation times.

Another object of the present invention is to provide such a novel stand-alone scalable aggregation server for use in OLAP operations, wherein the scalability of the aggregation server enables (i) the speed of the aggregation process carried out therewithin to be substantially increased by distributing the computationally intensive tasks associated with data aggregation among multiple processors, and (ii) the large data sets contained within the MDDB of the aggregation server to be subdivided among multiple processors thus allowing the size of atomic (i.e. basic) data sets within the MDDB to be substantially increased.

Another object of the present invention is to provide such a novel stand-alone scalable aggregation server, which provides for uniform load balancing among processors for high efficiency and best performance, and linear scalability for extending the limits by adding processors.

Another object of the present invention is to provide a stand-alone, external scalable aggregation server, which is suitable for MOLAP as well as for ROLAP system architectures.

Another object of the present invention is to provide a novel stand-alone scalable aggregation server, wherein an MDDB and aggregation engine are integrated and the aggregation engine carries out a high-performance aggregation algorithm and novel storing and searching methods within the MDDB.

Another object of the present invention is to provide a novel stand-alone scalable aggregation server which can be supported on single-processor (i.e. sequential or serial) computing platforms, as well as on multi-processor (i.e. parallel) computing platforms.

Another object of the present invention is to provide a novel stand-alone scalable aggregation server which can be used as a complementary aggregation plug-in to existing MOLAP and ROLAP databases.

Another object of the present invention is to provide a novel stand-alone scalable aggregation server which carries out an novel rollup (i.e. down-up) and spread down (i.e. top-down) aggregation algorithms.

Another object of the present invention is to provide a novel stand-alone scalable aggregation server which includes an integrated MDDB and aggregation engine which carries out full pre-aggregation and/or "on-the-fly" aggregation processes within the MDDB.

Another object of the present invention is to provide such a novel stand-alone scalable aggregation server which is capable of supporting MDDB having a multi-hierarchy dimensionality.

Another object of the present invention is to provide a novel method of aggregating multidimensional data of atomic data sets originating from a RDBMS Data Warehouse.

Another object of the present invention is to provide a novel method of aggregating multidimensional data of atomic data sets originating from other sources, such as external ASCII files, MOLAP server, or other end user applications.

Another object of the present invention is to provide a novel stand-alone scalable data aggregation server which can communicate with any MOLAP server via standard ODBC, OLE DB or DLL interface, in a completely transparent manner with respect to the (client) user, without any time delays in queries, equivalent to storage in MOLAP server's cache.

Another object of the present invention is to provide a novel "cartridge-style" (stand-alone) scalable data aggregation engine which dramatically expands the boundaries of MOLAP into large-scale applications including Banking, Insurance, Retail and Promotion Analysis.

Another object of the present invention is to provide a novel "cartridge-style" (stand-alone) scalable data aggregation engine which dramatically expands the boundaries of high-volatility type ROLAP applications such as, for example, the precalculation of data to maximize query performance.

Another object of the present invention is to provide a generic plug-in cartridge-type data aggregation component, suitable for all MOLAP systems of different vendors, dramatically reducing their aggregation burdens.

Another object of the present invention is to provide a novel high performance cartridge-type data aggregration server which, having standardized interfaces, can be plugged-into the OLAP system of virtually any user or vendor.

Another object of the present invention is to provide a novel "cartridge-style" (stand-alone) scalable data aggregation engine which has the capacity to convert long batch-type data aggregations into interactive sessions.

In another aspect, it is an object of the present invention to provide an improved method of and system for joining and aggregating data elements integrated within a database management system (DBMS) using a non-relational multi-dimensional data structure (MDDB), achieving a significant increase in system performance (e.g. decreased access/search time), user flexibility and ease of use.

Another object of the present invention is to provide such an DBMS wherein its integrated data aggregation module supports high-performance aggregation (i.e. data roll-up) processes to maximize query performance of large data volumes.

Another object of the present invention is to provide such an DBMS system, wherein its integrated data aggregation (i.e. roll-up) module speeds up the aggregation process by orders of magnitude, enabling larger database analysis by lowering the aggregation times.

Another object of the present invention is to provide such a novel DBMS system for use in OLAP operations.

Another object of the present invention is to provide a novel DBMS system having an integrated aggregation module that carries out an novel rollup (i.e. down-up) and spread down (i.e. top-down) aggregation algorithms.

Another object of the present invention is to provide a novel DBMS system having an integrated aggregation module that carries out full pre-aggregation and/or "on-the-fly" aggregation processes.

Another object of the present invention is to provide a novel DBMS system having an integrated aggregation module which is capable of supporting a MDDB having a multi-hierarchy dimensionality.

These and other object of the present invention will become apparent hereinafter and in the claims to Invention set forth herein.

BRIEF DESCRIPTION OF THE DRAWINGS

In order to more fully appreciate the objects of the present invention, the following Detailed Description of the Illustrative Embodiments should be read in conjunction with the accompanying Drawings, wherein:

FIG. 3C1 is a schematic representation of an exemplary three-dimensional database used in a conventional MOLAP system of the prior art, showing that each data element contained therein is physically stored at a location in the recording media of the system which is specified by the dimensions (and subdimensions within the dimensional hierarchy) of the data variables which are assigned integer-based coordinates in the MDDB, and also that data elements associated with the basic data loaded into the MDDB are assigned lower integer coordinates in MDDB Space than pre-aggregated data elements contained therewithin;

FIG. 3C2 is a schematic representation illustrating that a conventional hierarchy of the dimension of "time" typically contains the subdimensions "days, weeks, months, quarters, etc." of the prior art;

FIG. 3C3 is a schematic representation showing how data elements having higher subdimensions of time in the MDDB of the prior art are typically assigned increased integer addresses along the time dimension thereof;

FIG. 8A is a data table setting forth information representative of performance benchmarks obtained by the shared-platform type implementation of the stand-alone Aggregation Server of the illustrative embodiment serving the conventional OLAP server (i.e. Oracle EXPRESS Server) shown in FIG. 7B, wherein the common hardware/software platform is realized using a Pentium II 450 Mhz, 1 GB RAM, 18 GB Disk, running the Microsoft NT operating system (OS);

FIG. 9A is a schematic representation of the first stage in the method of segmented aggregation according to the principles of the present invention, showing initial aggregration along the 1st dimension;

FIG. 9C1 is a schematic representation of the Query Directed Roll-up (QDR) aggregation method/procedure of the present invention, showing data aggregation starting from existing basic data or previously aggregated data in the first dimension (D1), and such aggregated data being utilized as a basis for QDR aggregation along the second dimension (D2);

FIG. 9C2 is a schematic representation of the Query Directed Roll-up (QDR) aggregation method/procedure of the present invention, showing initial data aggregation starting from existing previously aggregated data in the second third (D3), and continuing along the third dimension (D3), and thereafter continuing aggregation along the second dimension (D2);

FIG. 10A is a schematic representation of the "slice-storage" method of storing sparse data in the disk storage devices of the MDDB of FIG. 6B in accordance with the principles of the present invention, based on an ascending-ordered index along aggregation direction, enabling fast retrieval of data;

FIG. 10B is a schematic representation of the data organization of data files and the directory file used in the storages of the MDDB of FIG. 6B, and the method of searching for a queried data point therein using a simple binary search technique due to the data files ascending order;

FIG. 13 is a schematic representation of the stand-alone Aggregation Server of the present invention shown as a component of a central data warehouse, serving the data aggregation needs of URL directory systems, Data Marts, RDBMSs, ROLAP systems and OLAP systems alike;

FIGS. 16A-16C are schematic representations of exemplary tables employed in a prior art Relational Database Management System (RDBMS); FIGS. 16B and 16C illustrate operators (queries) on the table of FIG. 16A, and the result of such queries, respectively;

FIG. 20A shows a separate-platform type implementation of the DBMS system of the illustrative embodiment shown in FIG. 19A, wherein the relational datastore and support mechanisms (e.g., query handling, fact table(s) and dictionary of the DBMS) reside on a separate hardware platform and/or OS system from that used to run the MDD Aggregation Module of the present invention.

FIG. 21 is a schematic representation of the DBMS of the present invention shown as a component of a central data warehouse, serving the data storage and aggregation needs of a ROLAP system (or other OLAP system).

DETAILED DESCRIPTION OF THE PREFERRED EMBODIMENTS OF THE PRESENT INVENTION

Figure 1A:
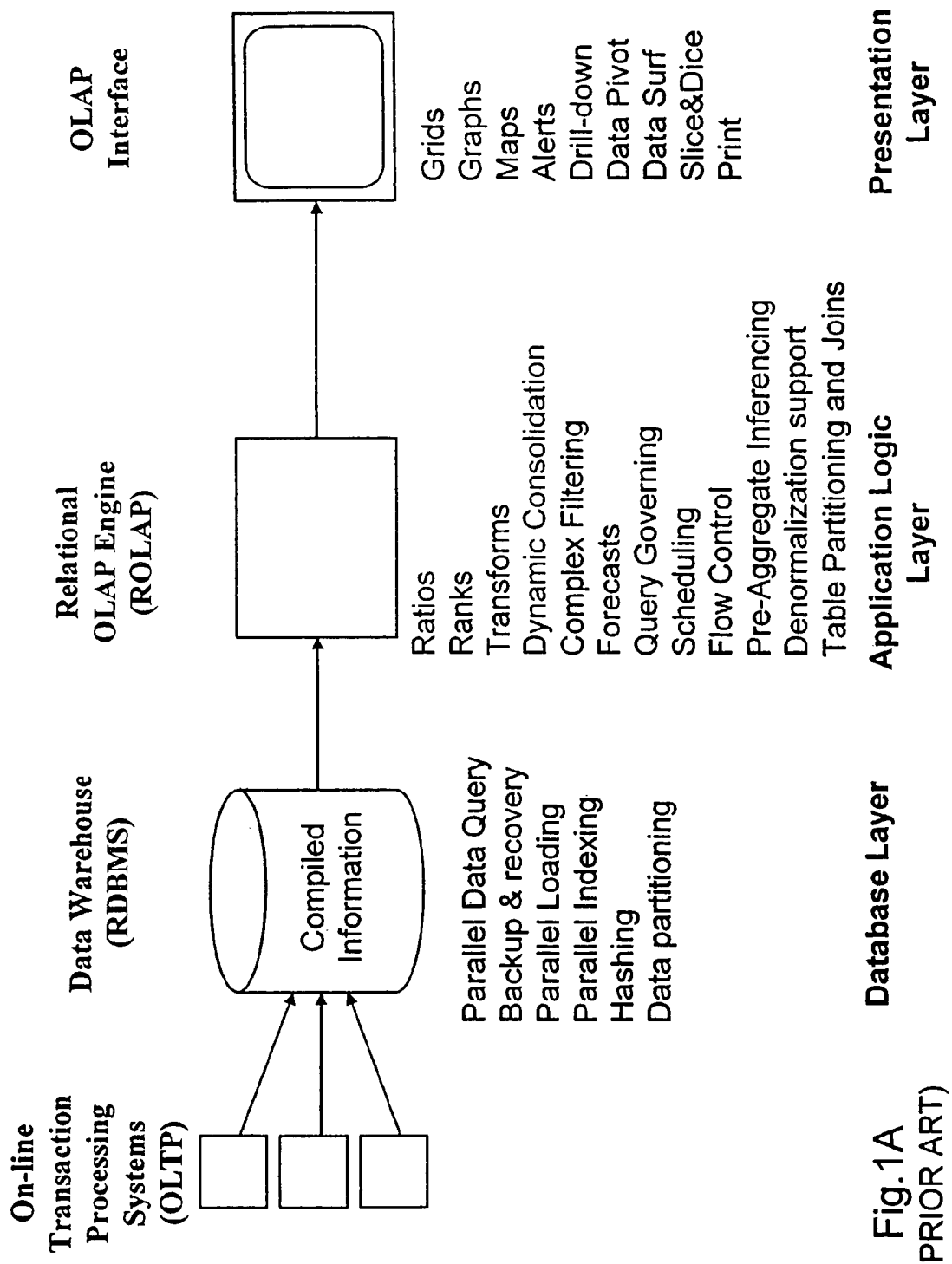
FIG. 1A is a schematic representation of an exemplary prior art relational on-line analytical processing (ROLAP) system comprising a three-tier or layer client/server architecture, wherein the first tier has a database layer utilizing an RDBMS for data storage, access, and retrieval processes, the second tier has an application logic layer (i.e. the ROLAP engine) for executing the multidimensional reports from multiple users, and the third tier integrates the ROLAP engine with a variety of presentation layers, through which users perform OLAP analyses.

Referring now to FIGS. 6A through 13, the preferred embodiments of the method and system of the present invention will be now described in great detail hereinbelow, wherein like elements in the Drawings shall be indicated by like reference numerals.

Through this invention disclosure, the term "aggregation" and "pre-aggregation" shall be understood to mean the process of summation of numbers, as well as other mathematical operations, such as multiplication, subtraction, division etc.

In general, the stand-alone aggregation server and methods of and apparatus for data aggregation of the present invention can be employed in a wide range of applications, including MOLAP systems, ROLAP systems, Internet URL-directory systems, personalized on-line e-commerce shopping systems, Internet-based systems requiring real-time control of packet routing and/or switching, and the like.

For purposes of illustration, initial focus will be accorded to improvements in MOLAP systems, in which knowledge workers are enabled to intuitively, quickly, and flexibly manipulate operational data within a MDDB using familiar business terms in order to provide analytical insight into a business domain of interest.

Figure 6A:
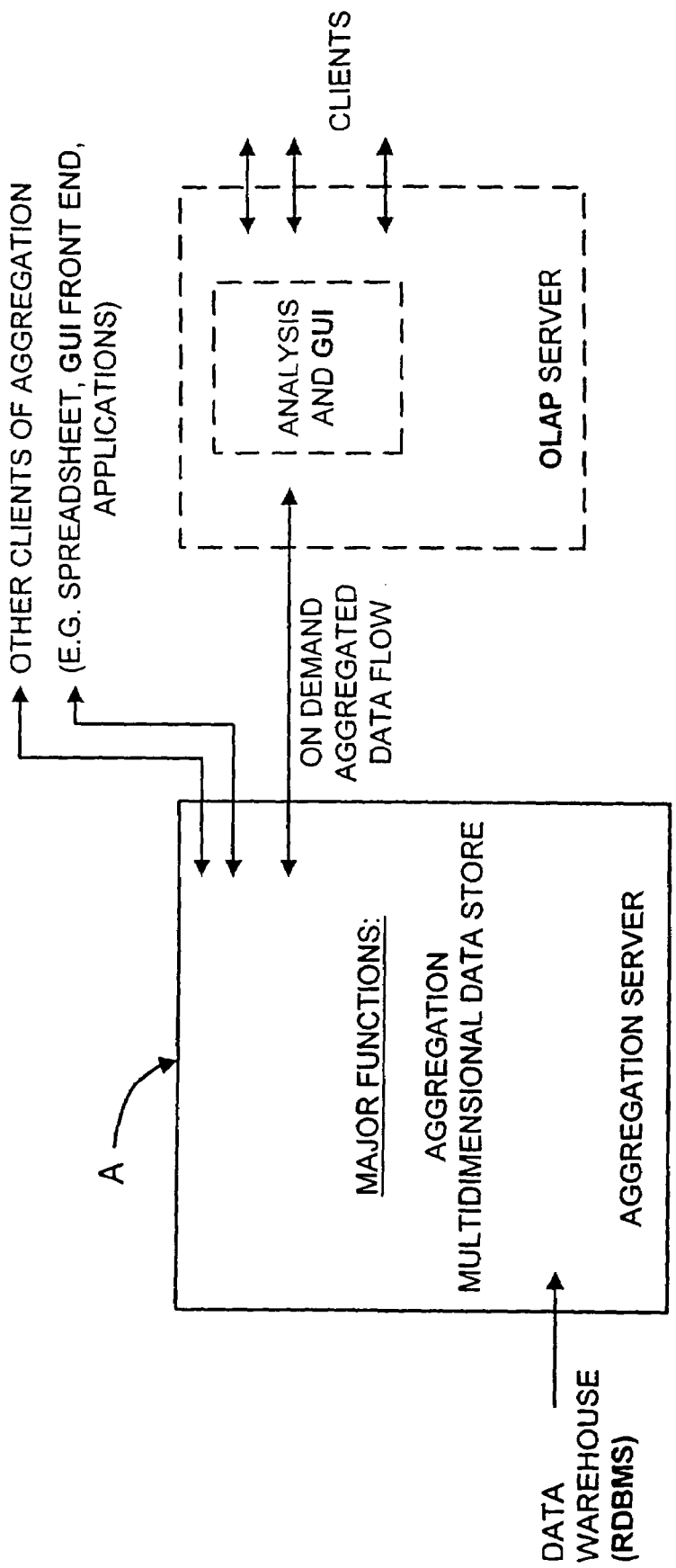
FIG. 6A is a schematic representation of a generalized embodiment of a multidimensional on-line analytical processing (MOLAP) system of the present invention comprising a Data Warehouse realized as a relational database, a stand-alone Aggregation Server of the present invention having an integrated aggregation engine and MDDB, and an OLAP server supporting a plurality of OLAP clients, wherein the stand-alone Aggregation Server performs aggregation functions (e.g. summation of numbers, as well as other mathematical operations, such as multiplication, subtraction, division etc.) and multi-dimensional data storage functions.

FIG. 6A illustrates a generalized embodiment of a multi-dimensional on-line analytical processing (MOLAP) system of the present invention comprising: a Data Warehouse realized as a relational database; a stand-alone cartridge-style Aggregation Server of the present invention having an integrated aggregation engine and a MDDB; and an OLAP server communicating with the Aggregation Server, and supporting a plurality of OLAP clients. In accordance with the principles of the present invention, the stand-alone Aggregation Server performs aggregation functions (e.g. summation of numbers, as well as other mathematical operations, such as multiplication, subtraction, division etc.) and multi-dimensional data storage functions.

Departing from conventional practices, the principles of the present invention teaches moving the aggregation engine and the MDDB into a separate Aggregation Server having standardized interfaces so that it can be plugged-into the OLAP server of virtually any user or vendor. This dramatic move discontinues the restricting dependency of aggregation from the analytical functions of OLAP, and by applying novel and independent algorithms. The stand-alone data aggregation server enables efficient organization and handling of data, fast aggregation processing, and fast access to and retrieval of any data element in the MDDB.

As will be described in greater detail hereinafter, the Aggregation Server of the present invention can serve the data aggregation requirements of other types of systems besides OLAP systems such as, for example, URL directory management Data Marts, RDBMS, or ROLAP systems.

The Aggregation Server of the present invention excels in performing two distinct functions, namely: the aggregation of data in the MDDB; and the handling of the resulting data base in the MDDB, for "on demand" client use. In the case of serving an OLAP server, the Aggregation Server of the present invention focuses on performing these two functions in a high performance manner (i.e. aggregating and storing base data, originated at the Data Warehouse, in a multidimensional storage (MDDB), and providing the results of this data aggregation process "on demand" to the clients, such as the OLAP server, spreadsheet applications, the end user applications. As such, the Aggregation Server of the present invention frees each conventional OLAP server, with which it interfaces, from the need of making data aggregations, and therefore allows the conventional OLAP server to concentrate on the primary functions of OLAP servers, namely: data analysis and supporting a graphical interface with the user client.

Figure 6B:
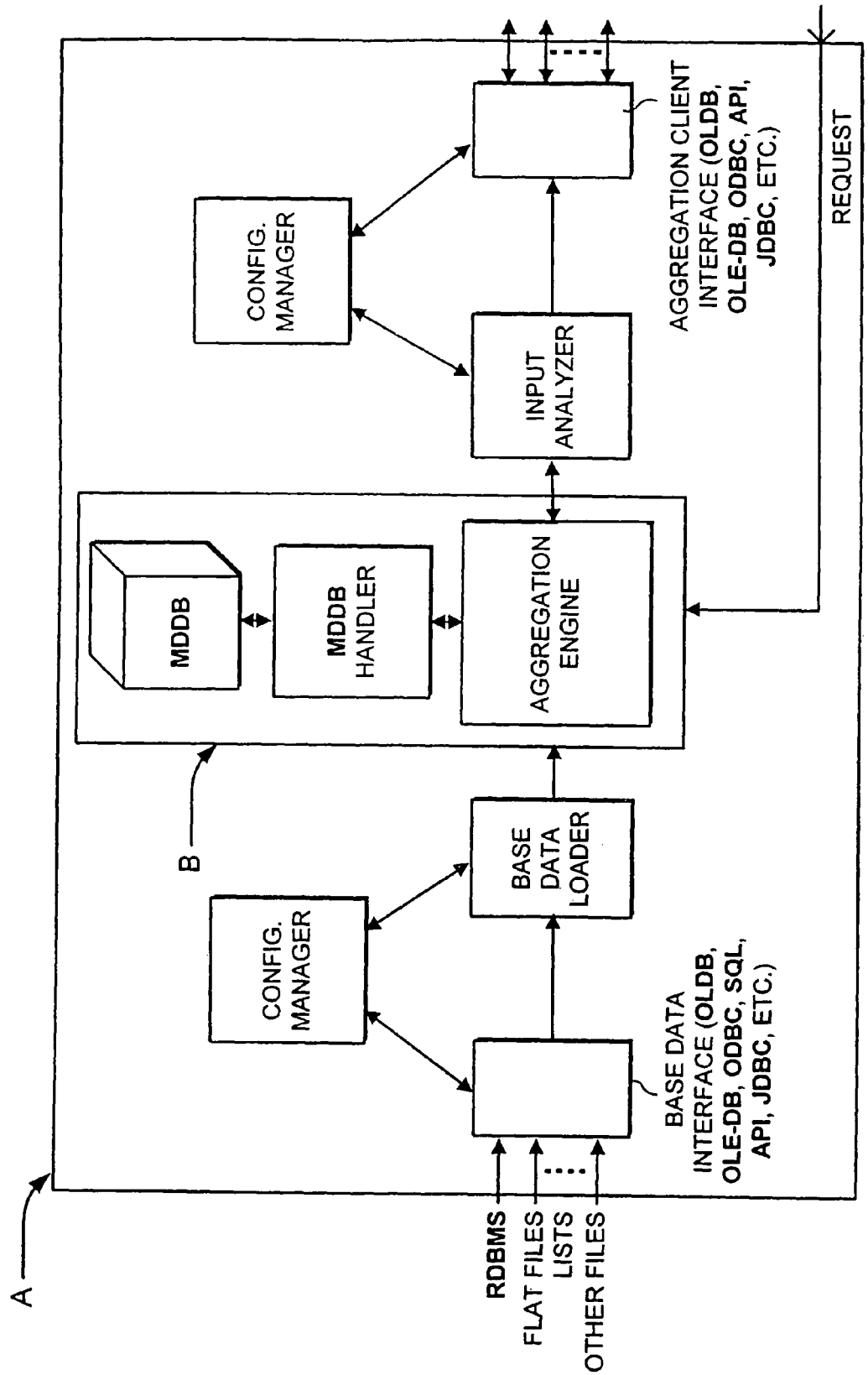
FIG. 6B is a schematic block diagram of the stand-alone Aggregation Server of the illustrative embodiment shown in FIG. 6A, showing its primary components, namely, a base data interface (e.g. OLDB, OLE-DB, ODBC, SQL, JDBC, API, etc.) for receiving RDBMS flat files lists and other files from the Data Warehouse (RDBMS), a base data loader for receiving base data from the base data interface, configuration manager for managing the operation of the base data interface and base data loader, an aggregation engine and MDDB handler for receiving base data from the base loader, performing aggregation operations on the base data, and storing the base data and aggregated data in the MDDB; an aggregation client interface (e.g. OLDB, OLE-DB, ODBC, SQL, JDBC, API, etc.) and input analyzer for receiving requests from OLAP client machines, cooperating with the aggregation engine and MDDB handler to generate aggregated data and/or retrieve aggregated data from the MDDB that pertains to the received requests, and returning this aggregated back to the requesting OLAP clients; and a configuration manager for managing the operation of the input analyzer and the aggregation client interface.

FIG. 6B shows the primary components of the stand-alone Aggregation Server of the illustrative embodiment, namely: a base data interface (e.g. OLDB, OLE-DB, ODBC, SQL, JDBC, API, etc.) for receiving RDBMS flat files lists and other files from the Data Warehouse (RDBMS), a base data loader for receiving base data from the base data interface, configuration manager for managing the operation of the base data interface and base data loader, an aggregation engine for receiving base data from the base loader, a multi-dimensional database (MDDB); a MDDB handler, an input analyzer, an aggregation client interface (e.g. OLDB, OLE-DB, ODBC, SQL, API, JDBC, etc.) and a configuration manager for managing the operation of the input analyzer and the aggregation client interface.

During operation, the base data originates at data warehouse or other sources, such as external ASCII files, MOLAP server, or others. The Configuration Manager, in order to enable proper communication with all possible sources and data structures, configures two blocks, the Base Data Interface and Data Loader. Their configuration is matched with different standards such as OLDB, OLE-DB, ODBC, SQL, API, JDBC, etc.

As shown in FIG. 6B, the core of the data Aggregation Server of the present invention comprises: a data Aggregation Engine; a Multidimensional Data Handler (MDDB Handler); and a Multidimensional Data Storage (MDDB). The results of data aggregation are efficiently stored in the MDDB by the MDDB Handler.

As shown in FIGS. 6A and 6B, the stand-alone Aggregation Server of the present invention serves the OLAP Server (or other requesting computing system) via an aggregation client interface, which preferably conforms to standard interface protocols such as OLDB, OLE-DB, ODBC, SQL, JDBC, an API, etc. Aggregation results required by the OLAP server are supplied on demand. Typically, the OLAP Server disintegrates the query, via parsing process, into series of requests. Each such request, specifying a n-dimensional coordinate, is presented to the Aggregation Server. The Configuration Manager sets the Aggregation Client Interface and Input Analyzer for a proper communication protocol according to the client user. The Input Analyzer converts the input format to make it suitable for the MDDB Handler.

An object of the present invention is to make the transfer of data completely transparent to the OLAP user, in a manner which is equivalent to the storing of data in the MOLAP server's cache and without any query delays. This requires that the stand-alone Aggregation Server have exceptionally fast response characteristics. This object is enabled by providing the unique data structure and aggregation mechanism of the present invention.

Figure 6C:
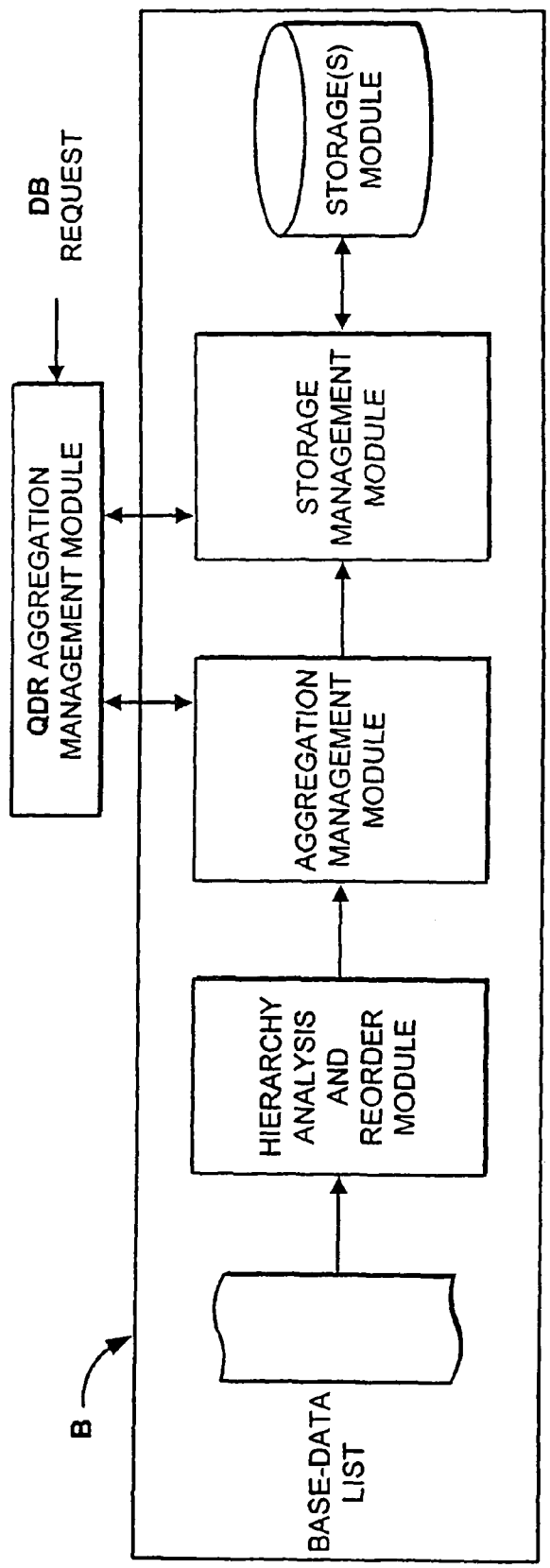
FIG. 6C is a schematic representation of the software modules comprising the aggregation engine and MDDB handler of the stand-alone Aggregation Server of the illustrative embodiment of the present invention, showing a base data list structure being supplied to a hierarchy analysis and reorder module, the output thereof being transferred to an aggregation management module, the output thereof being transferred to a storage module via a storage management module, and a Query Directed Roll-up (QDR) aggregation management module being provided for receiving database (DB) requests from OLAP client machines (via the aggregation client interface) and managing the operation of the aggregation and storage management modules of the present invention.

FIG. 6C shows the software modules comprising the aggregation engine and MDDB handler components of the stand-alone Aggregation Server of the illustrative embodiment. The base data list, as it arrives from RDBMS or text files, has to be analyzed and reordered to optimize hierarchy handling, according to the unique method of the present invention, as described later with reference to FIGS. 11A and 11B.

Figure 9B:
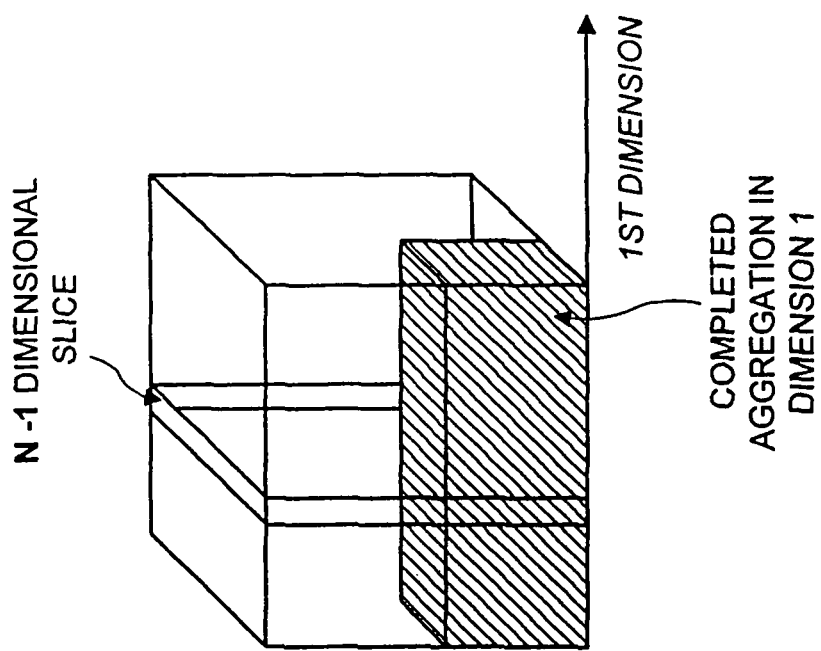
FIG. 9B is a schematic representation of the next stage in the method of segmented aggregation according to the principles of the present invention, showing that any segment along dimension 1, such as the shown slice, can be separately aggregated along the remaining dimensions, 2 and 3, and that in general, for an N dimensional system, the second stage involves aggregation in N−1 dimensions. The principle of segmentation can be applied on the first stage as well, however, only a large enough data will justify such a sliced procedure in the first dimension. Actually, it is possible to consider each segment as an N−1 cube, enabling recursive computation.

The function of the aggregation management module is to administrate the aggregation process according to the method illustrated in FIGS. 9A and 9B.

In accordance with the principles of the present invention, data aggregation within the stand-alone Aggregation Server can be carried out either as a complete pre-aggregation process, where the base data is fully aggregated before commencing querying, or as a query directed roll-up (QDR) process, where querying is allowed at any stage of aggregation using the "on-the-fly" data aggregation process of the present invention. The QDR process will be described hereinafter in greater detail with reference to FIG. 9C. The response to a request (i.e. a basic component of a client query), by calling the Aggregation management module for "on-the-fly" data aggregation, or for accessing pre-aggregated result data via the Storage management module. The query/request serving mechanism of the present invention within the QDR aggregation management module is illustrated in the flow chart of FIG. 6D.

The function of the Storage management module is to handle multidimensional data in the storage(s) module in a very efficient way, according to the novel method of the present invention, which will be described in detail hereinafter with reference to FIGS. 10A and 10B.

Figure 6D:
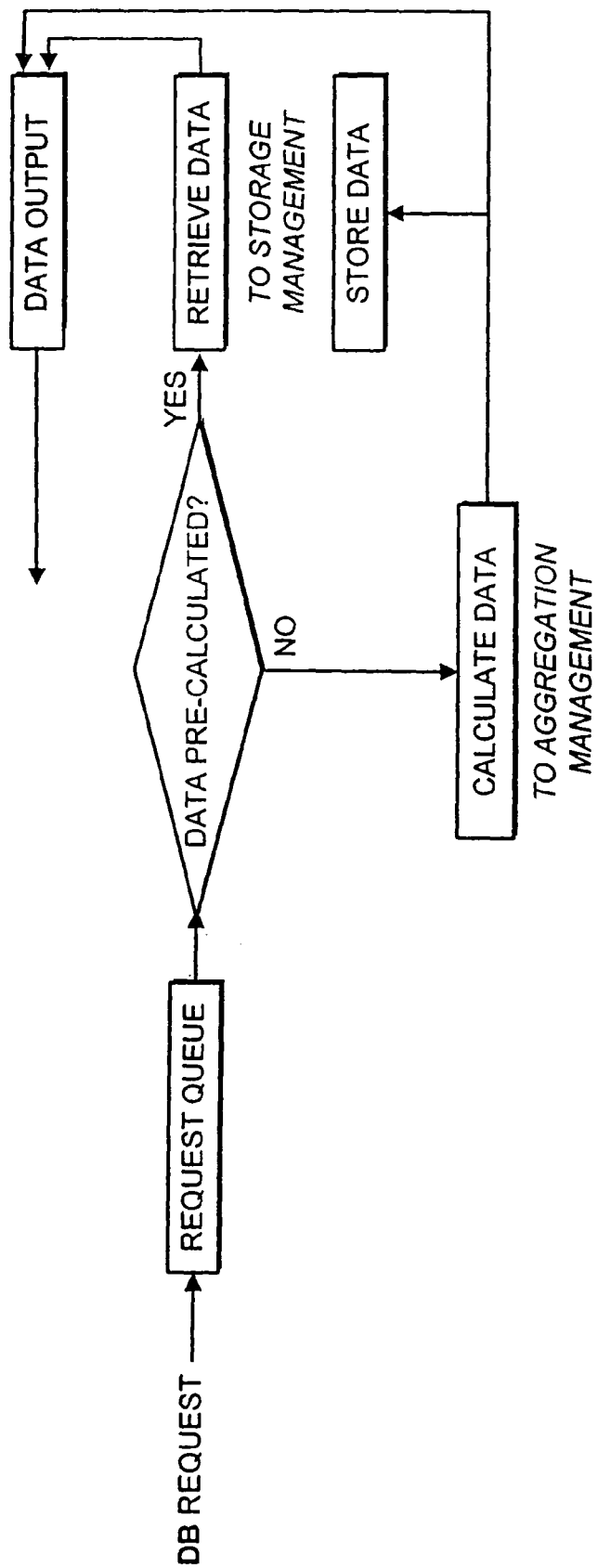
FIG. 6D is a flow chart representation of the primary operations carried out by the (DB) request serving mechanism within the QDR aggregation management module shown in FIG. 6C.

The request serving mechanism shown in FIG. 6D is controlled by the QDR aggregation management module. Requests are queued and served one by one. If the required data is already pre-calculated, then it is retrieved by the storage management module and returned to the client. Otherwise, the required data is calculated "on-the-fly" by the aggregation management module, and the result moved out to the client, while simultaneously stored by the storage management module, shown in FIG. 6C.

Figure 7A:
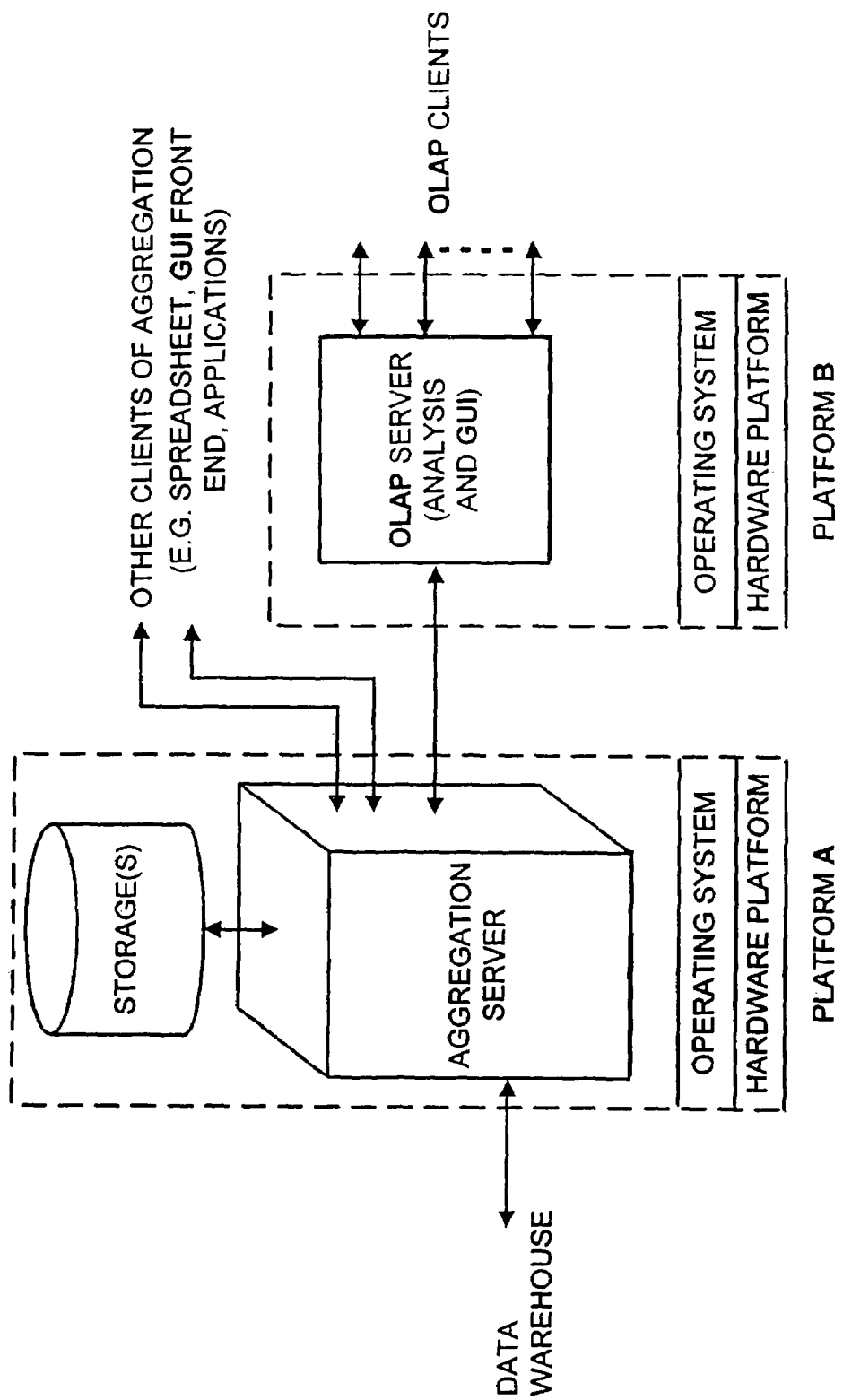
FIG. 7A is a schematic representation of a separate-platform type implementation of the stand-alone Aggregation Server of the illustrative embodiment of FIG. 6B and a conventional OLAP server supporting a plurality of client machines, wherein base data from a Data Warehouse is shown being received by the aggregation server, realized on a first hardware/software platform (i.e. Platform A) and the stand-alone Aggregation Server is shown serving the conventional OLAP server, realized on a second hardware/software platform (i.e. Platform B), as well as serving data aggregation requirements of other clients supporting diverse applications such as spreadsheet, GUI front end, and applications.
Figure 7B:
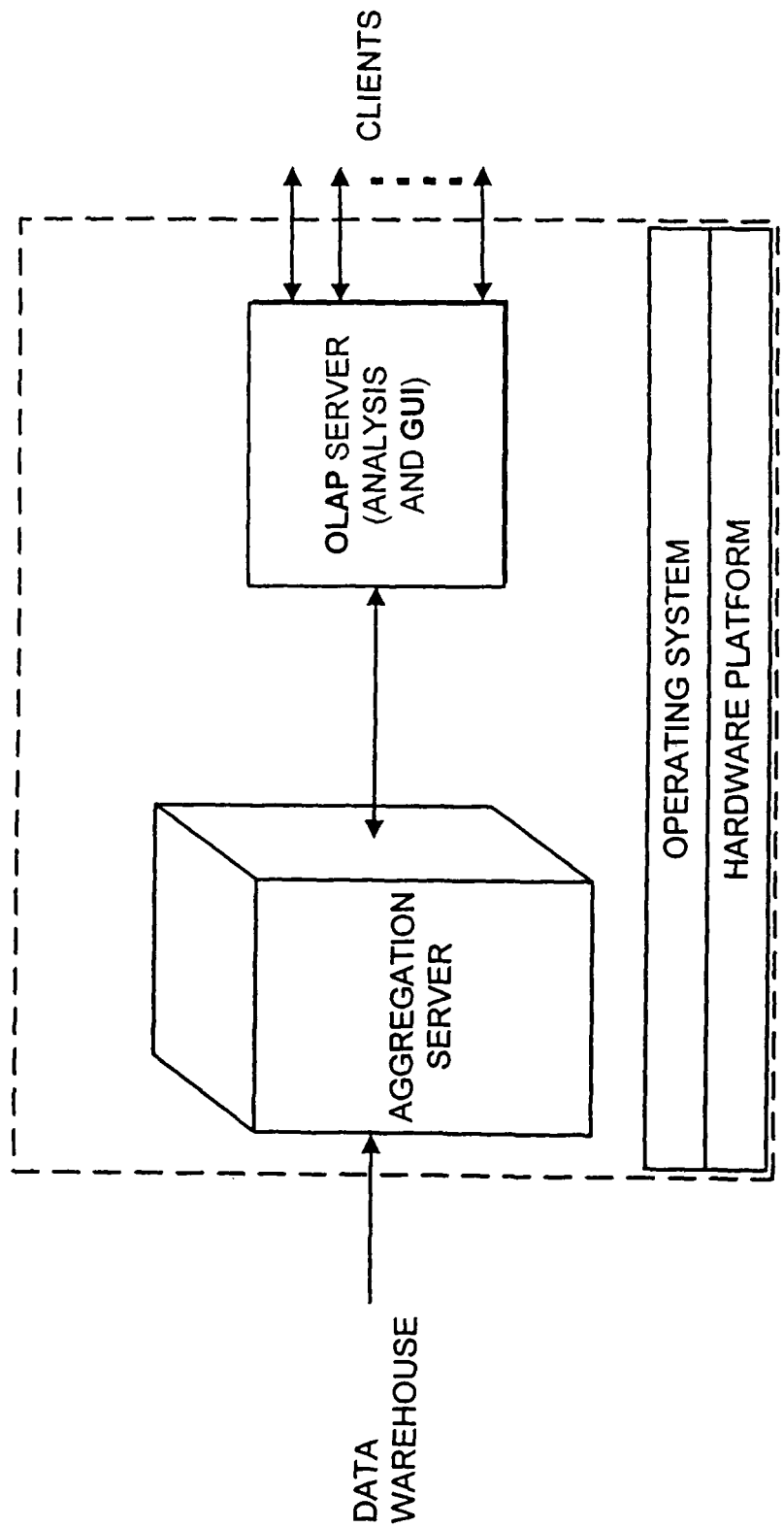
FIG. 7B is a schematic representation of a shared-platform type implementation of the stand-alone Aggregation Server of the illustrative embodiment of FIG. 6B and a conventional OLAP server supporting a plurality of client machines, wherein base data from a Data Warehouse is shown being received by the stand-alone Aggregation Server, realized on a common hardware/software platform and the aggregation server is shown serving the conventional OLAP server, realized on the same common hardware/software platform, as well as serving data aggregation requirements of other clients supporting diverse applications such as spreadsheet, GUI front end, and applications.

FIGS. 7A and 7B outline two different implementations of the stand-alone (cartridge-style) Aggregation Server of the present invention. In both implementations, the Aggregation Server supplies aggregated results to a client.

FIG. 7A shows a separate-platform type implementation of the MOLAP system of the illustrative embodiment shown in FIG. 6A, wherein the Aggregation Server of the present invention resides on a separate hardware platform and OS system from that used to run the OLAP server. In this type of implementation, it is even possible to run the Aggregation Server and the OLAP Server on different-type operating systems (e.g. NT, Unix, MAC OS).

FIG. 7B shows a common-platform type implementation of the MOLAP system of the illustrative embodiment shown in FIG. 6B, wherein the Aggregation Server of the present invention and OLAP Server share the same hardware platform and operating system (OS).

FIG. 8A shows a table setting forth the benchmark results of an aggregation engine, implemented on a shared/common hardware platform and OS, in accordance with the principles of the present invention. The common platform and OS is realized using a Pentium II 450 Mhz, 1 GB RAM, 18 GB Disk, running the Microsoft NT operating system. The six (6) data sets shown in the table differ in number of dimensions, number of hierarchies, measure of sparcity and data size. A comparison with ORACLE Express, a major OLAP server, is made. It is evident that the aggregation engine of the present invention outperforms currently leading aggregation technology by more than an order of magnitude.

The segmented data aggregation method of the present invention is described in FIGS. 9A through 9C2. These figures outline a simplified setting of three dimensions only; however, the following analysis applies to any number of dimensions as well.

The data is being divided into autonomic segments to minimize the amount of simultaneously handled data. The initial aggregation is practiced on a single dimension only, while later on the aggregation process involves all other dimensions.

At the first stage of the aggregation method, an aggregation is performed along dimension 1. The first stage can be performed on more than one dimension. As shown in FIG. 9A, the space of the base data is expanded by the aggregation process.

In the next stage shown in FIG. 9B, any segment along dimension 1, such as the shown slice, can be separately aggregated along the remaining dimensions, 2 and 3. In general, for an N dimensional system, the second stage involves aggregation in N–1 dimensions.

The principle of data segmentation can be applied on the first stage as well. However, only a large enough data set will justify such a sliced procedure in the first dimension. Actually, it is possible to consider each segment as an N–1 cube, enabling recursive computation.

It is imperative to get aggregation results of a specific slice before the entire aggregation is completed, or alternatively, to have the roll-up done in a particular sequence. This novel feature of the aggregation method of the present invention is that it allows the querying to begin, even before the regular aggregation process is accomplished, and still having fast response. Moreover, in relational OLAP and other systems requiring only partial aggregations, the QDR process dramatically speeds up the query response.

The QDR process is made feasible by the slice-oriented roll-up method of the present invention. After aggregating the first dimension(s), the multidimensional space is composed of independent multidimensional cubes (slices). These cubes can be processed in any arbitrary sequence.

Consequently the aggregation process of the present invention can be monitored by means of files, shared memory sockets, or queues to statically or dynamically set the roll-up order.

In order to satisfy a single query coming from a client, before the required aggregation result has been prepared, the QDR process of the present invention involves performing a fast on-the-fly aggregation (roll-up) involving only a thin slice of the multidimensional data.

FIG. 9C1 shows a slice required for building-up a roll-up result of the $2^{nd}$ dimension. In case 1, as shown, the aggregation starts from an existing data, either basic or previously aggregated in the first dimension. This data is utilized as a basis for QDR aggregation along the second dimension. In case 2, due to lack of previous data, a QDR involves an initial slice aggregation along dimension 3, and thereafter aggregation along the $2^{nd}$ dimension.

FIG. 9C2 shows two corresponding QDR cases for gaining results in the 3rd dimension. Cases 1 and 2 differ in the amount of initial aggregation required in $2^{nd}$ dimension.

FIG. 10A illustrates the "Slice-Storage" method of storing sparse data on storage disks. In general, this data storage method is based on the principle that an ascending-ordered index along aggregation direction, enables fast retrieval of data. FIG. 10A illustrates a unit-wide slice of the multidimensional cube of data. Since the data is sparse, only few non-NA data points exist. These points are indexed as follows. The Data File consists of data records, in which each n−1 dimensional slice is being stored, in a separate record. These records have a varying length, according to the amount of non-NA stored points. For each registered point in the record, $IND_k$ stands for an index in a n-dimensional cube, and Data stands for the value of a given point in the cube.

FIG. 10B illustrates a novel method for randomly searching for a queried data point in the MDDB of FIG. 6B by using a novel technique of organizing data files and the directory file used in the storages of the MDDB, so that a simple binary search technique can then be employed within the Aggregation Server of the present invention. According to this method, a metafile termed DIR File, keeps pointers to Data Files as well as additional parameters such as the start and end addresses of data record ($IND_0$, $IND_n$), its location within the Data File, record size (n), file's physical address on disk (D_Path), and auxiliary information on the record (Flags).

A search for a queried data point is then performed by an access to the DIR file. The search along the file can be made using a simple binary search due to file's ascending order. When the record is found, it is then loaded into main memory to search for the required point, characterized by its index $IND_k$. The attached Data field represents the queried value. In case the exact index is not found, it means that the point is a NA.

Figure 11A:
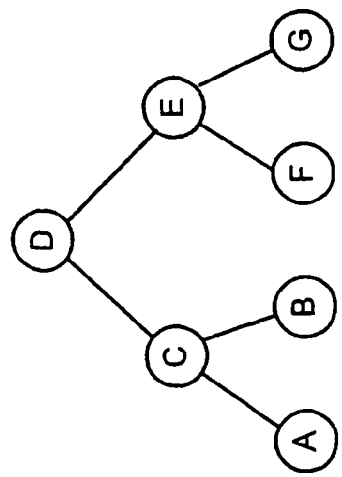
FIG. 11A is a schematic representation of three exemplary multi-hierarchical data structures for storage of data within the MDDB of FIG. 6B, having three levels of hierarchy, wherein the first level representative of base data is composed of items A, B, F, and G, the second level is composed of items C, E, H and I, and the third level is composed of a single item D, which is common to all three hierarchical structures.
Figure 11A:
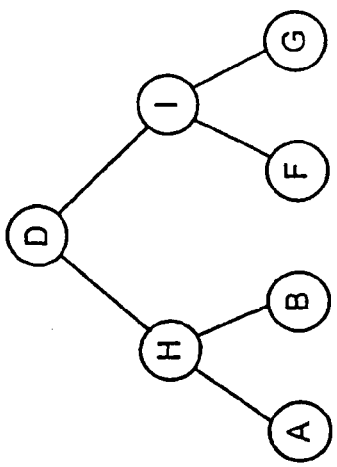
Figure 11B:
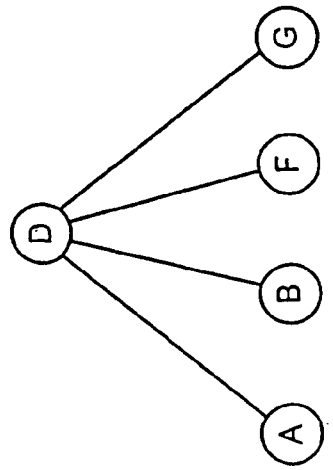
FIG. 11B is a schematic representation of an optimized multi-hierarchical data structure merged from all three hierarchies of FIG. 11A, in accordance with the principles of the present invention.
Figure 11B:
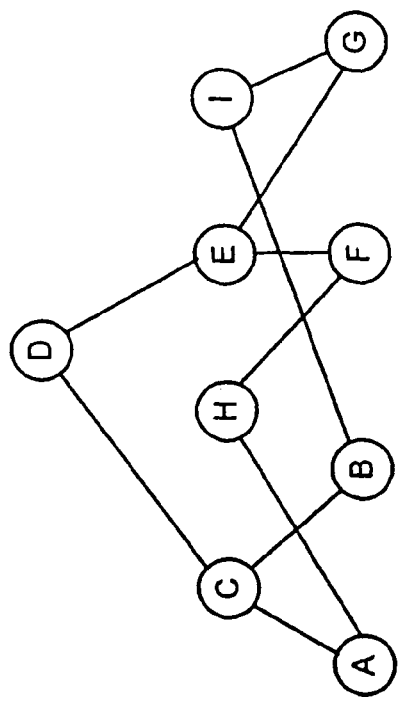
Figure 11C:
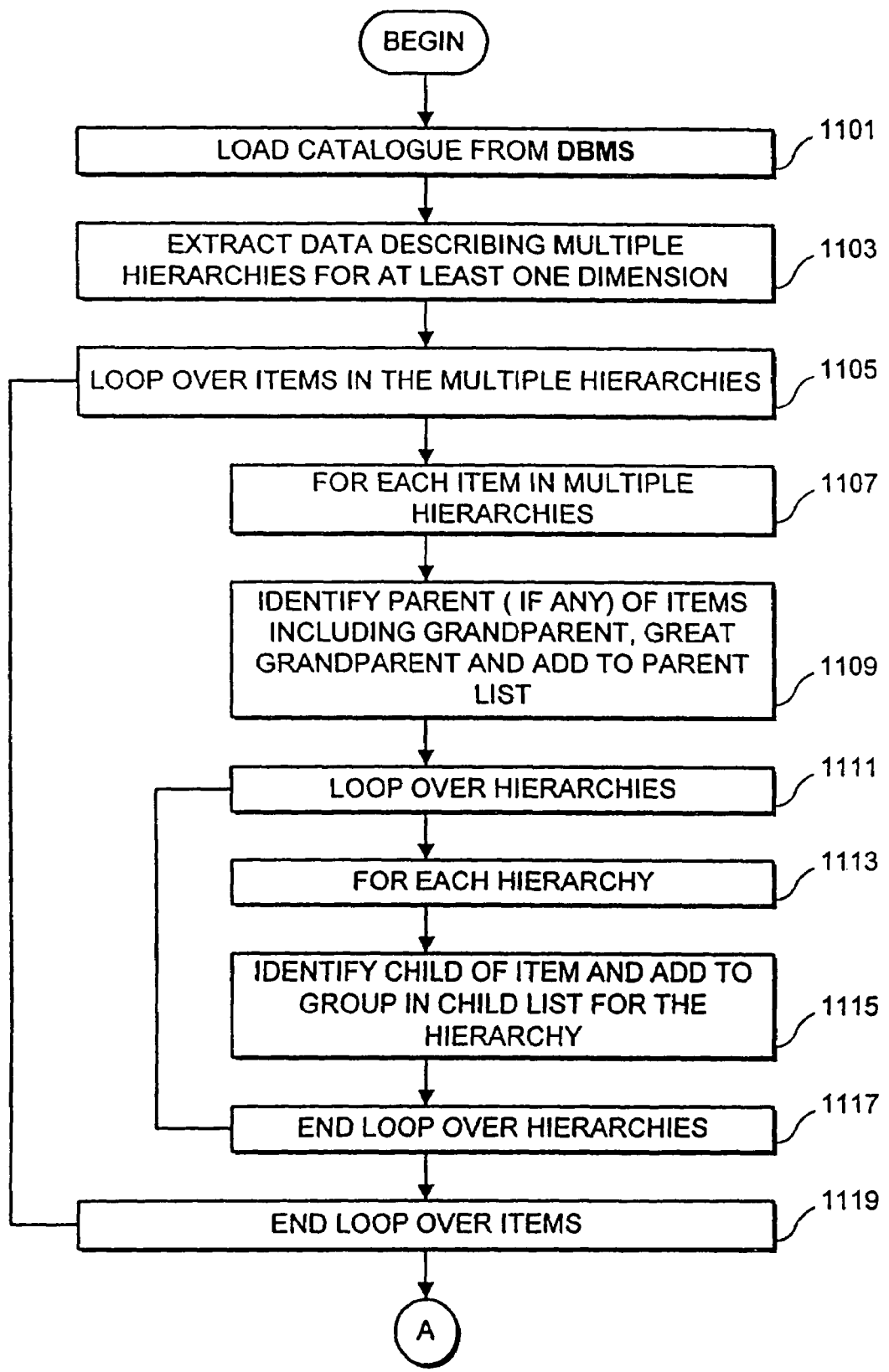
FIG. 11C(i) through 11C(ix) represent a flow chart description (and accompanying data structures) of the operations of an exemplary hierarchy transformation mechanism of the present invention that optimally merges multiple hierarchies into a single hierarchy that is functionally equivalent to the multiple hierarchies.

In another aspect of the present invention, a novel method is provided for optimally merging multiple hierarchies in multi-hierarchical structures. The method, illustrated in FIGS. 11A, 11B, and 11C is preferably used by the Aggregation Server of the present invention in processing the table data (base data), as it arrives from RDBMS.

According to the devised method, the inner order of hierarchies within a dimension is optimized, to achieve efficient data handling for summations and other mathematical formulas (termed in general "Aggregation"). The order of hierarchy is defined externally. It is brought from a data source to the stand-alone aggregation engine, as a descriptor of data, before the data itself. In the illustrative embodiment, the method assumes hierarchical relations of the data, as shown in FIG. 11A. The way data items are ordered in the memory space of the Aggregation Server, with regard to the hierarchy, has a significant impact on its data handling efficiency.

Notably, when using prior art techniques, multiple handling of data elements, which occurs when a data element is accessed more than once during aggregation process, has been hitherto unavoidable when the main concern is to effectively handle the sparse data. The data structures used in prior art data handling methods have been designed for fast access to a non NA data. According to prior art techniques, each access is associated with a timely search and retrieval in the data structure. For the massive amount of data typically accessed from a Data Warehouse in an OLAP application, such multiple handling of data elements has significantly degraded the efficiency of prior art data aggregation processes. When using prior art data handling techniques, the data element D shown in FIG. 11A must be accessed three times, causing poor aggregation performance.

In accordance with the data handling method of the present invention, the data is being pre-ordered for a singular handling, as opposed to multiple handling taught by prior art methods. According to the present invention, elements of base data and their aggregated results are contiguously stored in a way that each element will be accessed only once. This particular order allows a forward-only handling, never backward. Once a base data element is stored, or aggregated result is generated and stored, it is never to be retrieved again for further aggregation. As a result the storage access is minimized. This way of singular handling greatly elevates the aggregation efficiency of large data bases. An efficient handling method as used in the present invention, is shown in FIG. 7A. The data element D, as any other element, is accessed and handled only once.

FIG. 11A shows an example of a multi-hierarchical database structure having 3 hierarchies. As shown, the base data has a dimension that includes items A, B, F, and G. The second level is composed of items C, E, H and I. The third level has a single item D, which is common to all three hierarchical structures. In accordance with the method of the present invention, a minimal computing path is always taken. For example, according to the method of the present invention, item D will be calculated as part of structure 1, requiring two mathematical operations only, rather than as in structure 3, which would need four mathematical operations. FIG. 11B depicts an optimized structure merged from all three hierarchies.

FIG. 11C(i) through 11C(ix) represent a flow chart description (and accompanying data structures) of the operations of an exemplary hierarchy transformation mechanism of the present invention that optimally merges multiple hierarchies into a single hierarchy that is functionally equivalent to the multiple hierarchies. For the sake of description, the data structures correspond to exemplary hierarchical structures described above with respect to FIGS. 11(A) and 11(B). As illustrated in FIG. 11C(i), in step 1101, a catalogue is loaded from the DBMS system. As is conventional, the catalogue includes data ("hierarchy descriptor data") describing multiple hierarchies for at least one dimension of the data stored in the DBMS. In step 1103, this hierarchy descriptor data is extracted from the catalogue. A loop (steps 1105-1119) is performed over the items in the multiple hierarchy described by the hierarchy descriptor data.

In the loop 1105-1119, a given item in the multiple hierarchy is selected (step 1107); and, in step 1109, the parent(s) (if any)—including grandparents, great-grandparents, etc.—of the given item are identified and added to an entry (for the given item) in a parent list data structure, which is illustrated in FIG. 11C(v). Each entry in the parent list corresponds to a specific item and includes zero or more identifiers for items that are parents (or grandparents, or great-grandparents) of the specific item. In addition, an inner loop (steps 1111-1117) is performed over the hierarchies of the multiple hierarchies described by the hierarchy descriptor data, wherein in step 1113 one of the multiple hierarchies is selected. In step 1115, the child of the given item in the selected hierarchy (if any) is identified and added (if need be) to a group of identifiers in an entry (for the given item) in a child list data structure, which is illustrated in FIG. 11C(vi). Each entry in the child list corresponds to a specific item and includes zero or more groups of identifiers each identifying a child of the specific item. Each group corresponds to one or more of the hierarchies described by the hierarchy descriptor data.

The operation then continues to steps 1121 and 1123 as illustrated in FIG. 11C(ii) to verify the integrity of the multiple hierarchies described by the hierarchy descriptor data (step 1121) and fix (or report to the user) any errors discovered therein (step 1123). Preferably, the integrity of the multiple hierarchies is verified in step 1121 by iteratively expanding each group of identifiers in the child list to include the children, grandchildren, etc of any item listed in the group. If the child(ren) for each group for a specific item do not match, a verification error is encountered, and such error is fixed (or reported to the user (step 1123). The operation then proceeds to a loop (steps 1125-1133) over the items in the child list.

In the loop (steps 1125-1133), a given item in the child list is identified in step 1127. In step 1129, the entry in the child list for the given item is examined to determine if the given item has no children (e.g., the corresponding entry is null). If so, the operation continues to step 1131 to add an entry for the item in level 0 of an ordered list data structure, which is illustrated in FIG. 11C(vii); otherwise the operation continues to process the next item of the child list in the loop. Each entry in a given level of the order list corresponds to a specific item and includes zero or more identifiers each identifying a child of the specific item. The levels of the order list described the transformed hierarchy as will readily become apparent in light of the following. Essentially, loop 1125-1333 builds the lowest level (level 0) of the transformed hierarchy.

After loop 1125-1133, operation continues to process the lowest level to derive the next higher level, and iterate over this process to build out the entire transformed hierarchy. More specifically, in step 1135, a "current level" variable is set to identify the lowest level. In step 1137, the items of the "current level" of the ordered list are copied to a work list. In step 1139, it is determined if the work list is empty. If so, the operation ends; otherwise operation continues to step 1141 wherein a loop (steps 1141-1159) is performed over the items in the work list.

In step 1143, a given item in the work list is identified and operation continues to an inner loop (steps 1145-1155) over the parent(s) of the given item (which are specified in the parent list entry for the given item). In step 1147 of the inner loop, a given parent of the given item is identified. In step 1149, it is determined whether any other parent (e.g., a parent other than the given patent) of the given item is a child of the given parent (as specified in the child list entry for the given parent). If so, operation continues to step 1155 to process the next parent of the given item in the inner loop; otherwise, operation continues to steps 1151 and 1153. In step 1151, an entry for the given parent is added to the next level (current level+1) of the ordered list, if it does not exist there already. In step 1153, if no children of the given item (as specified in the entry for the given item in the current level of the ordered list) matches (e.g., is covered by) any child (or grandchild or great grandchild etc) of item(s) in the entry for the given parent in the next level of the ordered list, the given item is added to the entry for the given parent in the next level of the ordered list. Levels 1 and 2 of the ordered list for the example described above are shown in FIGS. 11C(viii) and 11C(ix), respectively. The children (including grandchildren and great grandchildren. etc) of an item in the entry for a given parent in the next level of the ordered list may be identified by the information encoded in the lower levels of the ordered list. After step 1153, operation continues to step 1155 to process the next parent of the given item in the inner loop (steps 1145-1155)

After processing the inner loop (steps 1145-1155), operation continues to step 1157 to delete the given item from the work list, and processing continues to step 1159 to process the next item of the work list in the loop (steps 1141-1159).

After processing the loop (steps 1141-1159), the ordered list (e.g., transformed hierarchy) has been built for the next higher level. The operation continues to step 1161 to increment the current level to the next higher level, and operation returns (in step 1163) to step 1138 to build the next higher level, until the highest level is reached (determined in step 1139) and the operation ends.

Figure 12:
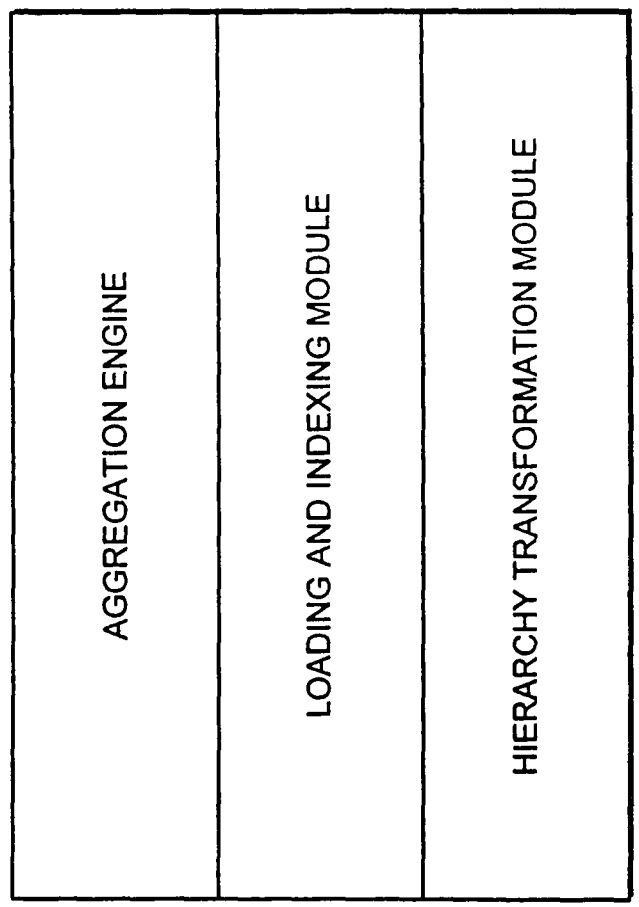
FIG. 12 is a schematic representation showing the levels of operations performed by the stand-alone Aggregation Server of FIG. 6B, summarizing the different enabling components for carrying out the method of segmented aggregation in accordance with the principles of the present invention.
Figure 14:
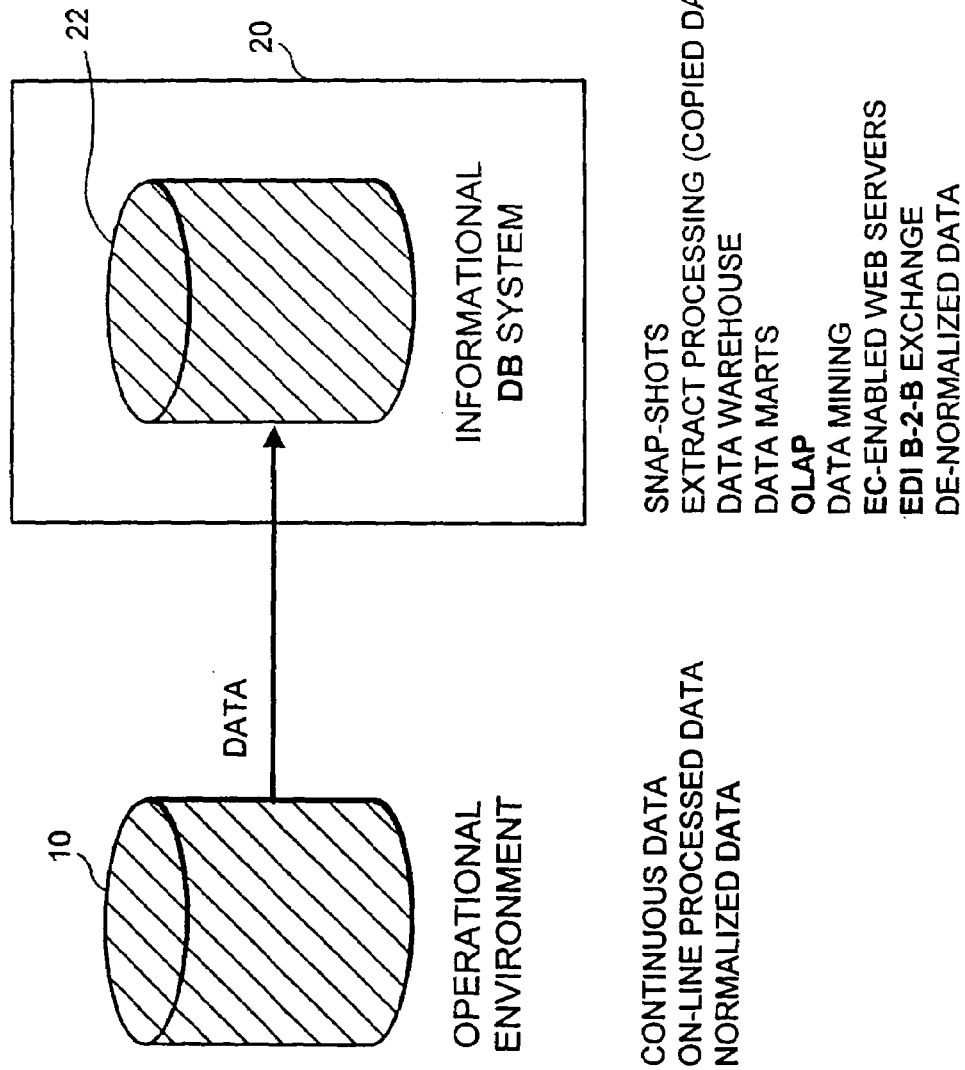
FIG. 14 is a schematic representation of a prior art information database system, wherein the present invention may be embodied.
Figure 15:
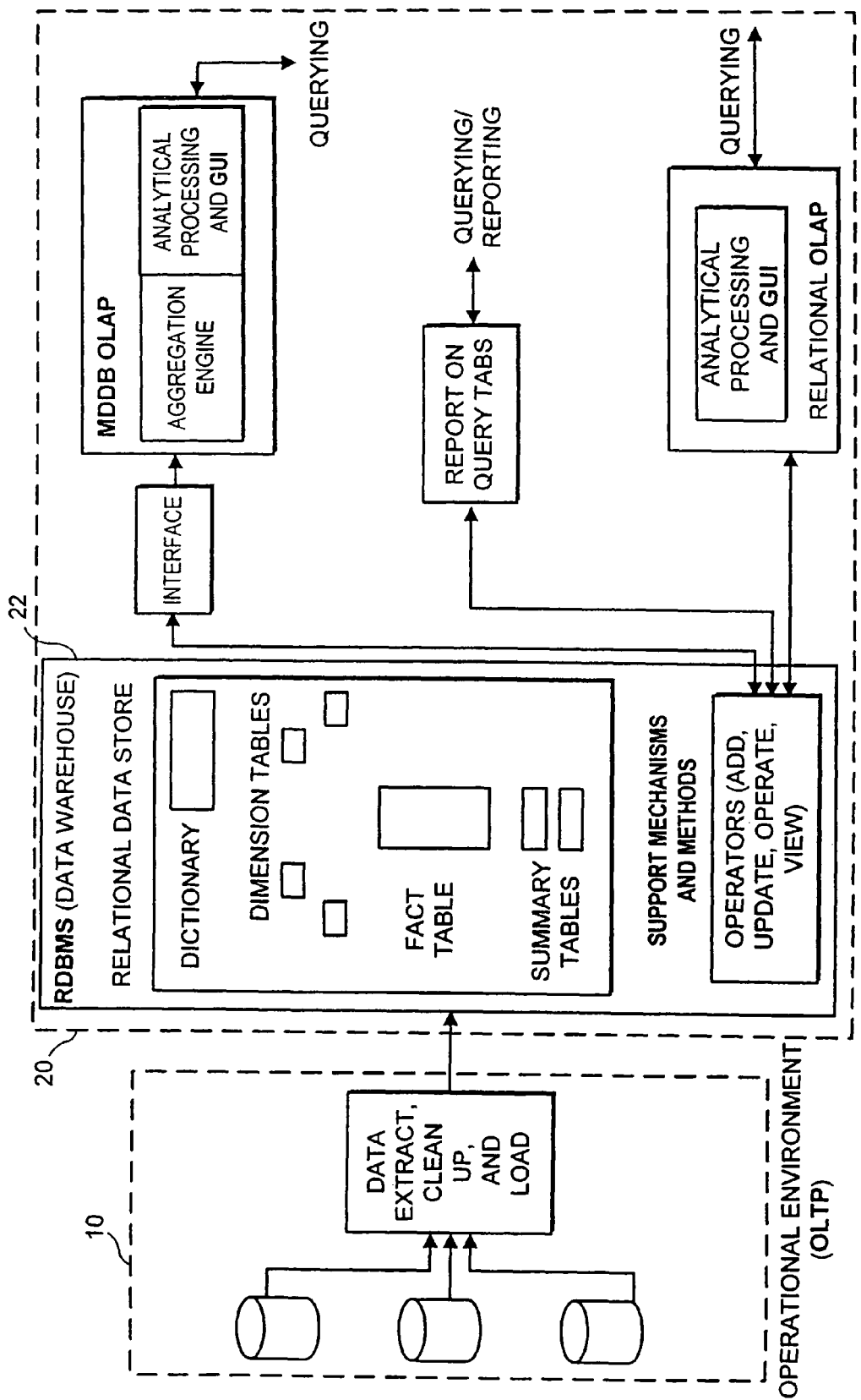
FIG. 15 is a schematic representation of the prior art data warehouse and OLAP system, wherein the present invention may be embodied.
Figure 17A:
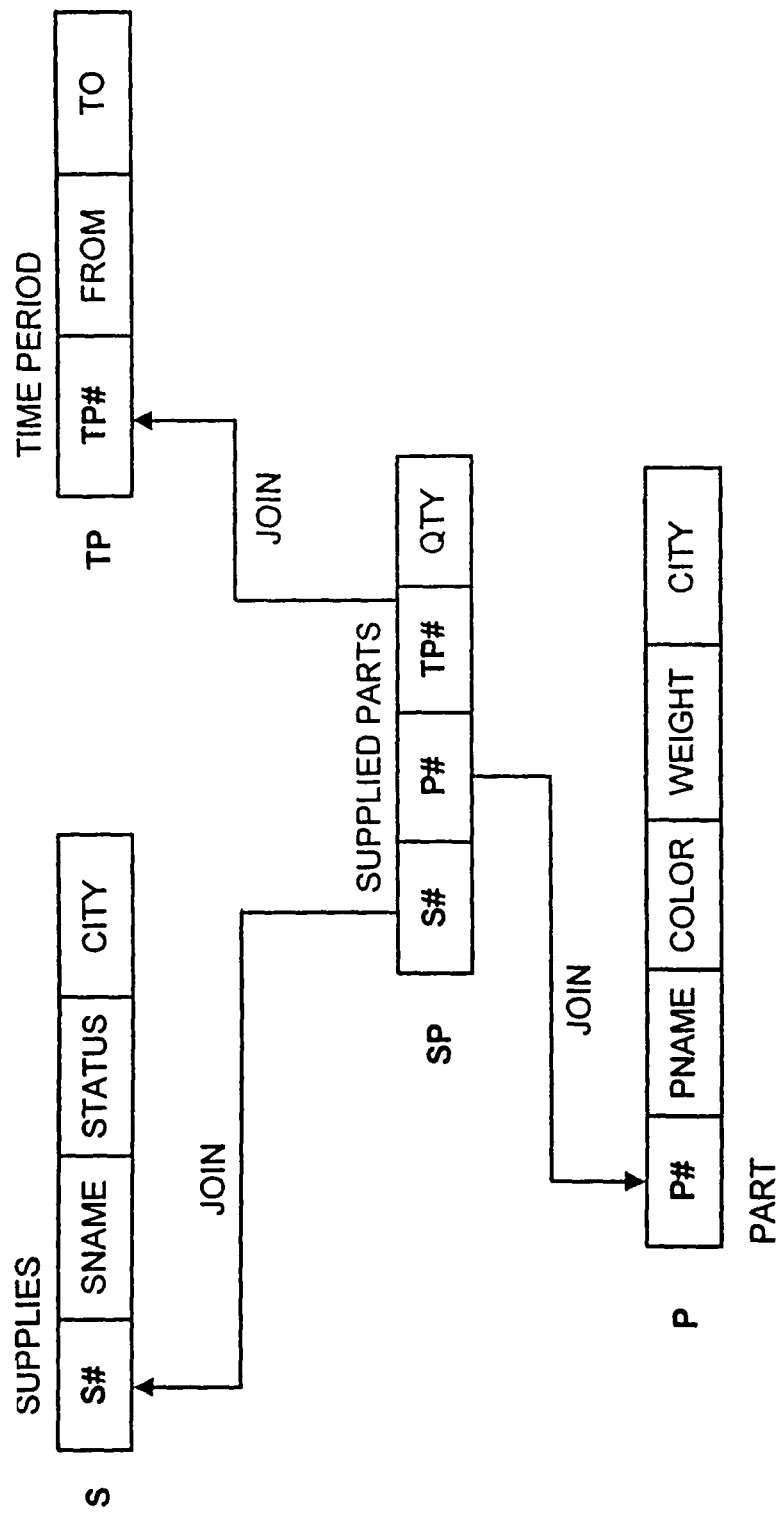
FIG. 17A is a schematic representation of an exemplary dimensional schema (star schema) of a relational database.
Figure 18A:
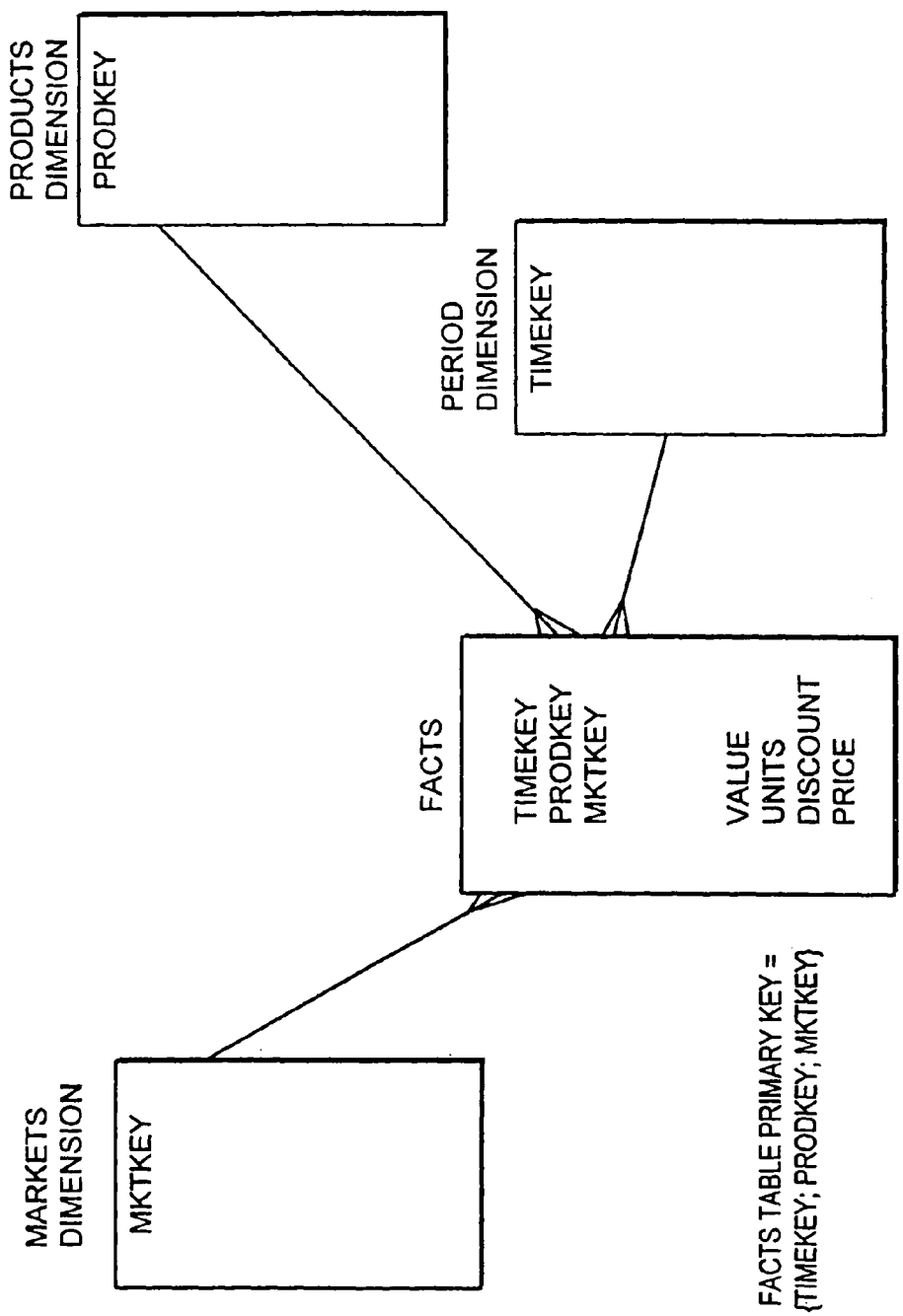
FIG. 18A is a schematic representation of an exemplary multidimensional schema (star schema)
Figure 18B:
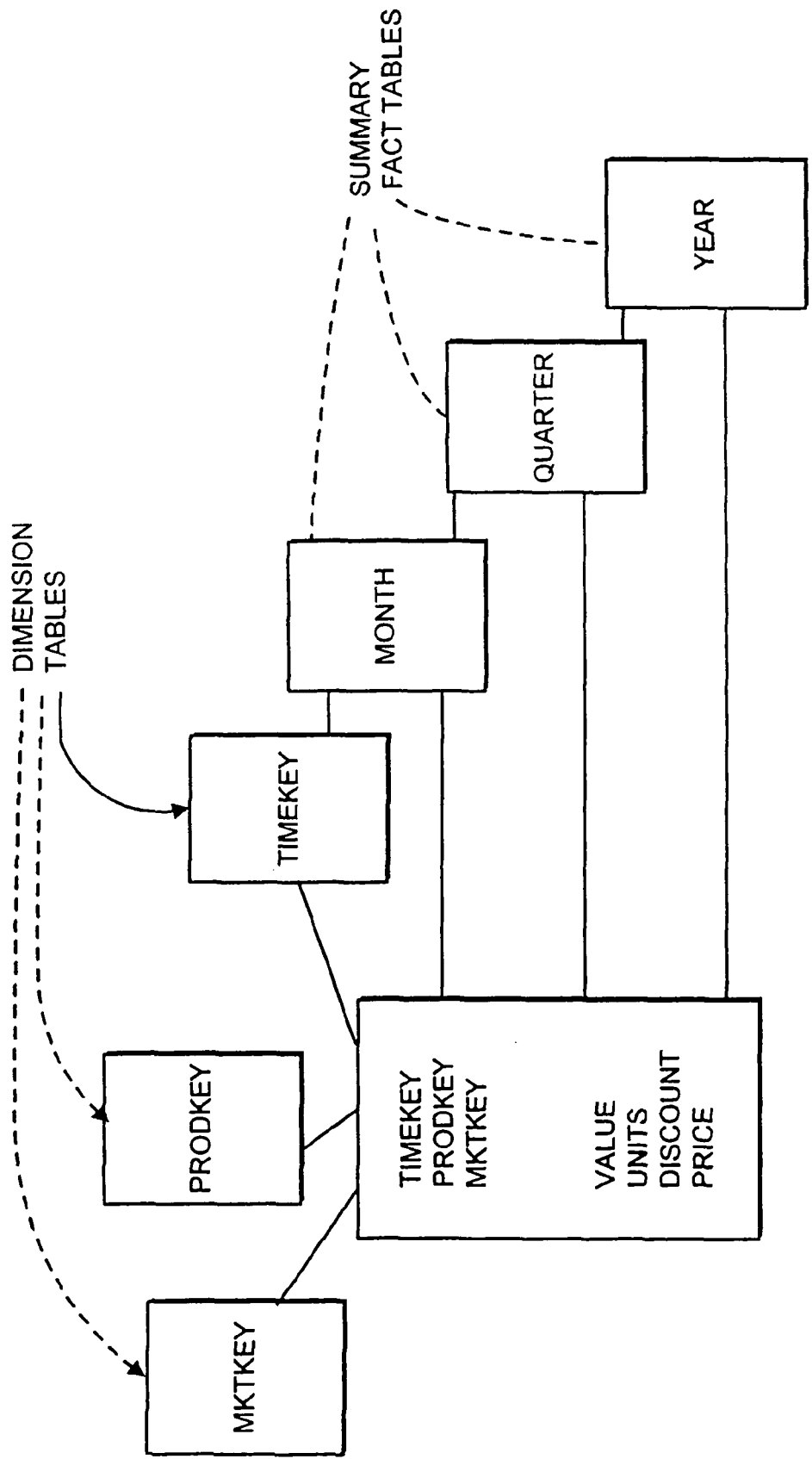
FIG. 18B is a schematic representation of tables used to implement the schema of FIG. 18A, including summary tables storing results of aggregation operations performed on the facts of the central fact table along the time-period dimension, in accordance with conventional teachings.

FIG. 12 summarizes the components of an exemplary aggregation module that takes advantage of the hierarchy transformation technique described above. More specifically, the aggregation module includes an hierarchy transformation module that optimally merges multiple hierarchies into a single hierarchy that is functionally equivalent to the multiple hierarchies. A second module loads and indexes the base data supplied from the DBMS using the optimal hierarchy generated by the hierarchy transformation module. An aggregation engine performs aggregation operations on the base data. During the aggregation operations along the dimension specified by the optimal hierarchy, the results of the aggregation operations of the level 0 items may be used in the aggregation operations of the level 1 items, the results of the aggregation operations of the level 1 items may be used in the aggregation operations of the level 2 items, etc. Based on these operations, the loading and indexing operations of the base data, along with the aggregation become very efficient, minimizing memory and storage access, and speeding up storing and retrieval operations.

FIG. 13 shows the stand-alone Aggregation Server of the present invention as a component of a central data warehouse, serving the data aggregation needs of URL directory systems, Data Marts, RDBMSs, ROLAP systems and OLAP systems alike.

The reason for the central multidimensional database's rise to corporate necessity is that it facilitates flexible, high-performance access and analysis of large volumes of complex and interrelated data.

A stand-alone specialized aggregation server, simultaneously serving many different kinds of clients (e.g. data mart, OLAP, URL, RDBMS), has the power of delivering an enterprise-wide aggregation in a cost-effective way. This kind of server eliminates the roll-up redundancy over the group of clients, delivering scalability and flexibility.

Performance associated with central data warehouse is an important consideration in the overall approach. Performance includes aggregation times and query response.

Effective interactive query applications require near real-time performance, measured in seconds. These application performances translate directly into the aggregation requirements.

In the prior art, in case of MOLAP, a full pre-aggregation must be done before starting querying. In the present invention, in contrast to prior art, the query directed roll-up (QDR) allows instant querying, while the full pre-aggregation is done in the background. In cases a full pre-aggregation is preferred, the currently invented aggregation outperforms any prior art. For the ROLAP and RDBMS clients, partial aggregations maximize query performance. In both cases fast aggregation process is imperative. The aggregation performance of the current invention is by orders of magnitude higher than that of the prior art.

The stand-alone scalable aggregation server of the present invention can be used in any MOLAP system environment for answering questions about corporate performance in a particular market, economic trends, consumer behaviors, weather conditions, population trends, or the state of any physical, social, biological or other system or phenomenon on which different types or categories of information, organizable in accordance with a predetermined dimensional hierarchy, are collected and stored within a RDBMS of one sort or another. Regardless of the particular application selected, the address data mapping processes of the present invention will provide a quick and efficient way of managing a MDDB and also enabling decision support capabilities utilizing the same in diverse application environments.

The stand-alone "cartridge-style" plug-in features of the data aggregation server of the present invention, provides freedom in designing an optimized multidimensional data structure and handling method for aggregation, provides freedom in designing a generic aggregation server matching all OLAP vendors, and enables enterprise-wide centralized aggregation.

The method of Segmented Aggregation employed in the aggregation server of the present invention provides flexibility, scalability, a condition for Query Directed Aggregation, and speed improvement.

The method of Multidimensional data organization and indexing employed in the aggregation server of the present invention provides fast storage and retrieval, a condition for Segmented Aggregation, improves the storing, handling, and retrieval of data in a fast manner, and contributes to structural flexibility to allow sliced aggregation and QDR. It also enables the forwarding and single handling of data with improvements in speed performance.

The method of Query Directed Aggregation (QDR) employed in the aggregation server of the present invention minimizes the data handling operations in multi-hierarchy data structures.

The method of Query Directed Aggregation (QDR) employed in the aggregation server of the present invention eliminates the need to wait for full aggregation to be completed, and provides build-up aggregated data required for full aggregation.

In another aspect of the present invention, an improved DBMS system (e.g., RDBMS system, object oriented database system or object/relational database system) is provided that excels in performing two distinct functions, namely: the aggregation of data; and the handling of the resulting data for "on demand" client use. Moreover, because of improved data aggregation capabilities, the DBMS of the present invention can be employed in a wide range of applications, including Data Warehouses supporting OLAP systems and the like. For purposes of illustration, initial focus will be accorded to the DBMS of the present invention. Referring now to FIG. 19 through FIG. 21, the preferred embodiments of the method and system of the present invention will be now described in great detail herein below.

Through this document, the term "aggregation" and "pre-aggregation" shall be understood to mean the process of summation of numbers, as well as other mathematical operations, such as multiplication, subtraction, division etc. It shall be understood that pre-aggregation operations occur asynchronously with respect to the traditional query processing operations. Moreover, the term "atomic data" shall be understood to refer to the lowest level of data granularity required for effective decision making. In the case of a retail merchandising manager, atomic data may refer to information by store, by day, and by item. For a banker, atomic data may be information by account, by transaction, and by branch.

Figure 19A:
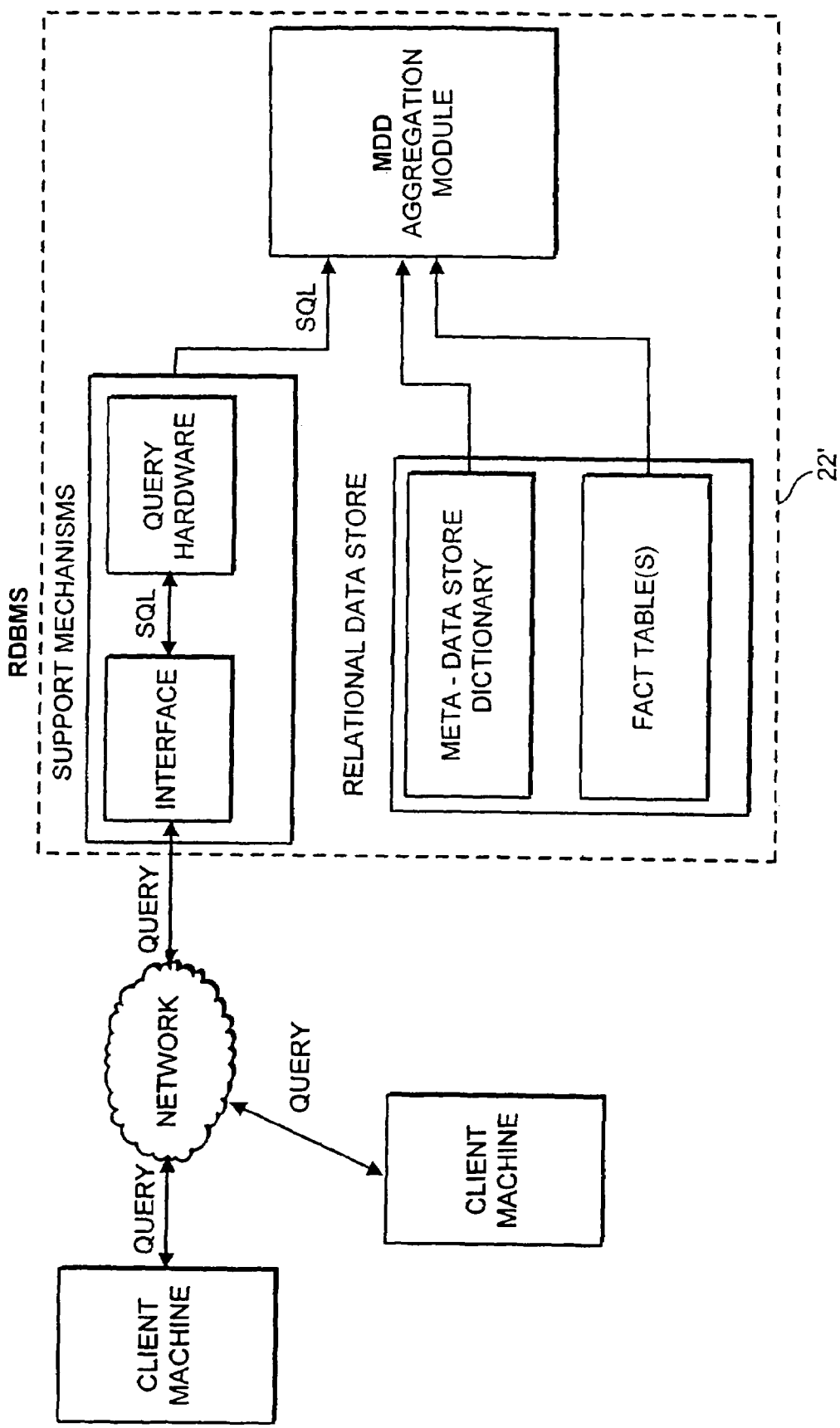
FIG. 19A is a schematic representation of an exemplary embodiment of a DBMS (for example, an RDBMS as shown) of the present invention comprising a relational datastore and an integrated multidimensional (MDD) aggregation module supporting queries from a plurality of clients, wherein the aggregation engine performs aggregation functions (e.g. summation of numbers, as well as other mathematical operations, such as multiplication, subtraction, division etc.) and non-relational multi-dimensional data storage functions.

FIG. 19A illustrates the primary components of an illustrative embodiment of an DBMS of the present invention, namely: support mechanisms including a query interface and query handler; a relational data store including one or more tables storing at least the atomic data (and possibly summary tables) and a meta-data store for storing a dictionary (sometimes referred to as a catalogue or directory); and an MDD Aggregation Module that stores atomic data and aggregated data in a MDDB. The MDDB is a non-relational data structure—it uses other data structures, either instead of or in addition to tables—to store data. For illustrative purposes, FIG. 19A illustrates an RDBMS wherein the relational data store includes fact tables and a dictionary.

It should be noted that the DBMS typically includes additional components (not shown) that are not relevant to the present invention. The query interface and query handler service user-submitted queries (in the preferred embodiment, SQL query statements) forwarded, for example, from a client machine over a network as shown. The query handler and relational data store (tables and meta-data store) are operably coupled to the MDD Aggregation Module. Importantly, the query handler and integrated MDD Aggregation Module operate to provide for dramatically improved query response times for data aggregation operations and drill-downs. Moreover, it is an object of the present invention to make user-querying of the non-relational MDDB no different than querying a relational table of the DBMS, in a manner that minimizes the delays associated with queries that involve aggregation or drill down operations. This object is enabled by providing the novel DBMS system and integrated aggregation mechanism of the present invention.

Figure 19B:
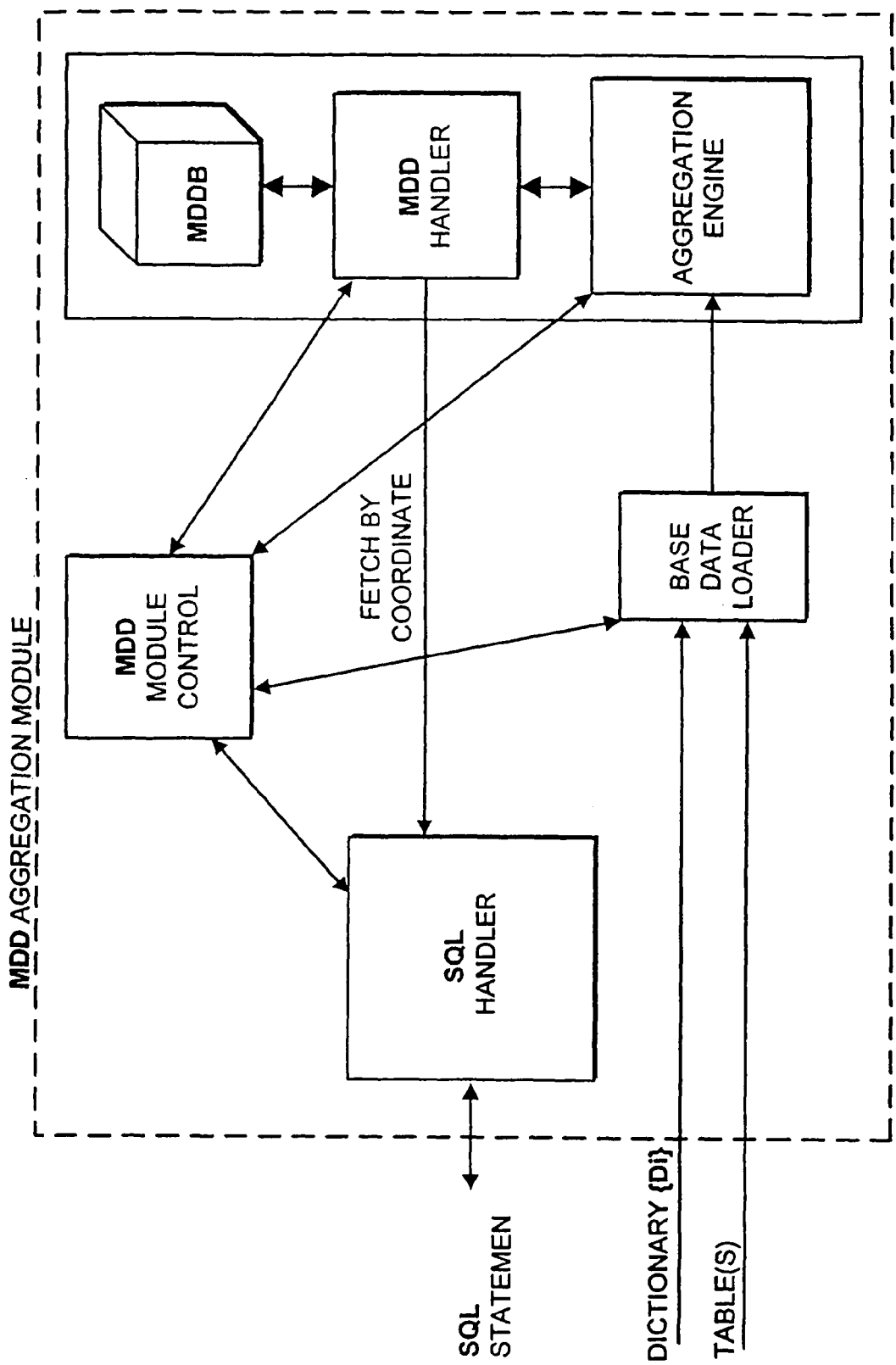
FIG. 19B is a schematic block diagram of the MDD aggregation module of the illustrative embodiment of the present invention shown in FIG. 6A.

FIG. 19B shows the primary components of an illustrative embodiment of the MDD Aggregation Module of FIG. 19A, namely: a base data loader for loading the directory and table(s) of relational data store of the DBMS; an aggregation engine for receiving dimension data and atomic data from the base loader, a multi-dimensional database (MDDB); a MDDB handler and an SQL handler that operate cooperatively with the query handler of the DBMS to provide users with query access to the MDD Aggregation Module, and a control module for managing the operation of the components of the MDD aggregation module. The base data loader may load the directory and table(s) of the relational data store over a standard interface (such as OLDB, OLE-DB, ODBC, SQL, API, JDBC, etc.). In this case, the DBMS and base data loader include components that provide communication of such data over these standard interfaces. Such interface components are well known in the art. For example, such interface components are readily available from Attunity Corporation.

During operation, base data originates from the table(s) of the DBMS. The core data aggregation operations are performed by the Aggregation Engine; a Multidimensional Data (MDDB) Handler; and a Multidimensional Data Storage (MDDB). The results of data aggregation are efficiently stored in the MDDB by the MDDB Handler. The SQL handler of the MDD Aggregation module services user-submitted queries (in the preferred embodiment, SQL query statements) forwarded from the query handler of the DBMS. The SQL handler of the MDD Aggregation module may communicate with the query handler of the DBMS over a standard interface (such as OLDB, OLE-DB, ODBC, SQL, API, JDBC, etc.). In this case, the support mechanisms of the RDBMS and SQL handler include components that provide communication of such data over these standard interfaces. Such interface components are well known in the art. Aggregation (or drill down results) are retrieved on demand and returned to the user.

Typically, a user interacts with a client machine (for example, using a web-enabled browser) to generate a natural language query, that is communicated to the query interface of the DBMS, for example over a network as shown. The query interface disintegrates the query, via parsing, into a series of requests (in the preferred embodiment, SQL statements) that are communicated to the query handler of the DBMS. It should be noted that the functions of the query interface may be implemented in a module that is not part of the DBMS (for example, in the client machine). The query handler of the DBMS forwards requests that involve data stored in the MDD of the MDD Aggregation module to the SQL hander of the MDD Aggregation module for servicing. Each request specifies a set of n-dimensions. The SQL handler of the MDD Aggregation Module extracts this set of dimensions and operates cooperatively with the MDD handler to address the MDDB using the set of dimensions, retrieve the addressed data from the MDDB, and return the results to the user via the query handler of the DBMS.

Figure 19C:
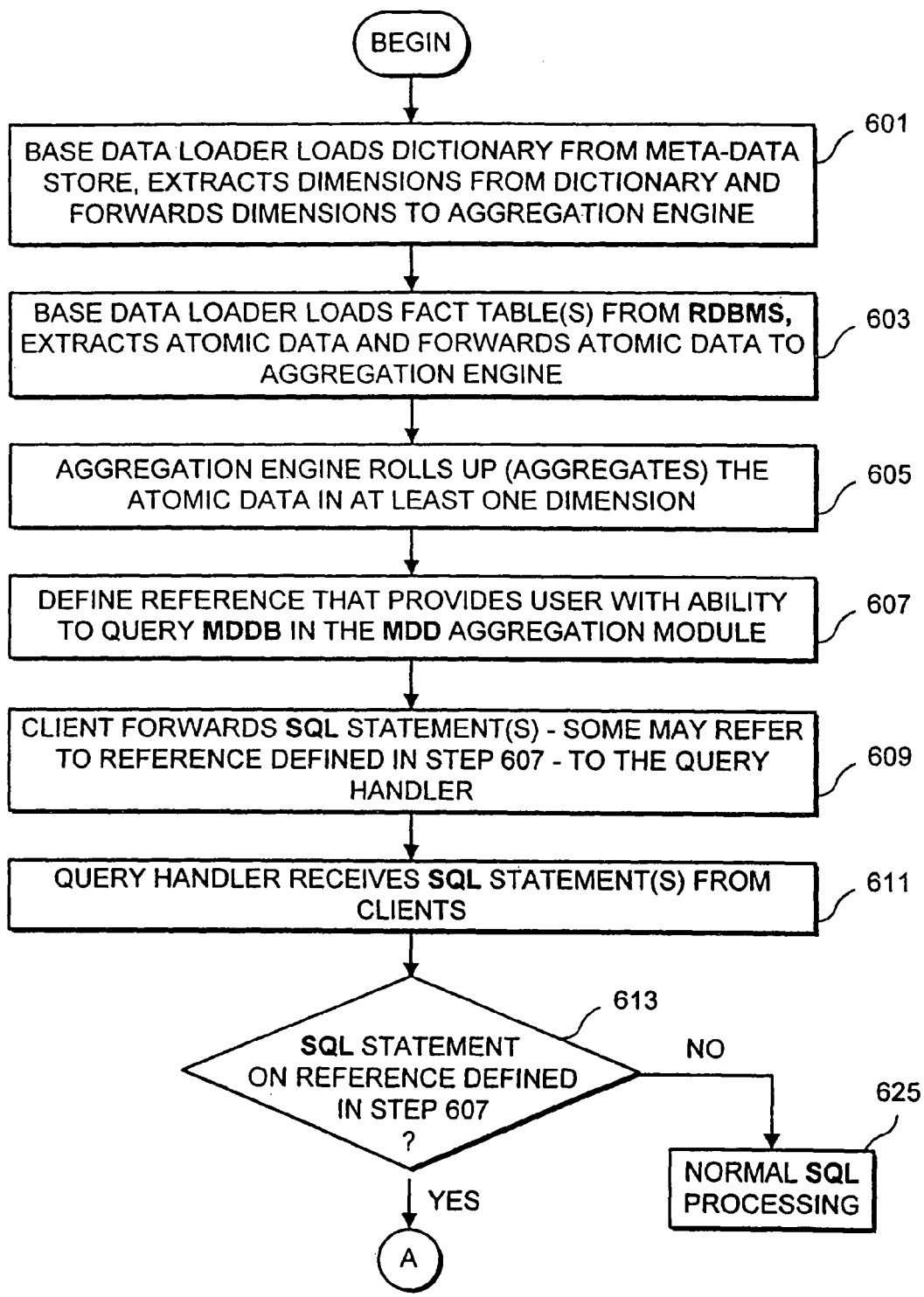
FIGS. 19C(i) and 19C(ii), taken together, set forth a flow chart representation of the primary operations carried out within the DBMS of the present invention when performing data aggregation and related support operations, including the servicing of user-submitted (e.g. natural language) queries made on such aggregated database of the present invention.
Figure 19D:
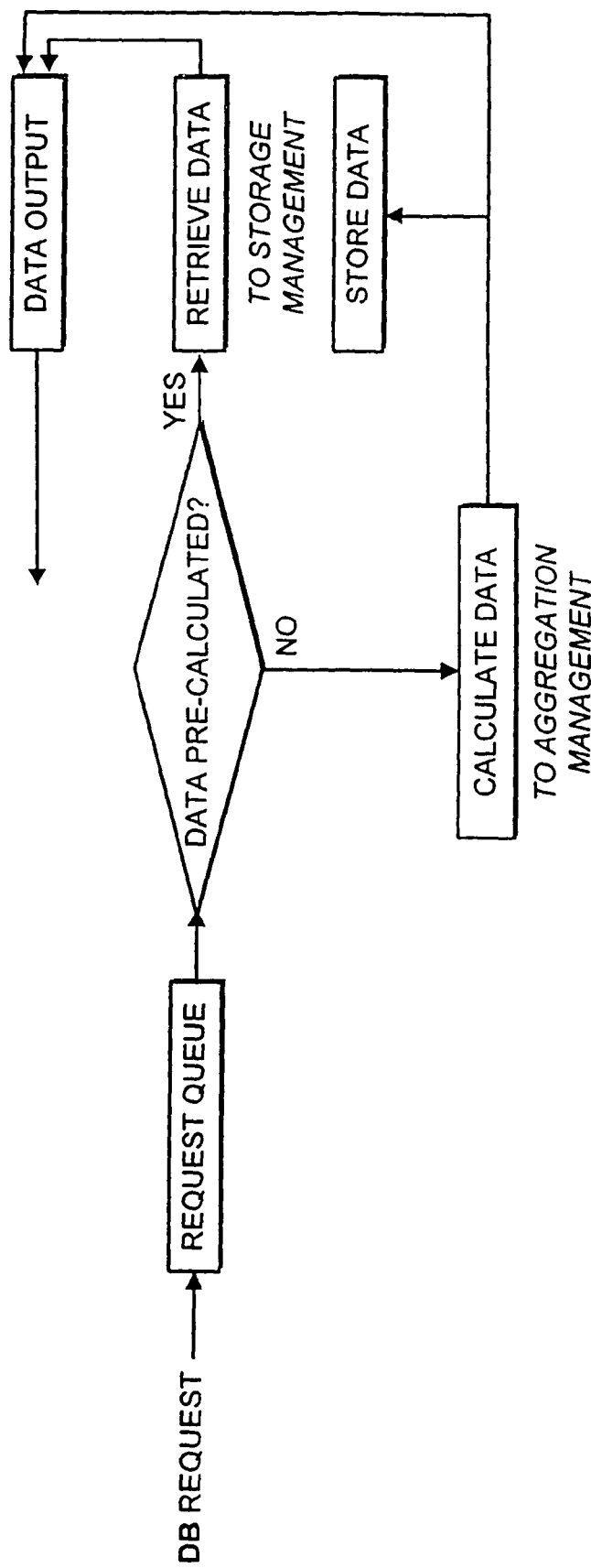
FIG. 19D is a flow chart representation of the primary operations carried out by the (DB) request serving mechanism within the MDD control module shown in FIG. 6B.

FIGS. 19C(i) and 19C(ii) is a flow chart illustrating the operations of an illustrative DBMS of the present invention. In step 601, the base data loader of the MDD Aggregation Module loads the dictionary (or catalog) from the meta-data store of the DBMS. In performing this function, the base data loader may utilize an adapter (interface) that maps the data types of the dictionary of the DBMS (or that maps a standard data type used to represent the dictionary of the DBMS) into the data types used in the MDD aggregation module. In addition, the base data loader extracts the dimensions from the dictionary and forwards the dimensions to the aggregation engine of the MDD Aggregation Module.

In step 603, the base data loader loads table(s) from the DBMS. In performing this function, the base data loader may utilize an adapter (interface) that maps the data types of the table(s) of the DBMS (or that maps a standard data type used to represent the fact table(s) of the DBMS) into the data types used in the MDD Aggregation Module. In addition, the base data loader extracts the atomic data from the table(s), and forwards the atomic data to the aggregation engine.

In step 605, the aggregation engine performs aggregation operations (i.e., roll-up operation) on the atomic data (provided by the base data loader in step 603) along at least one of the dimensions (extracted from the dictionary of the DBMS in step 601) and operates cooperatively with the MDD handler to store the resultant aggregated data in the MDDB. A more detailed description of exemplary aggregation operations according to a preferred embodiment of the present invention is set forth below with respect to the QDR process of FIGS. 9A-9C.

Figure 19E:
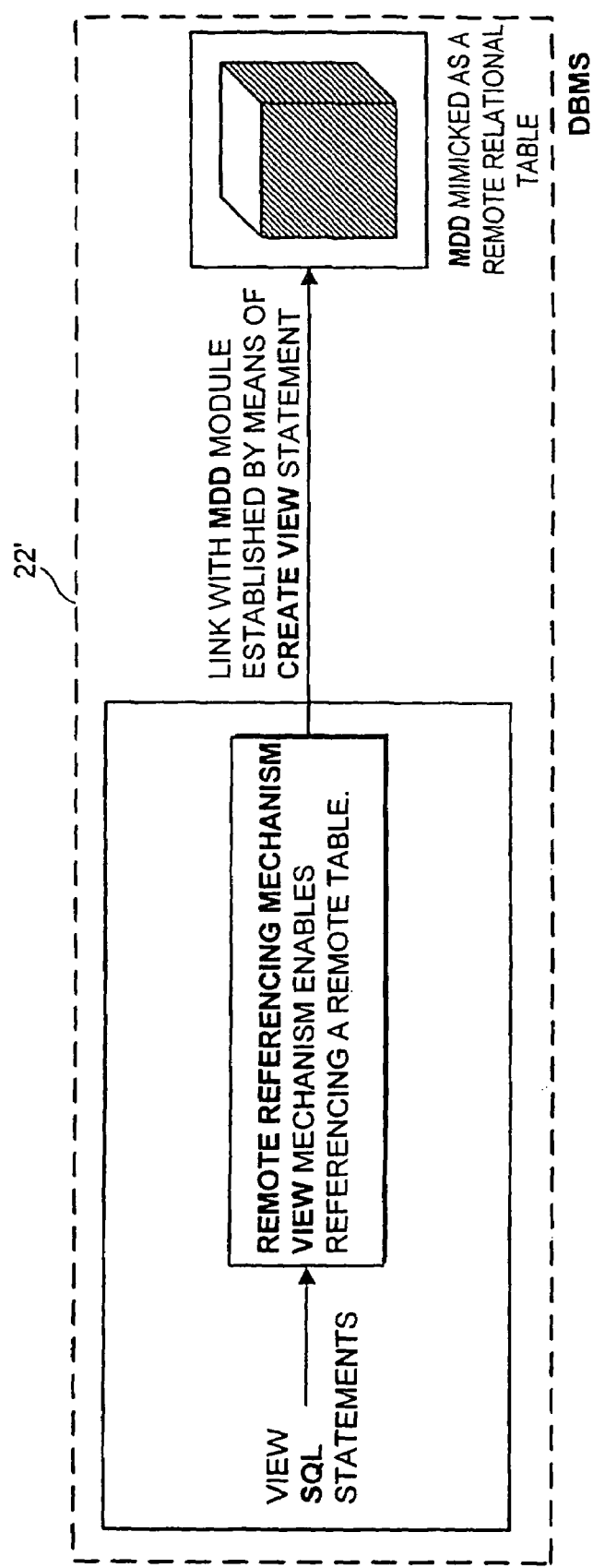
FIG. 19E is a schematic representation of the view mechanism of an DBMS that enables users to query on the aggregated data generated and/or stored in the MDD Aggregation module according to the present invention.
Figure 19F:
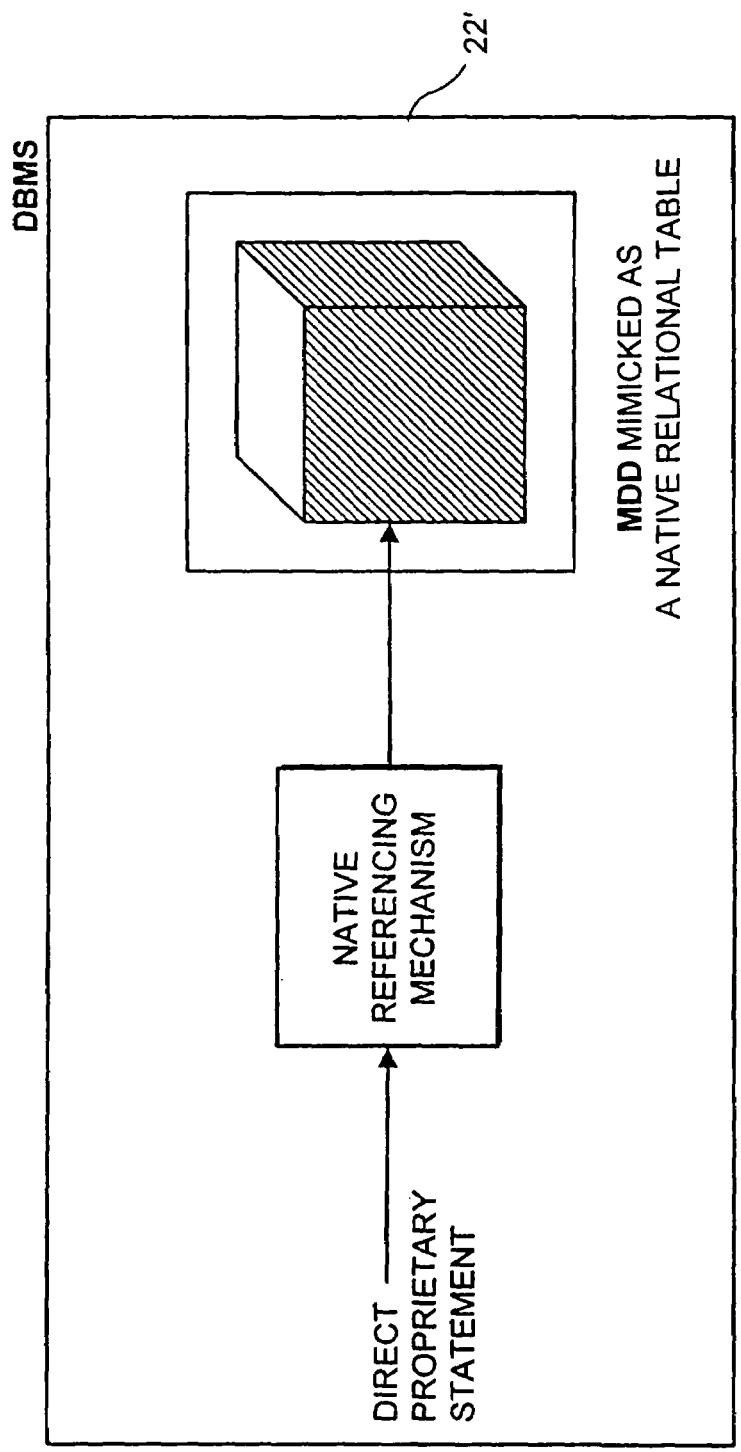
FIG. 19F is a schematic representation of the trigger mechanism of the DBMS that enables users to query on the aggregated data generated and/or stored in the MDD Aggregation module according to the present invention.

In step 607, a reference is defined that provides users with the ability to query the data generated by the MDD Aggregation Module and/or stored in the MDDB of the MDD Aggregation Module. This reference is preferably defined using the Create View SQL statement, which allows the user to: i) define a table name (TN) associated with the MDDB stored in the MDD Aggregation Module, and ii) define a link used to route SQL statements on the table TN to the MDD Aggregation Module. In this embodiment, the view mechanism of the DBMS enables reference and linking to the data stored in the MDDB of the MDD Aggregation Engine as illustrated in FIG. 19E. A more detailed description of the view mechanism and the Create View SQL statement may be found in C. J. Date, "An Introduction to Database Systems," Addison-Wesley, Seventh Edition, 2000, pp. 289-326, herein incorporated by reference in its entirety. Thus, the view mechanism enables the query handler of the DBMS system to forward any SQL query on table TN to the MDD aggregation module via the associated link. In an alternative embodiment, a direct mechanism (e.g., NA trigger mechanism) may be used to enable the DBMS system to reference and link to the data generated by the MDD Aggregation Module and/or stored in the MDDB of the MDD Aggregation Engine as illustrated in FIG. 19F. A more detailed description of trigger mechanisms and methods may be found in C. J. Date, "An Introduction to Database Systems," Addison-Wesley, Seventh Edition, 2000, pp. 250, 266, herein incorporated by reference in its entirety.

In step 609, a user interacts with a client machine to generate a query, and the query is communicated to the query interface. The query interface generate one or more SQL statements. These SQL statements may refer to data stored in tables of the relational datastore, or may refer to the reference defined in step 607 (this reference refers to the data stored in the MDDB of the MDD Aggregation Module). These SQL statement(s) are forwarded to the query handler of the DBMS.

In step 611, the query handler receives the SQL statement(s); and optionally transforms such SQL statement(s) to optimize the SQL statement(s) for more efficient query handling. Such transformations are well known in the art. For example, see Kimball, "Aggregation Navigation With (Almost) No MetaData", DBMS Data Warehouse Supplement, August 1996.

In step 613: the query handler determines whether the received SQL statement(s) [or transformed SQL statement(s)] is on the reference generated in step 607. If so, operation continues to step 615; otherwise normal query handling operations continue in step 625 wherein the relational datastore is accessed to extract, store, and/or manipulate the data stored therein as directed by the query, and results are returned back to the user via the client machine, if needed.

In step 615, the received SQL statement(s) [or transformed SQL statement(s)] is routed to the MDD aggregation engine for processing in step 617 using the link for the reference as described above with respect to step 607.

In step 617, the SQL statement(s) is received by the SQL handler of the MDD Aggregation Module, wherein a set of one or more N-dimensional coordinates are extracted from the SQL statement. In performing this function, SQL handler may utilize an adapter (interface) that maps the data types of the SQL statement issued by query handler of the DBMS (or that maps a standard data type used to represent the SQL statement issued by query handler of the DBMS) into the data types used in the MDD aggregation module.

In step 619, the set of N-dimensional coordinates extracted in step 617 are used by the MDD handler to address the MDDB and retrieve the corresponding data from the MDDB.

Finally, in step 621, the retrieved data is returned to the user via the DBMS (for example, by forwarding the retrieved data to the SQL handler, which returns the retrieved data to the query handler of the DBMS system, which returns the results of the user-submitted query to the user via the client machine), and the operation ends.

It should be noted that the table data (base data), as it arrives from DBMS, may be analyzed and reordered to optimize hierarchy handling, according to the unique method of the present invention, as described above with reference to FIGS. 11A, 11B, and 11C.

Moreover, the MDD control module of the MDD Aggregation Module preferably administers the aggregation process according to the method illustrated in FIGS. 9A and 9B. Thus, in accordance with the principles of the present invention, data aggregation within the DBMS can be carried out either as a complete pre-aggregation process, where the base data is fully aggregated before commencing querying, or as a query directed roll-up (QDR) process, where querying is allowed at any stage of aggregation using the "on-the-fly" data aggregation process of the present invention. The QDR process will be described hereinafter in greater detail with reference to FIG. 9C. The response to a request (i.e. a basic component of a client query) requiring "on-the-fly" data aggregation, or requiring access to pre-aggregated result data via the MDD handler is provided by a query/request serving mechanism of the present invention within the MDD control module, the primary operations of which are illustrated in the flow chart of FIG. 6D. The function of the MDD Handler is to handle multidimensional data in the storage(s) module in a very efficient way, according to the novel method of the present invention, which will be described in detail hereinafter with reference to FIGS. 10A and 10B.

The SQL handling mechanism shown in FIG. 6D is controlled by the MDD control module. Requests are queued and served one by one. If the required data is already pre-calculated, then it is retrieved by the MDD handler and returned to the client. Otherwise, the required data is calculated "on-the-fly" by the aggregation engine, and the result moved out to the client, while simultaneously stored by the MDD handler, shown in FIG. 6C.

Figure 1B:
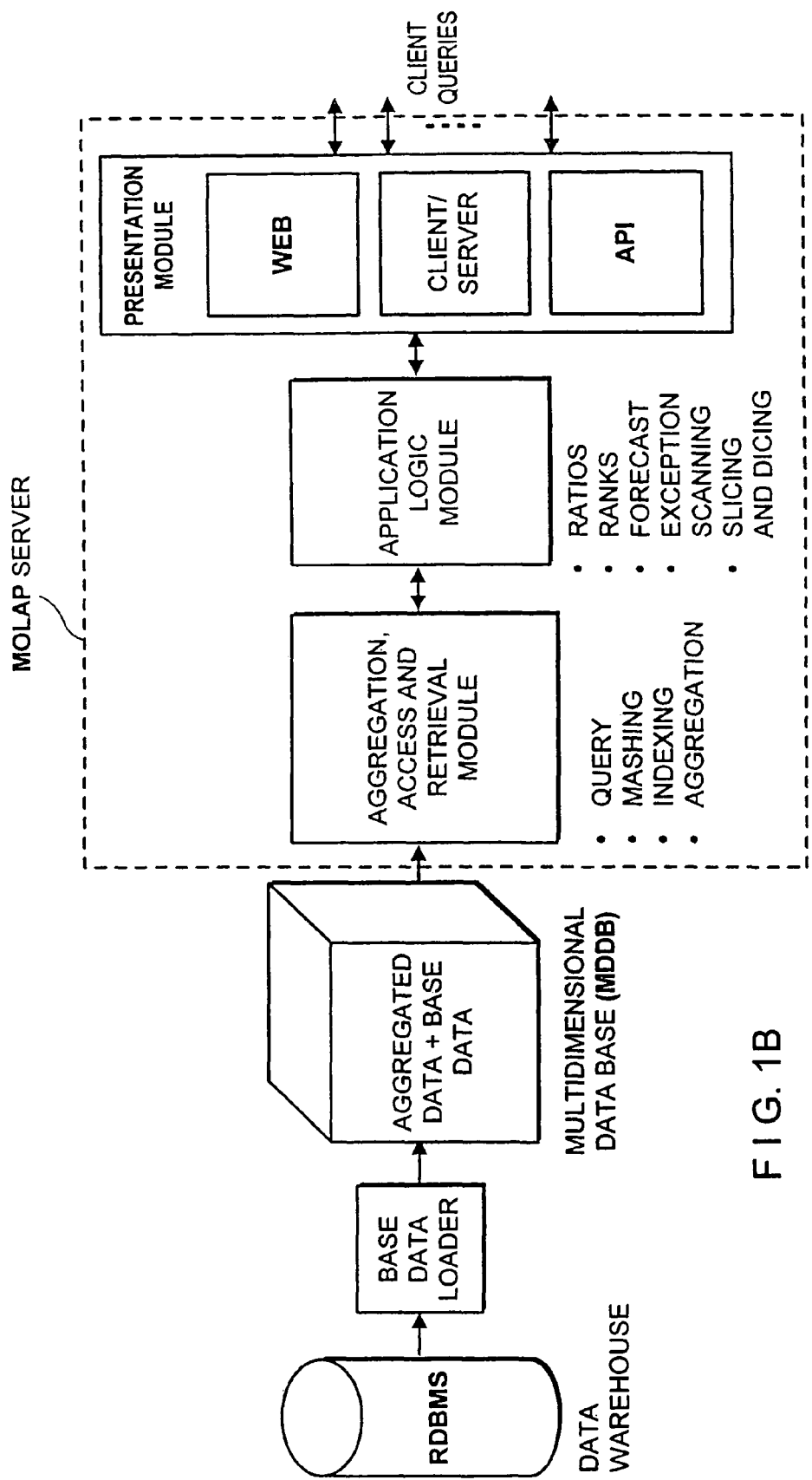
FIG. 1B is a schematic representation of a generalized embodiment of a prior art multidimensional on-line analytical processing (MOLAP) system comprising a base data loader for receiving atomic (i.e. base) data from a Data Warehouse realized by an RDBMS, an OLAP multidimensional database (MDDB), an aggregation, an access and retrieval module, an application logic module and a presentation module associated with a conventional OLAP sever (e.g. Oracle's Express Server) for supporting on-line transactional processing (OLTP) operations on the MDDB, to service database queries and requests from a plurality of OLAP client machines typically accessing the system from an information network (e.g. the Internet)
Figure 2A:
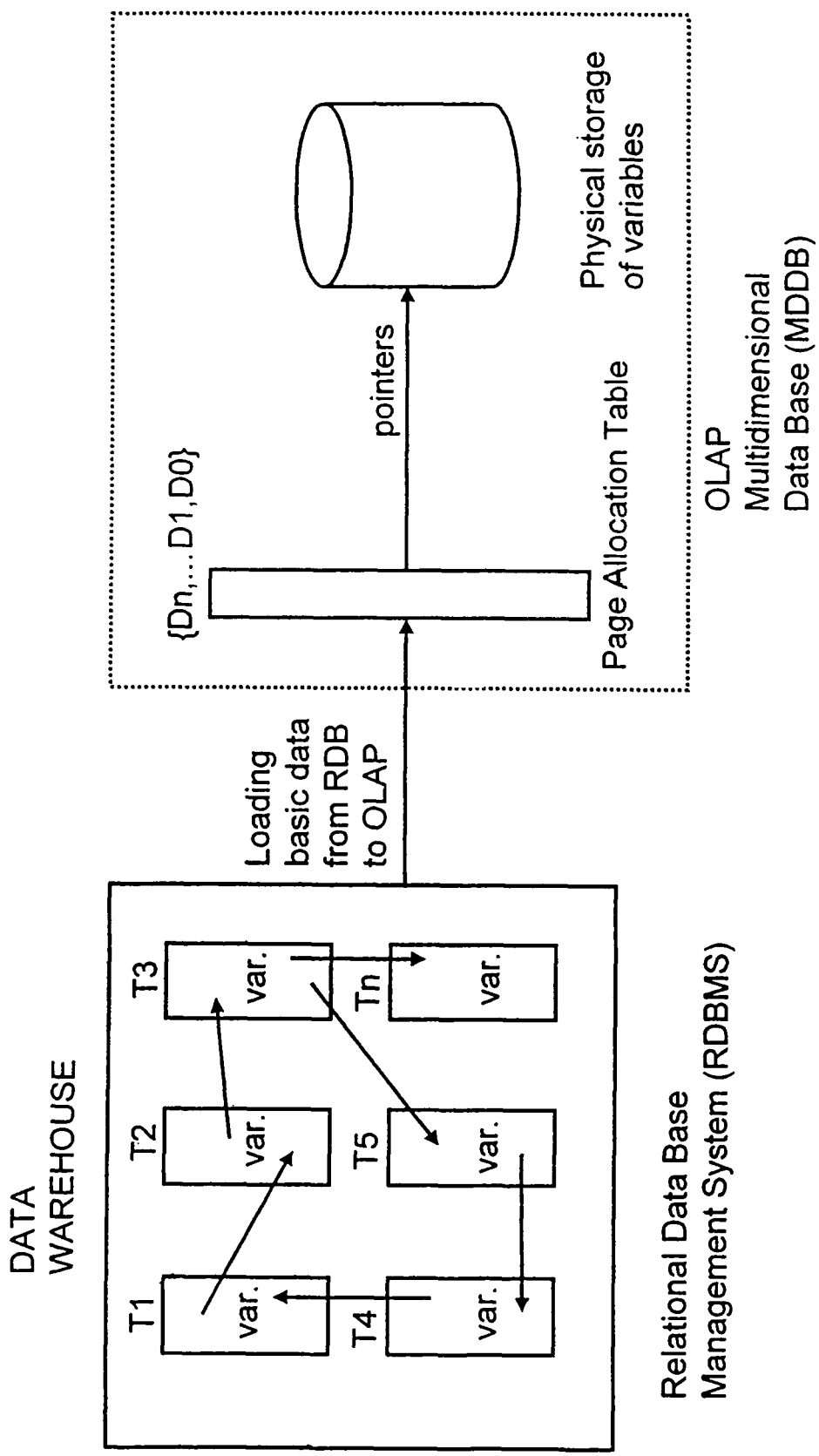
FIG. 2A is a schematic representation of the Data Warehouse shown in the prior art system of FIG. 1B comprising numerous data tables (e.g. T1, T2, . . . Tn) and data field links, and the OLAP multidimensional database shown of FIG. 1B, comprising a conventional page allocation table (PAT) with pointers pointing to the physical storage of variables in an information storage device.
Figure 2B:
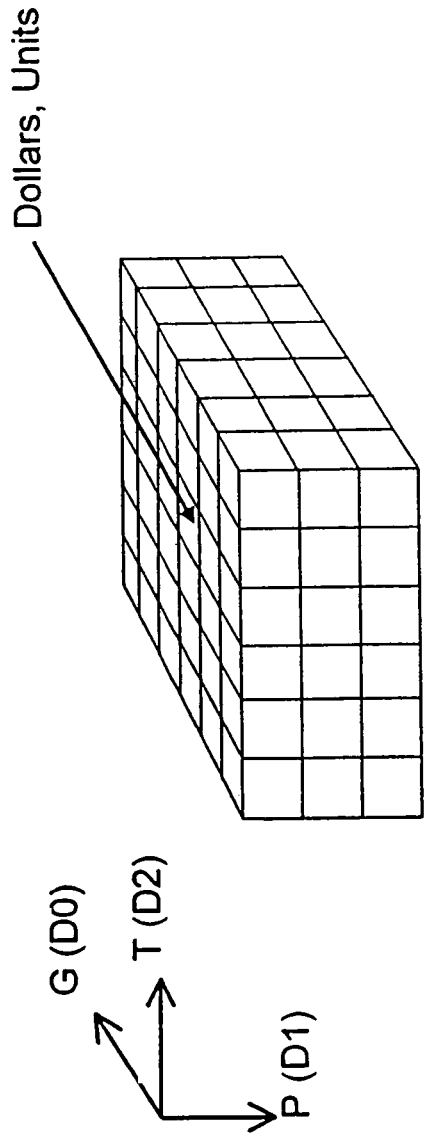
FIG. 2B is a schematic representation of an exemplary three-dimensional MDDB and organized as a 3-dimensional Cartesian cube and used in the prior art system of FIG. 2A, wherein the first dimension of the MDDB is representative of geography (e.g. cities, states, countries, continents), the second dimension of the MDDB is representative of time (e.g. days, weeks, months, years), the third dimension of the MDDB is representative of products (e.g. all products, by manufacturer), and the basic data element is a set of variables which are addressed by 3-dimensional coordinate values.
Figure 2C:
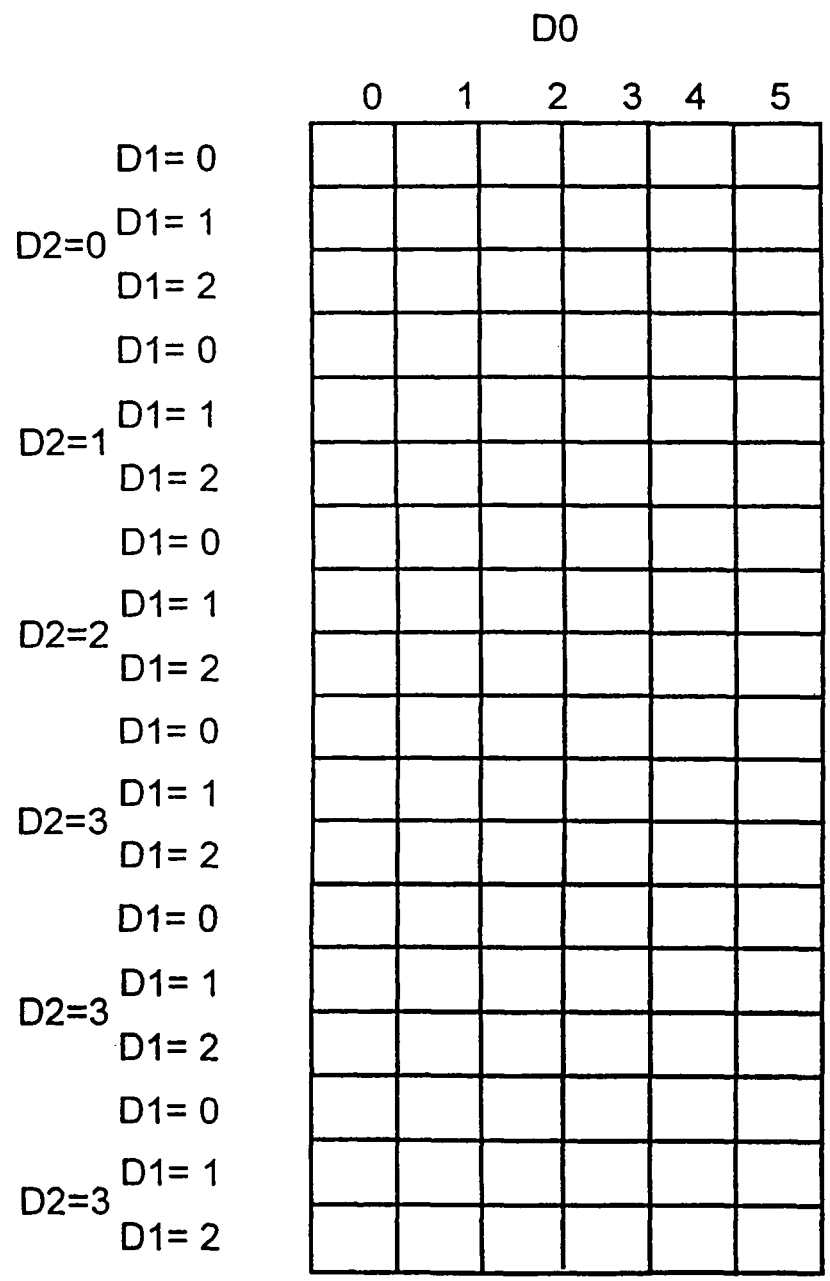
FIG. 2C is a schematic representation of a prior art array structure associated with an exemplary three-dimensional MDDB, arranged according to a dimensional hierarchy.
Figure 2D:
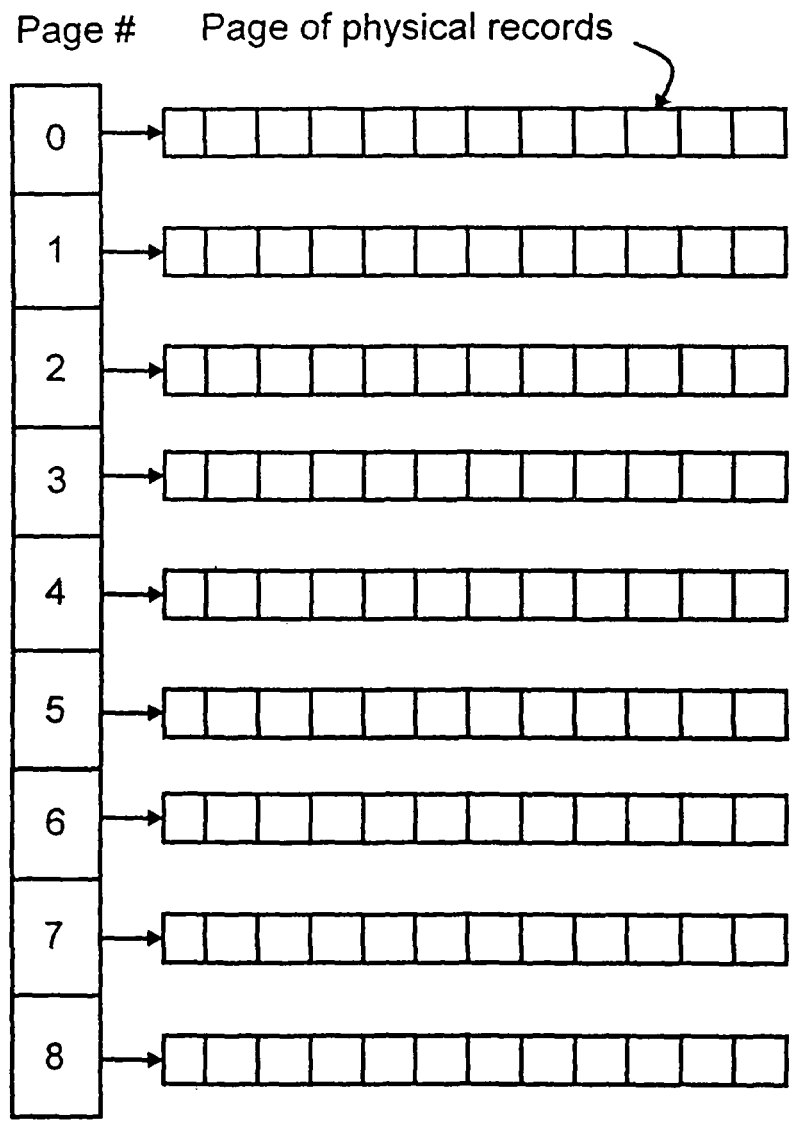
FIG. 2D is a schematic representation of a prior art page allocation table for an exemplary three-dimensional MDDB, arranged according to pages of data element addresses.
Figure 3A:
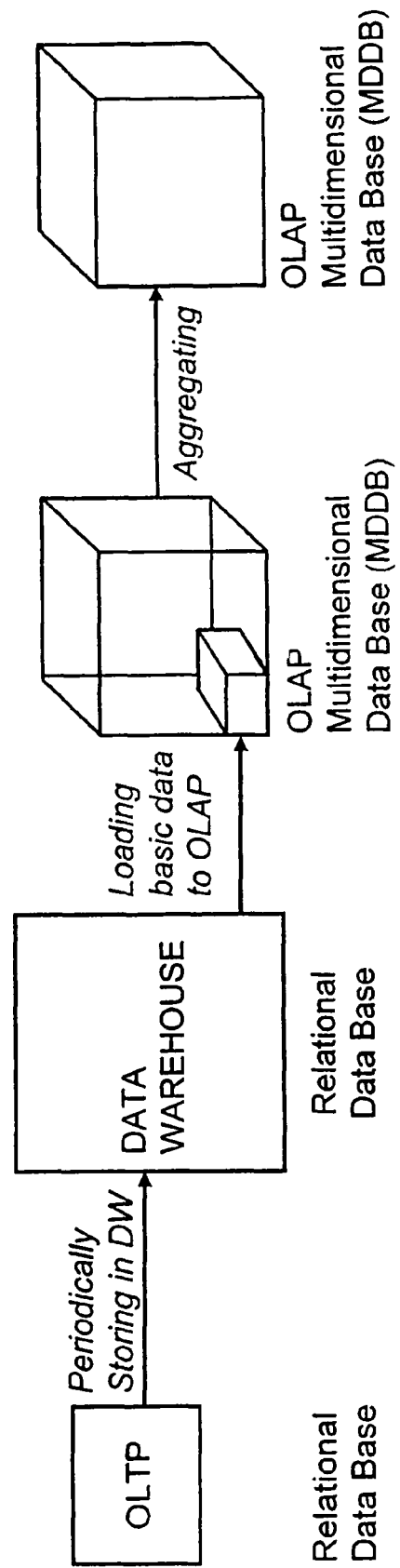
FIG. 3A is a schematic representation of a prior art MOLAP system, illustrating the process of periodically storing raw data in the RDBMS Data Warehouse thereof, serially loading of basic data from the Data Warehouse to the MDDB, and the process of serially pre-aggregating (or pre-compiling) the data in the MDDB along the entire dimensional hierarchy thereof.
Figure 3B:
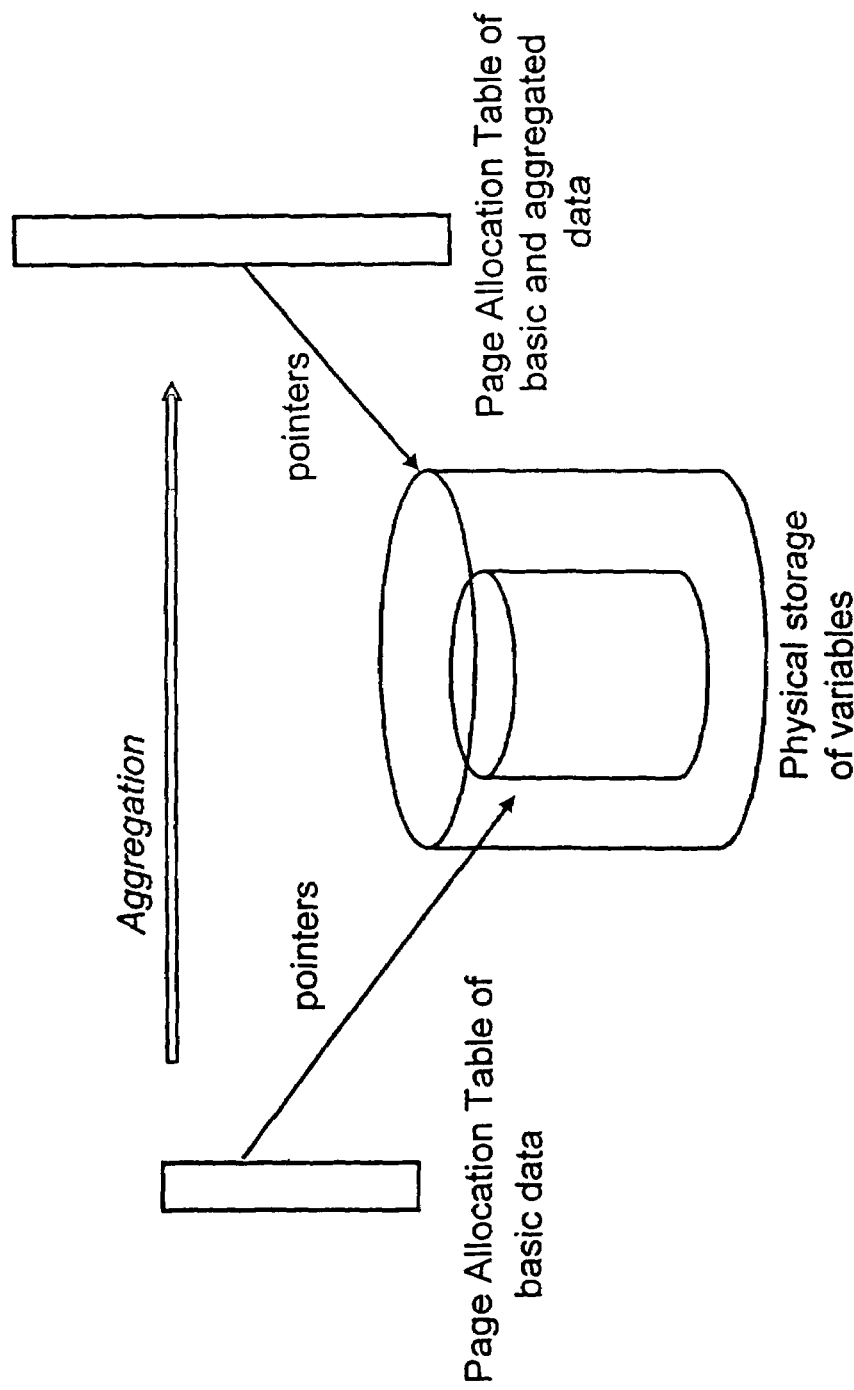
FIG. 3B is a schematic representation illustrating that the Cartesian addresses listed in a prior art page allocation table (PAT) point to where physical storage of data elements (i.e. variables) occurs in the information recording media (e.g. storage volumes) associated with the MDDB, during the loading of basic data into the MDDB as well as during data pre-aggregation processes carried out therewithin.
Figure 4:
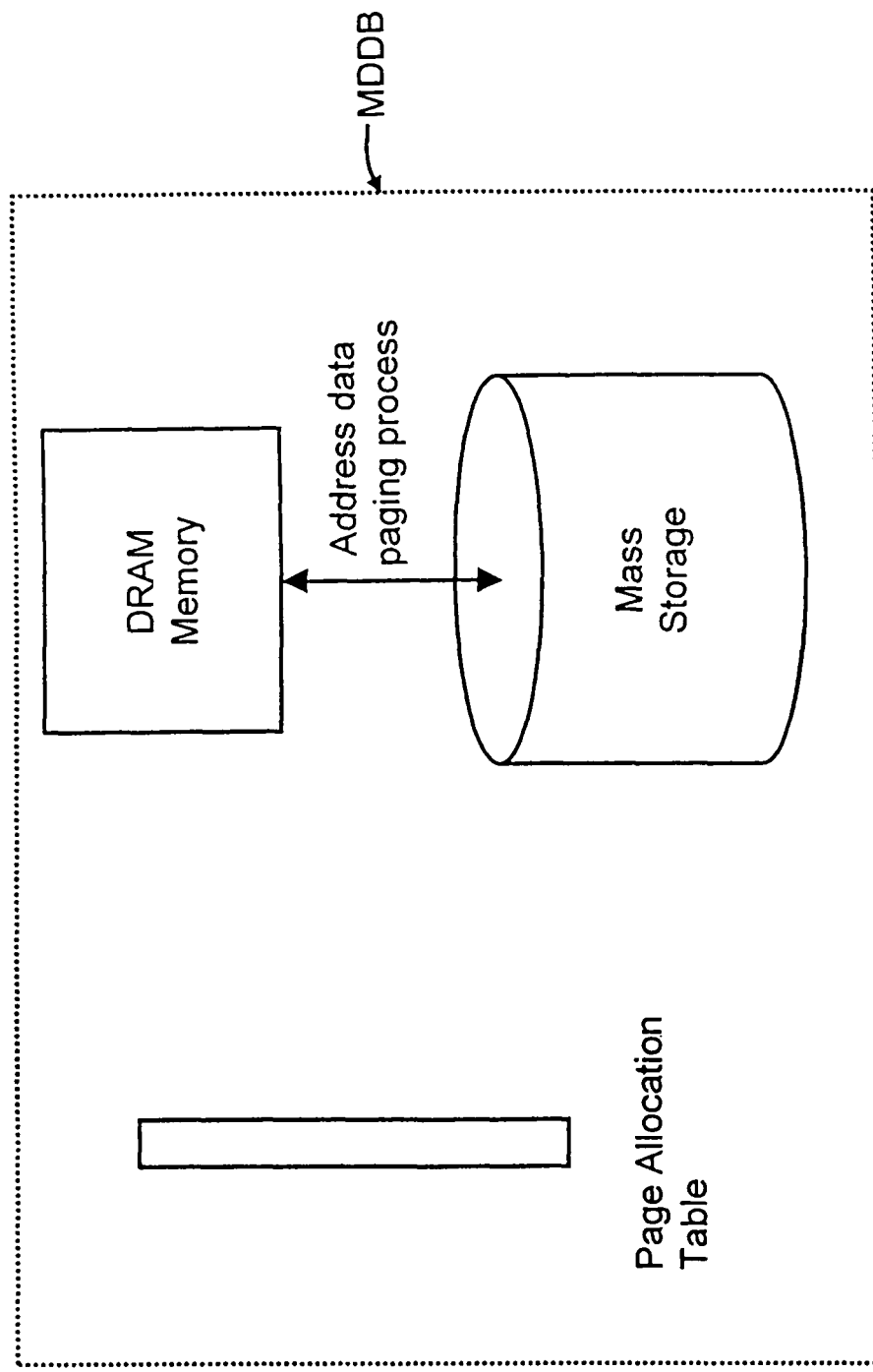
FIG. 4 is a schematic representation illustrating that, for very large prior art MDDBs, very large page allocation tables (PATs) are required to represent the address locations of the data elements contained therein, and thus there is a need to employ address data paging techniques between the DRAM (e.g. program memory) and mass storage devices (e.g. recording discs or RAIDs) available on the serial computing platform used to implement such prior art MOLAP systems.
Figure 5:
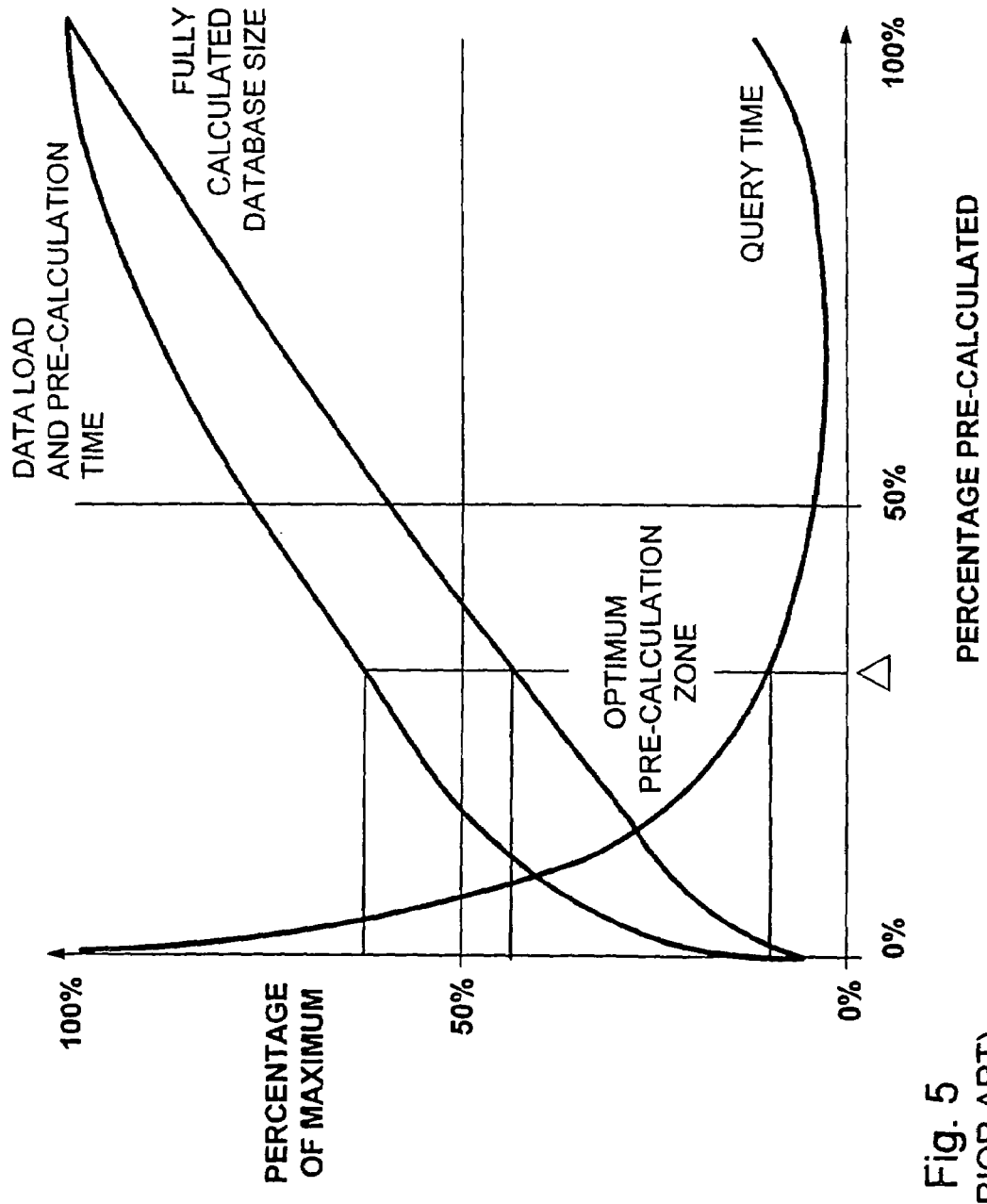
FIG. 5 is a graphical representation showing how search time in a conventional (i.e. prior art) MDDB increases in proportion to the amount of pre-aggregation of data therewithin.
Figure 19G:
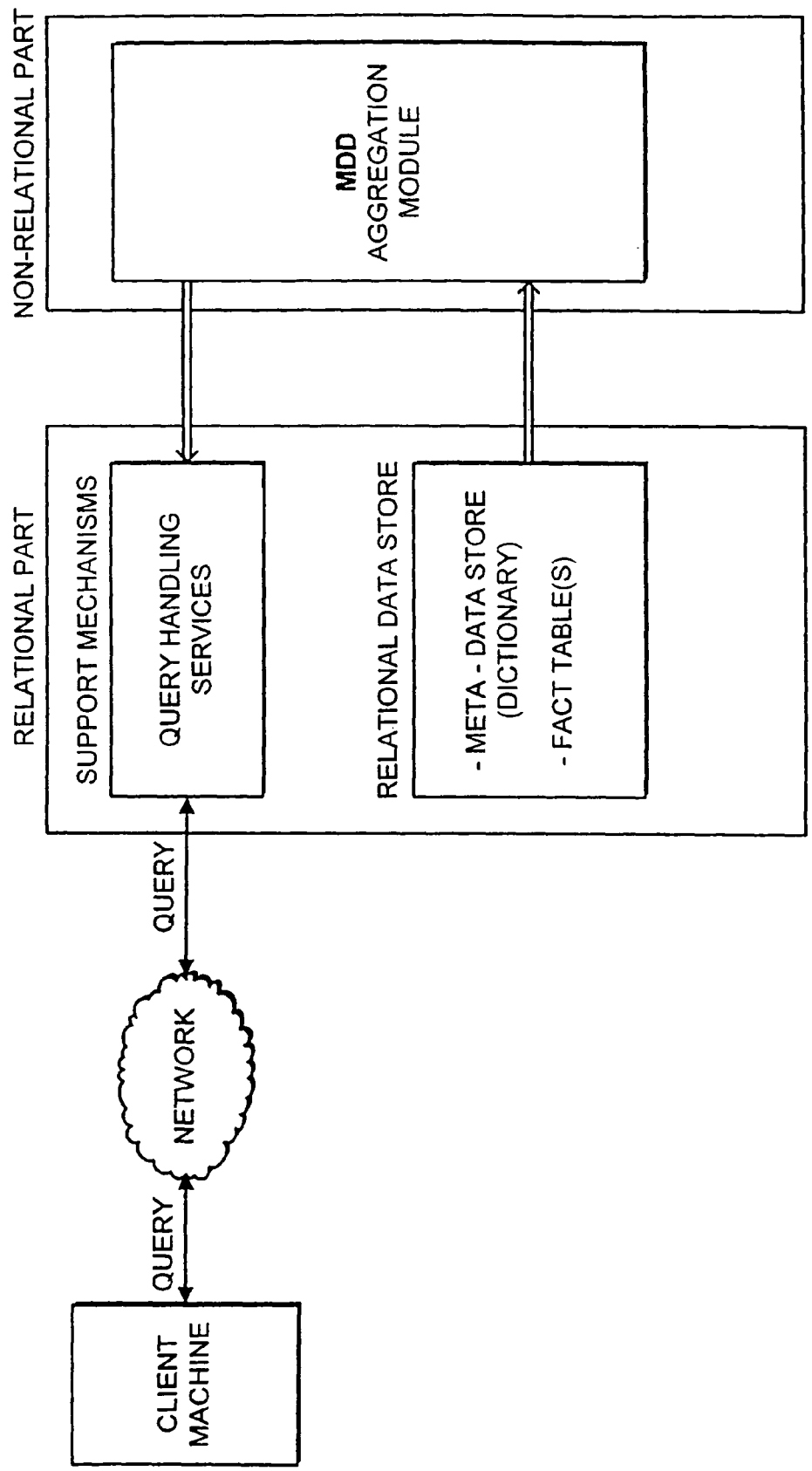
FIG. 19G is a schematic representation of the DBMS of the present invention, illustrating a logically partitioning into a relational part and a non-relational part. The relational part includes the relational data store (e.g., table(s) and dictionary) and support mechanisms (e.g., query handling services). The non-relational part includes the MDD Aggregation Module. Data flows bidirectionally between the relational part and the non-relational part as shown.

As illustrated in FIG. 19G, the DBMS of the present invention as described above may be logically partitioned into a relational part and a non-relational part. The relational part includes the relational datastore (e.g., table(s) and dictionary) and support mechanisms (e.g., query handling services). The non-relational part includes the MDD Aggregation Module. As described above, bi-directional data flow occurs between the relational part and the non-relational part as shown. More specifically, during data load operations, data is loaded from the relational part (i.e., the relational datastore) into the non-relational part, wherein it is aggregated and stored in the MDDB. And during query servicing operations, when a given query references data stored in the MDDB, data pertaining to the query is generated by the non-relational part (e.g., generated and/or retrieved from the MDDB) and supplied to the relational part (e.g., query servicing mechanism) for communication back to the user. Such bi-directional data flow represents an important distinguishing feature with respect to the prior art. For example, in the prior art MOLAP architecture as illustrated in FIG. 1B, unidirectional data flows occurs from the relational data base (e.g., the Data Warehouse RDBMS system) into the MDDB during data loading operations.

Figure 20B:
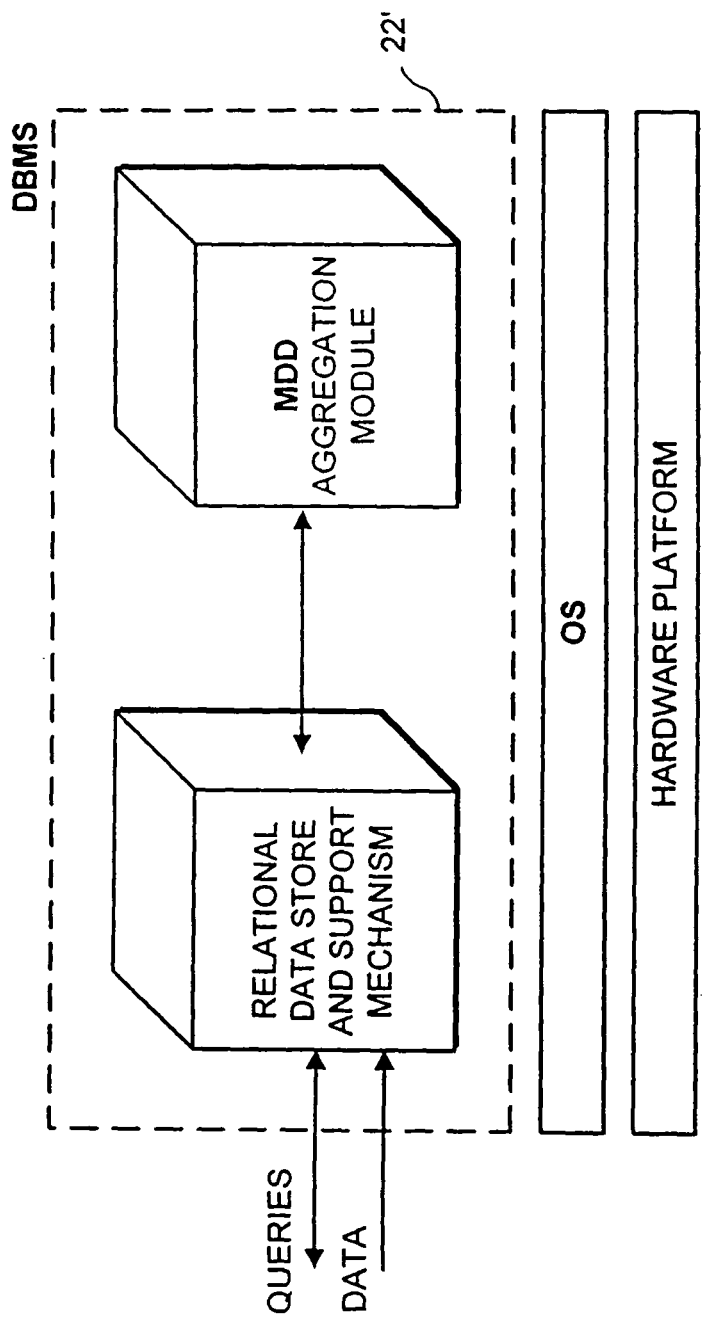
FIG. 20B shows a common-platform type implementation of the DBMS system of the illustrative embodiment shown in FIG. 19A, wherein the relational datastore and support mechanisms (e.g., query handling, fact table(s) and dictionary of the DBMS) share the same hardware platform and operating system (OS) that is used to run the MDD Aggregation Module of the present invention.

FIGS. 20A and 20B outline two different implementations of the DBMS of the present invention. In both implementations, the query handler of the DBMS system supplies aggregated results retrieved from the MDD to a client.

FIG. 20A shows a separate-platform implementation of the DBMS system of the illustrative embodiment shown in FIG. 19A, wherein the relational part of the DBMS reside on a separate hardware platform and/or OS system from that used to run the non-relational part (MDD Aggregation Module). In this type of implementation, it is even possible to run parts of the DBMS system and the MDD Aggregation Module on different-type operating systems (e.g. NT, Unix, MAC OS).

FIG. 20B shows a common-platform implementation of the DBMS system of the illustrative embodiment shown in FIG. 20A, wherein the relational part of the DBMS share the same hardware platform and operating system (OS) that is used to run the non-relational part (MDD Aggregation Module).

FIG. 21 shows the improved DBMS (e.g., RDBMS) of the present invention as a component of a data warehouse, serving the data storage and aggregation needs of a ROLAP system (or other OLAP systems alike). Importantly, the improved DBMS of the present invention provides flexible, high-performance access and analysis of large volumes of complex and interrelated data. Moreover, the improved Data Warehouse DBMS of the present invention can simultaneously serve many different kinds of clients (e.g. data mart, OLAP, URL) and has the power of delivering an enterprise-wide data storage and aggregation in a cost-effective way. This kind of system eliminates redundancy over the group of clients, delivering scalability and flexibility. Moreover, the improved DBMS of the present invention can be used as the data store component of in any informational database system as described above, including data analysis programs such as spread-sheet modeling programs, serving the data storage and aggregation needs of such systems.

Figure 22:
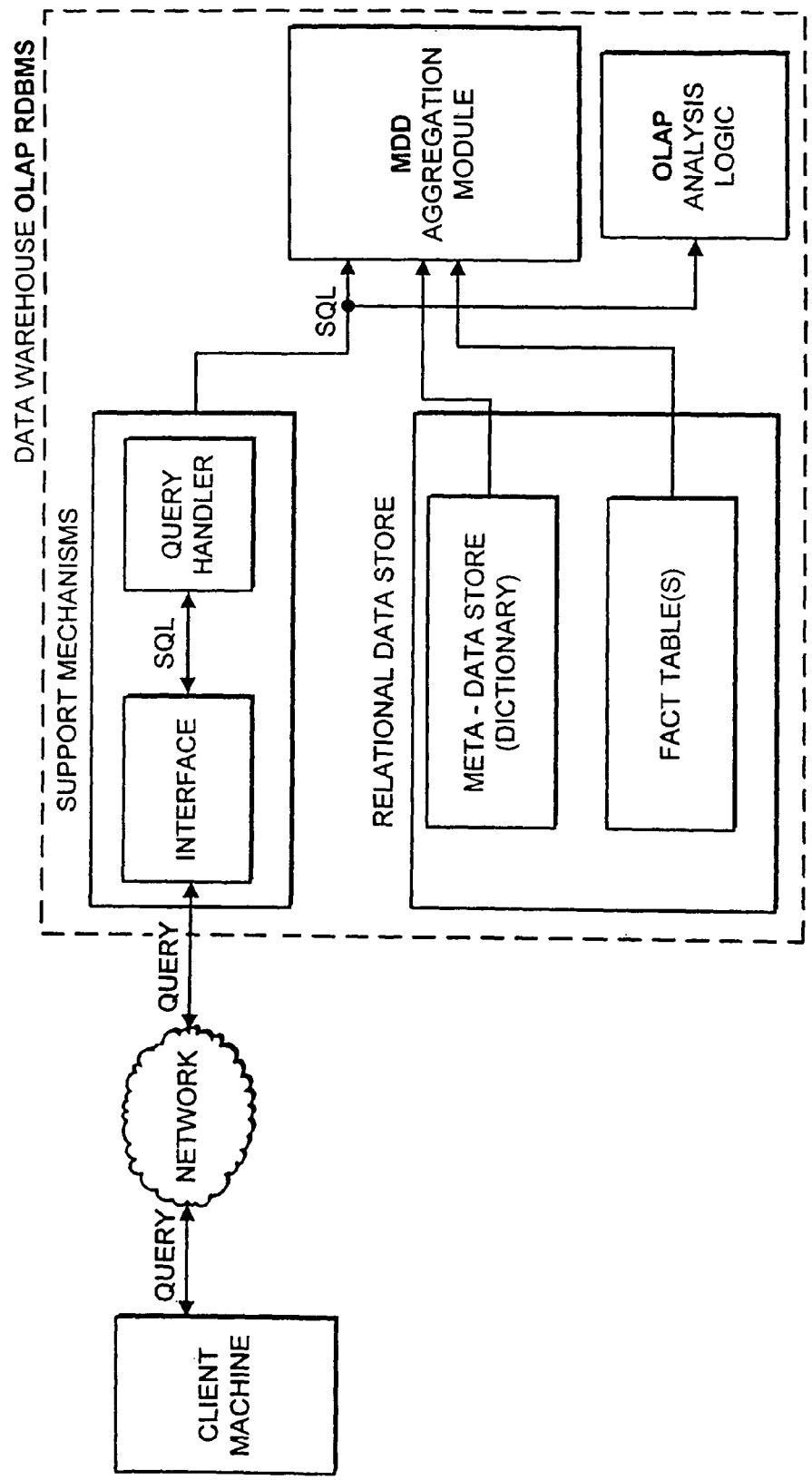
FIG. 22 is a schematic representation of the DBMS of the present invention shown as a component of a central data warehouse, wherein the DBMS includes integrated OLAP Analysis Logic (and preferably an integrated Presentation Module) that operates cooperatively with the query handling of the DBMS system and the MDD Aggregation Module to enable users of the DBMS system to execute multidimensional reports (e.g., ratios, ranks, transforms, dynamic consolidation, complex filtering, forecasts, query governing, scheduling, flow control, pre-aggregate inferencing, denomalization support, and/or table partitioning and joins) and preferably perform traditional OLAP analyses (grids, graphs, maps, alerts, drill-down, data pivot, data surf, slice and dice, print).

FIG. 22 shows an embodiment of the present invention wherein the DBMS (e.g., RDBMS) of the present invention is a component of a data warehouse—OLAP system. The DBMS operates as a traditional data warehouse, serving the data storage and aggregation needs of an enterprise. In addition, the DBMS includes integrated OLAP Analysis Logic (and preferably an integrated Presentation Module not shown) that operates cooperatively with the query handling of the DBMS system and the MDD Aggregation Module to enable users of the DBMS system to execute multidimensional reports (e.g., ratios, ranks, transforms, dynamic consolidation, complex filtering, forecasts, query governing, scheduling, flow control, pre-aggregate inferencing, denomalization support, and/or table partitioning and joins) and preferably perform traditional OLAP analyses (grids, graphs, maps, alerts, drill-down, data pivot, data surf, slice and dice, print). Importantly, the improved DBMS of the present invention provides flexible, high-performance access and analysis of large volumes of complex and interrelated data. Moreover, the improved DBMS of the present invention can simultaneously serve many different kinds of clients (e.g. data mart, other OLAP systems, URL-Directory Systems) and has the power of delivering enterprise-wide data storage and aggregation and OLAP analysis in a cost-effective way. This kind of system eliminates redundancy over the group of clients, delivering scalability and flexibility. Moreover, the improved DBMS of the present invention can be used as the data store component of in any informational database system as described above, serving the data storage and aggregation needs of such systems.

Functional Advantages Gained by the Improved DBMS of the Present Invention

The features of the DBMS of the present invention, provides for dramatically improved response time in handling queries issued to the DBMS that involve aggregation, thus enabling enterprise-wide centralized aggregation. Moreover, in the preferred embodiment of the present invention, users can query the aggregated data in an manner no different than traditional queries on the DBMS.

The method of Segmented Aggregation employed by the novel DBMS of the present invention provides flexibility, scalability, the capability of Query Directed Aggregation, and speed improvement.

Moreover, the method of Query Directed Aggregation (QDR) employed by the novel DBMS of the present invention minimizes the data handling operations in multi-hierarchy data structures, eliminates the need to wait for full aggregation to be complete, and provides for build-up of aggregated data required for full aggregation.

It is understood that the System and Method of the illustrative embodiments described herein above may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

What is claimed:

1. A database management system comprising:
   a relational data store configured to store fact data;
   a non-relational data store configured to store aggregated fact data;
   a communication interface operably connected between the relational data store and the non-relational data store for the communication of fact data from the relational data store to the non-relational data store and for the communication of aggregated fact data from the non-relational data store to the relational data store; and
   a computer system comprising computer hardware, the computer system programmed to implement:
      a query servicing mechanism configured to service one or more natural language queries from a user, the query servicing mechanism comprising:
         a query processing mechanism configured to process a given natural language query using operations to:
            determine whether servicing the given natural language query needs data stored in the relational data store or in the non-relational data store;
            upon determining that servicing the given natural language query needs data stored in the relational data store,
            automatically route the given natural language query to the relational data store, so that data is accessed from the relational data store and forwarded to the query processing mechanism for use in servicing the given natural language query, in a manner transparent to the user; and
         wherein upon determining that servicing the given natural language query needs data stored in the non-relational data store,
            automatically route the given natural language query to the non-relational data store, so that data can be accessed and forwarded to the query processing mechanism for use in servicing the given natural language query, in a manner transparent to the user.

2. The database management system of claim 1, wherein the query servicing mechanism is implemented in a module within the database management system.

3. The database management system of claim 1, wherein the database management system is configured to receive the given natural language query from a user via a web-enabled browser, and the database management system is configured to communicate the given natural language query to the query servicing mechanism.

4. The database management system of claim 1, wherein the non-relational data store comprises a multi-dimensional data store.

5. The database management system of claim 4, wherein the database management system is configured to generate the multi-dimensional data store by calculating aggregated fact data from data stored in the relational data store according to a multi-dimensional data aggregation process, and storing the aggregated fact data in the multi-dimensional data store.

6. The database management system of claim 5, wherein the multi-dimensional data aggregation process comprises:
   (i) determining if the aggregated fact data needed to service the given natural language query is already pre-calculated and stored within the multi-dimensional data store, and
      in response to determining that the aggregated fact data needed to service the given natural language query is already pre-calculated and stored within the multi-dimensional data store,
      retrieving the pre-aggregated fact data and returning the retrieved pre-aggregated fact data to the query processing mechanism; and
   (ii) in response to determining that the needed fact data is not already pre-aggregated and stored within the multi-dimensional data store, calculating the needed aggregated fact data on demand, and automatically forwarding the aggregated fact data to the query processing mechanism.

7. A method comprising:
   by a computer system comprising computer hardware:
      receiving one or more natural language queries from a user;
      determining whether servicing a given natural language query of the one or more natural language queries needs data stored in a relational data store or in a non-relational data store, wherein the relational data store is configured to communicate fact data to the non-relational data store and the non-relational data store is configured to communicate aggregated fact data to the relational data store;
      in response to determining that servicing the given natural language query needs data stored in the relational data store,
         automatically routing the given natural language query to the relational data store, so that data is accessed from the relational data store and forwarded to the user; and
      in response to determining that servicing the given one or more natural language queries needs data stored in the non-relational data store,
         automatically routing the given natural language query to the non-relational data store, so that data can be accessed and forwarded to the user.

8. The method of claim 7, the method further comprising receiving at the computer system a natural language query over a network from a user browser.

9. The method of claim 7, wherein the non-relational data store comprises a multi-dimensional data store.

10. The method of claim 9, the method further comprising generating the multi-dimensional data store by calculating aggregated fact data from data stored in the relational data store according to a multi-dimensional data aggregation process, and storing the aggregated fact data in the multi-dimensional data store.

11. The method of claim 10, wherein the aggregated fact data is calculated on demand and stored in the multi-dimensional data store.

12. A non-transitory computer-readable medium having instructions stored thereon that, if executed by a computing device, cause the computing device to perform operations comprising:
   receiving one or more natural language queries from a user;
   determining whether servicing a given natural language query needs data stored in a relational data store or in a non-relational data store, wherein the non-relational data store is generated via a segmented aggregation process involving aggregation along multiple dimensions in a determined sequence;
   in response to determining that servicing the given natural language query needs data stored in the relational data store,
      automatically routing the given natural language query to the relational data store, so that data is accessed from the relational data store and forwarded to the user; and
   in response to determining that servicing the given natural language query needs data stored in the non-relational data store generated via the segmented aggregation process,
      automatically routing the given natural language query to the non-relational data store, so that data can be accessed and forwarded to the user.

13. The non-transitory computer-readable medium of claim 12, the operations further comprising receiving a natural language query over a network from a user browser.

14. The non-transitory computer-readable medium of claim 12, wherein the non-relational data store comprises a multi-dimensional data store.

15. The non-transitory computer-readable medium of claim 14, the operations further comprising generating the multi-dimensional data store by calculating aggregated fact data from data stored in the relational data store according to a multi-dimensional data aggregation process, and storing the aggregated fact data in the multi-dimensional data store.

16. The non-transitory computer-readable medium of claim 15, wherein the multi-dimensional data aggregation process comprises:
   (i) in response to determining that the aggregated fact data needed to service the given natural language query is already pre-calculated and stored within the multi-dimensional data store, then the pre-aggregated fact data is retrieved and returned to the user; and
   (ii) in response to determining that the needed fact data is not already pre-aggregated and stored within the multi-dimensional data store, then the needed aggregated fact data is calculated on demand, and the aggregated fact data is automatically forwarded to the user.

* * * * *